(12) United States Patent
Lopez Uran et al.

(10) Patent No.: US 12,515,852 B2
(45) Date of Patent: Jan. 6, 2026

(54) CONTAINER LOCKING MECHANISM

(71) Applicant: CHEP TECHNOLOGY PTY LIMITED, Sydney (AU)

(72) Inventors: Daniel Lopez Uran, Weybridge Surrey (GB); Nicolas Cappuyns, Weybridge Surrey (GB)

(73) Assignee: CHEP TECHNOLOGY PTY LIMITED, Sydney (AU)

( * ) Notice: Subject to any disclaimer, the term of this patent is extended or adjusted under 35 U.S.C. 154(b) by 60 days.

(21) Appl. No.: 18/264,178

(22) PCT Filed: Feb. 4, 2022

(86) PCT No.: PCT/IB2022/050997
§ 371 (c)(1),
(2) Date: Aug. 3, 2023

(87) PCT Pub. No.: WO2022/167997
PCT Pub. Date: Aug. 11, 2022

(65) Prior Publication Data
US 2024/0034520 A1 Feb. 1, 2024

(30) Foreign Application Priority Data
Feb. 5, 2021 (GB) .................... 2101626

(51) Int. Cl.
*B65D 45/18* (2006.01)
*B65D 19/06* (2006.01)
*B65D 19/38* (2006.01)

(52) U.S. Cl.
CPC ............. *B65D 45/18* (2013.01); *B65D 19/06* (2013.01); *B65D 19/38* (2013.01);
(Continued)

(58) Field of Classification Search
CPC ........ B65D 45/00; B65D 45/18; B65D 45/20; B65D 45/22; B65D 19/00; B65D 19/02;
(Continued)

(56) References Cited

U.S. PATENT DOCUMENTS 5,129,536 A * 7/1992 Robinson ............... E05B 43/005
220/315
5,189,894 A * 3/1993 Buck ....................... E05B 37/16
70/351

(Continued)

FOREIGN PATENT DOCUMENTS

| CN | 105235979 B | 8/2017 |
| EP | 0905034 A2 | 3/1999 |

(Continued)

OTHER PUBLICATIONS

CN-105235979-A; Su (Year: 2016).*
(Continued)

*Primary Examiner* — Nathan Cumar
(74) *Attorney, Agent, or Firm* — Alston & Bird LLP

(57) ABSTRACT

There is provided a container locking mechanism for a container. The locking mechanism comprises a fixed member, a locking member and a biasing member. The fixed member is providable on a body of the container. The locking member is moveable about the fixed member between a locked configuration and an unlocked configuration. The biasing member is configured to urge the locking member towards the locked configuration.

25 Claims, 19 Drawing Sheets

(52) U.S. Cl.
CPC .............. *B65D 2519/00661* (2013.01); *B65D 2519/00711* (2013.01); *B65D 2555/02* (2013.01)

(58) Field of Classification Search
CPC ...... B65D 19/06; B65D 19/38; B65D 19/385; B65D 55/0827; B65D 41/32; B65D 2519/00661; B65D 2519/00706; B65D 2519/00711; B65D 2555/00; B65D 2555/02; E05B 65/523; E05B 2015/0448; E05B 2015/0415; E05B 2015/0468
USPC .......................................................... 70/63
See application file for complete search history.

(56) References Cited

U.S. PATENT DOCUMENTS

| | | | |
|---|---|---|---|
| 6,024,223 A | 2/2000 | Ritter | |
| 8,054,194 B2* | 11/2011 | Lax | G06Q 10/08 70/57.1 |
| 2010/0031712 A1* | 2/2010 | Rader | B65D 11/184 70/63 |
| 2014/0326721 A1* | 11/2014 | Jian | B65D 90/623 220/6 |
| 2015/0232264 A1* | 8/2015 | Pansegrouw | B65D 88/1668 220/640 |
| 2018/0086520 A1* | 3/2018 | Jian | B65D 55/02 |
| 2020/0108982 A1* | 4/2020 | Cope | B65D 43/0212 |
| 2021/0024262 A1* | 1/2021 | Jian | B65D 55/02 |

FOREIGN PATENT DOCUMENTS

| | | |
|---|---|---|
| EP | 4288349 A1 | 12/2023 |
| GB | 314224 A | 6/1929 |
| GB | 1330680 A | 9/1973 |
| JP | 2007-153339 A | 6/2007 |
| JP | 3946209 B2 | 7/2007 |
| WO | WO 2022/167997 A1 | 8/2022 |

OTHER PUBLICATIONS

Examination Report under Section 18(3) for United Kingdom Application No. 2101626.6, dated Sep. 23, 2024, (4 pages).
International Search Report and Written Opinion for International Application No. PCT/IB2022/050997, dated Apr. 4, 2022, (10 pages), Australian Patent Office, Woden ACT 2606, Australia.
United Kingdom Search Report for Great Britain Application No. 2101626.6, dated Jul. 30, 2021, (4 pages), South Wales, United Kingdom.
Extended European Search Report for United Kingdom Application No. 22749339.2, dated Nov. 22, 2024, 12 pages.

* cited by examiner

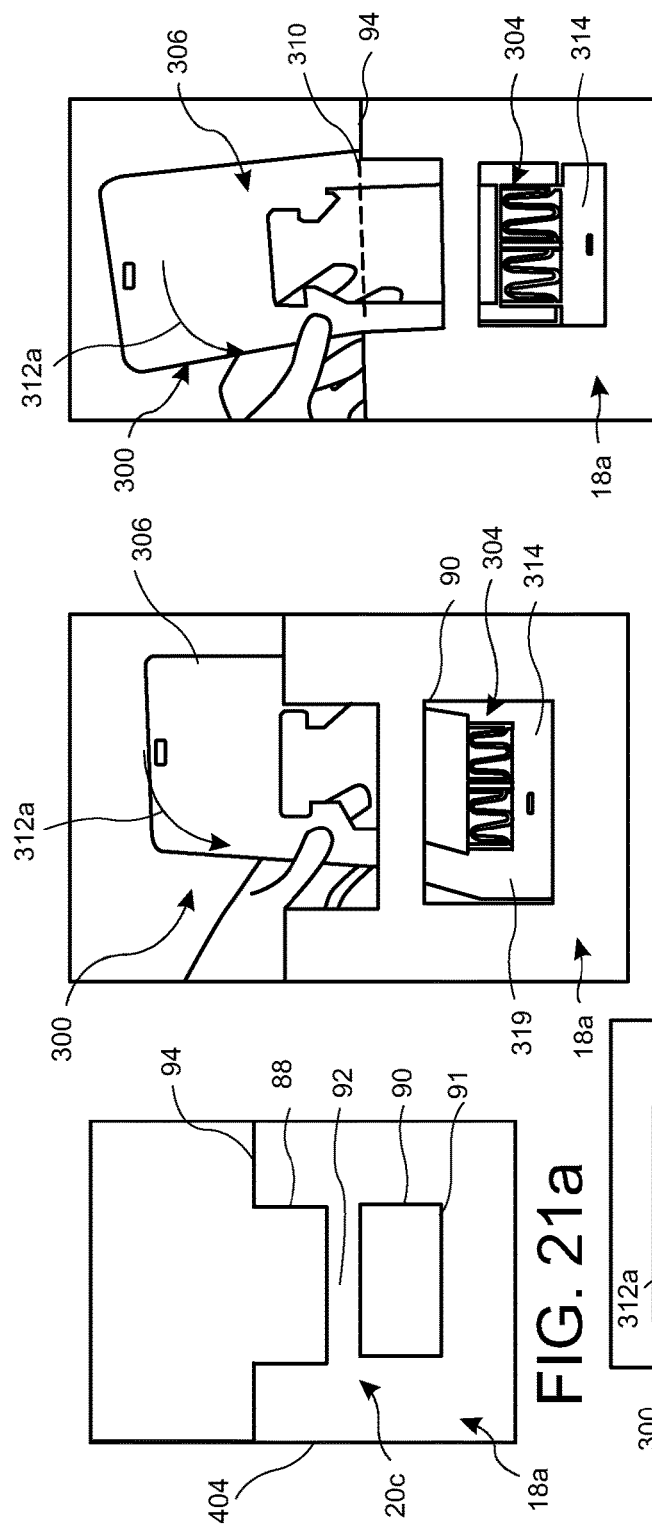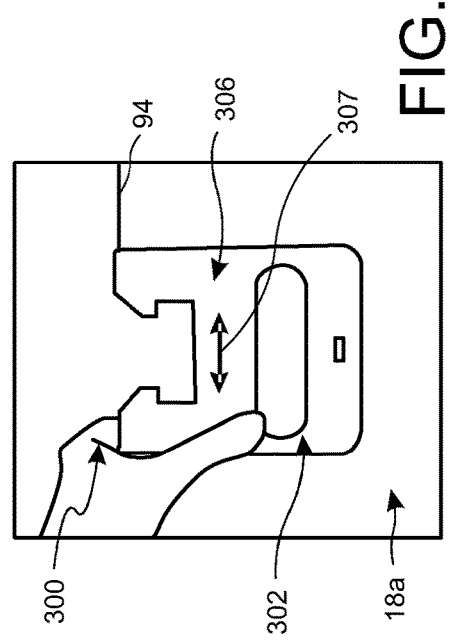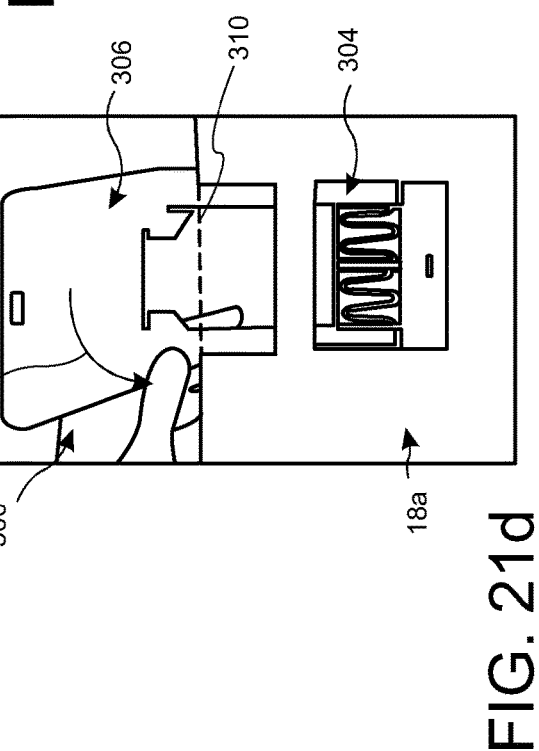

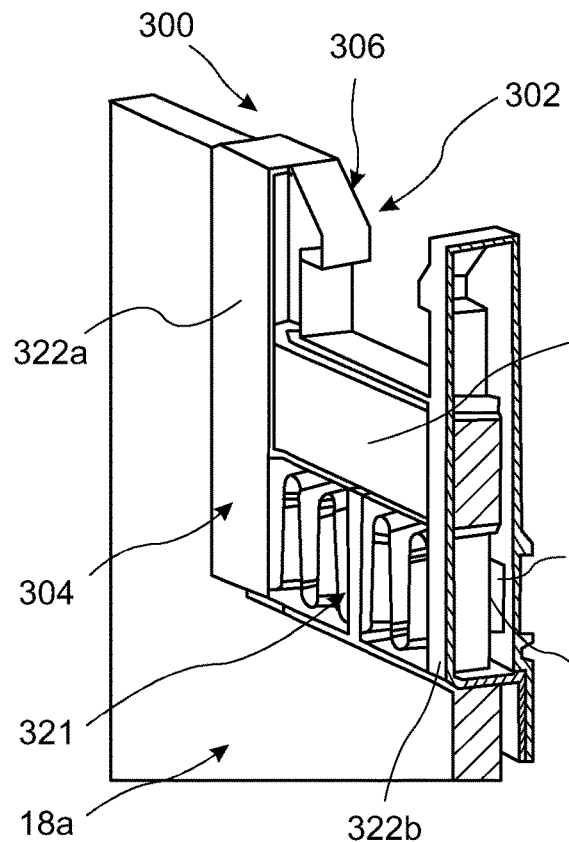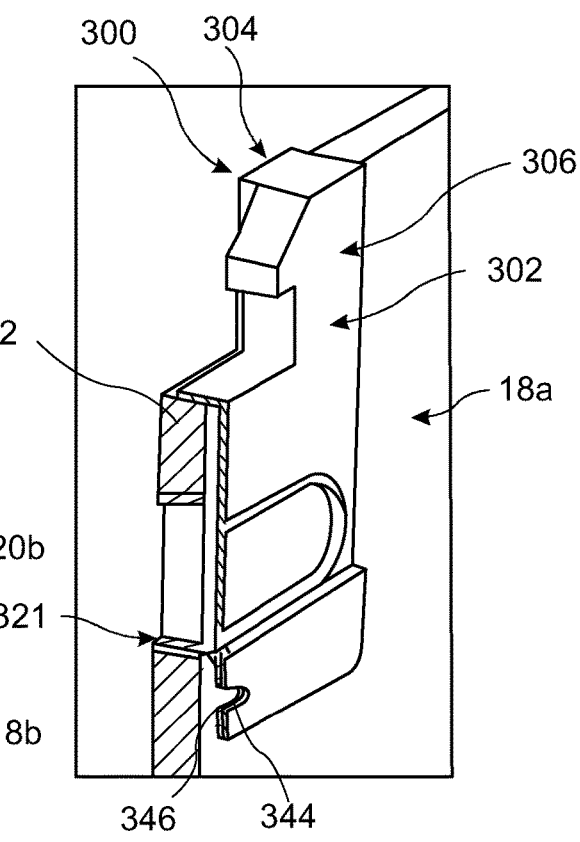
FIG. 23a    FIG. 23b
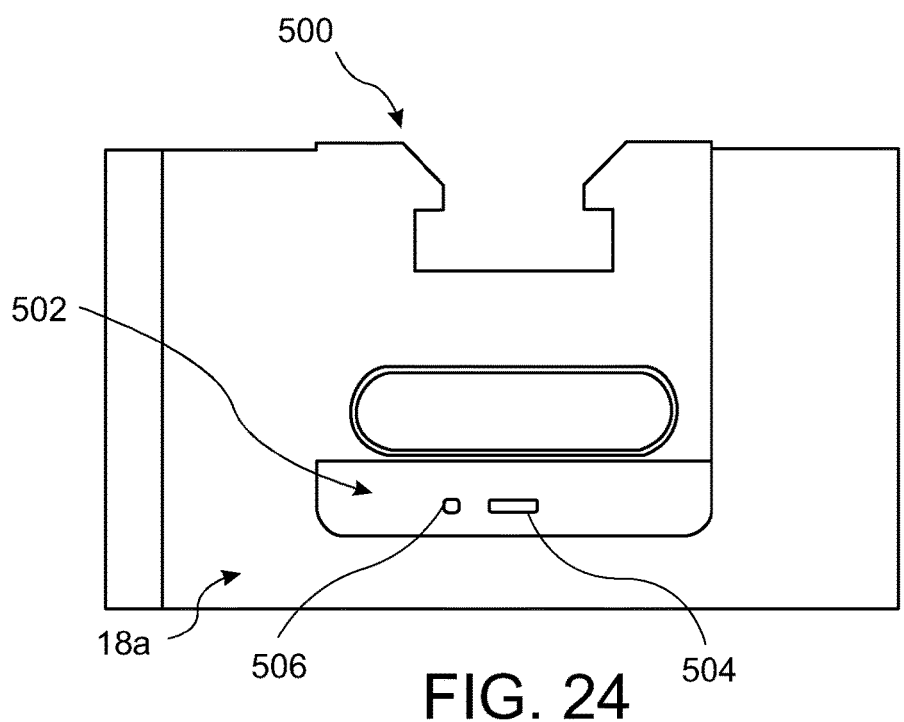
FIG. 24

CONTAINER LOCKING MECHANISM

CROSS REFERENCE TO RELATED APPLICATIONS

This application is a National Stage Application, filed under 35 U.S.C. § 371, of International Application No. PCT/IB2022/050997, filed Feb. 4, 2022, which international application claims priority to and the benefit of United Kingdom Application No. 2101626.6, filed Feb. 5, 2021; the contents of both of which as are hereby incorporated by reference in their entireties.

BACKGROUND

Related Field

The present invention relates to a container locking mechanism for a container, a container comprising the container locking mechanism, and various methods associated with said mechanism and container.

Description of Related Art

Containers are well known transportation devices which are used to transport goods across distribution networks. Said goods may include dry ingredients, components and packaging materials, and may include bulk goods. Containers used to transport bulk goods may be referred to as Intermediate Bulk Containers (IBC's). Containers used to transport components and packaging may be referred to as foldable large containers (FLC's). FLC's may be particularly beneficial when pooled (e.g. forming part of a group of reusable containers), improving the efficiency, and cost effectiveness, of reverse logistics in the supply chain.

Containers may be said to comprise a base, a body, and a lid. One variety of container is known as a sleeve container, whereby the body is a sleeve. The sleeve may be reusable, and define two sets of opposing walls. In an assembled state, the combination of the base, body and lid of the container define an enclosed space in which the contents of the container are stored. The container may be described as a freight container or a transportation container. In one example, the container may have a volume, or volumetric capacity, of around 700 litres, but a variety of sizes and geometries are otherwise available. For example, containers may have a volume of anywhere up to between around 1000 litres and around 1500 litres. The container body may be sized to correspond with a footprint of the base, which may be a modified pallet.

Although containers are known in the art, prior art containers fail to provide adequate security to avoid the contents of the container being accessed, and/or becoming contaminated, in transit. Furthermore, existing containers may be relatively difficult to assemble, and lack a user-friendly associated method of being able to connect the constituent components of the container together.

BRIEF SUMMARY

There exists a need to overcome one or more of the disadvantages associated with existing containers, whether mentioned in this document or otherwise.

According to a first aspect of the invention there is provided a container locking mechanism for a container, the locking mechanism comprising:

a fixed member providable on a body of the container; and a locking member moveable about the fixed member between a locked configuration and an unlocked configuration; and a biasing member configured to urge the locking member towards the locked configuration.

Container locking mechanism is intended to mean a locking mechanism, or device, for a container. For the purposes of this document, container is intended to refer to a transport, or freight, container. The container may be described as a container for transporting goods. Goods may include dry ingredients, raw materials, components and packaging materials (e.g. caps, pots, trays and closures for fast-moving consumer goods products), and may include bulk goods. The container may be a foldable large container (FLC).

The container may comprise a base, a body and a lid. The lid may otherwise be described as a cover or closure. The base may take the form of a pallet, modified to nest the body (e.g. sleeve) thereon once erected. The body may take the form of a sleeve (in the case of a sleeve container). The sleeve may comprise four walls arranged in a generally quadrilateral manner (e.g. two pairs of opposing walls). Open ends of the body may be closed by the base and lid. The body may be provided between the base and the lid. The body may directly engage both the base and the lid.

The fixed member refers to a part of the locking mechanism which does not move as part of the locking, and unlocking, of the mechanism. The fixed member may be referred to as a mounting member, fixed section, static section or a stationary member. The fixed member being providable on the body of the container is intended to refer to the fixed member being attachable to a body of the container, where the fixed member is a separate component to the body of the container, or that the fixed member forms part of the body of the container by virtue of it being integral with the body of the container. The fixed member may be attachable to the body of the container. The fixed member may form part of the body of the container. The fixed member may be described as being providable on a wall of the body of the container.

The locking member refers to a part of the mechanism which is moveable between an unlocked and a locked configuration. The locking member may be referred to as a movable member, moving member or a slidable member. The locking member may be an entirely separate component to the fixed member, or may, in some embodiments, be at least partly integral with the fixed member.

The locking member being moveable about the fixed member is intended to mean that the locking member can be moved, or repositioned, relative to the fixed member. The locking member may be slidable about the fixed member. The locking member being slidable about the fixed member may otherwise be described as the locking member being translatable relative to the fixed member, or slidable relative to the fixed member. The locking member may be slidable along the fixed member. The locking member being slidable about the fixed member is intended to mean that there is a linear motion of the locking member relative to the fixed member. The locking member being moveable between a locked configuration and an unlocked configuration may refer to the locking member being in two different linear positions relative to the fixed member. The locked configuration may be described as a neutral, central, or aligned position or configuration (relative to the fixed member). The unlocked configuration may be otherwise be described as the locking member being provided in a decentralised, or offset, position or configuration (relative to the fixed member).

The configuration in which the locking member is placed is broadly applicable to the overall locking mechanism. That is to say, where the locking member is in a locked configuration, the overall locking mechanism may be described as being in the locked configuration. Similarly, where the locking member is in the unlocked configuration, the locking mechanism may be said to be in an unlocked configuration.

The locking member may be configured to engage the lid, or the base, of the container in the locked configuration. Which of the lid or base the locking member engages, in the locked configuration, may depend on whether the locking mechanism is provided proximate the lid, or the base, on the body. The locking member may be configured to engage whichever of the lid, or the base, is proximate the container locking mechanism. For example, where the locking mechanism is provided proximate the lid (i.e. towards a top of the container/body), the locking member may be configured to engage the lid. Conversely, where the container locking mechanism is provided proximate the base, (i.e. towards a bottom of the container/body) the locking member may be configured to engage the base. Where the locking member is said to be configured to engage the lid or base, the locking member may, in some embodiments, engage a locking projection, pin, or peg, forming part of the lid or the base. Furthermore, it may be a hooked, or overhanging, portion of the locking member, and specifically a hooked or overhanging portion beyond a neck of an opening defined by the locking member, which engages the lid or the base in the locked configuration. It may be the case that a pair of hooked portions are provided as part of the locking member. Only one of the two hooked portions may engage the lid or base in the locked configuration.

When the locking member is in the locked configuration, the lid or base, and optionally the locking pin or projection thereof, may not be moved vertically past the hooked portion (or out of a retaining zone), through an opening defined by the locking member. This may specifically be when the lid or base contacts the body. Put another way, vertical separation, or relative vertical movement, between the body and the lid or base, is not possible. Described another way, the body cannot be lifted off of the base, or the lid lifted off of the body, when the proximate locking mechanism (specifically the locking member thereof) is in the locked configuration. In the locked configuration, the locking member may be configured to engage a locking projection of the lid or base.

When the locking member is in the unlocked configuration, the lid or base, and optionally the locking pin or projection thereof, may be moved vertically past the hooked portion (or out of the retaining zone), through the opening defined by the locking member. Put another way, vertical separation, between the body and the lid or base, is possible.

The container locking mechanism may form part of a standalone mechanism which is separate to the body of the container. That is to say, the container locking mechanism may be provided as part of a module, or insert, which is attached to the body of the container. Alternatively, and as mentioned above, at least part of the container locking mechanism, for example the fixed member, may form part of a body of the container. The locking mechanism may be assembled with only the fixed member being applied, or attached, to the body of the container (with the locking member, and optionally biasing member, already connected to the fixed member).

Advantageously, being able to secure the lid, or base, of the container to the body provides a more secure container with which to transport goods across a distribution network. The container locking mechanism advantageously means that the contents of the container cannot be accessed inadvertently. That is to say, the implementation of the container locking mechanism reduces the risk that the container part disassembles (i.e. the body coming away from either of the lid and/or the base) as it is moved across the distribution network. Furthermore, the container locking mechanism provides a low cost and low maintenance solution which, due to the slidable nature, does not require lubrication (as may be the case for a pivoting mechanism, for example).

The container locking mechanism can, where provided as separate insert, advantageously be applied to existing containers so as to provide a retrofitting functionality.

Advantageously, providing a locking mechanism reduces the risk that the contents of the container be spilled when at least part of the container is inclined. For example, some containers may use a frame to tilt the container to dispense all of the contents within the container. Such tilting provides a spill risk if the body is not securely attached to the lid and the base. Similarly, in some arrangements a container may use a base discharge mechanism in which the base of the container is effectively inclined, relative to the horizontal, so as to aid with the discharge of contents. Again, in order to provide a secure arrangement, without a significant risk of spill, the body can be securely attached to both the base and the lid. The container locking mechanism described herein provides this benefit.

The container locking mechanism is reusable in that the locking member can be slidable in and out of the locked and unlocked configurations to provide a multiple-use functionality. This is advantageous where the containers form part of a pool in which the containers are reused (i.e. are not single use).

Also advantageously, due to the sliding nature of the locking member, the action of bringing the lid, or base, and the body together can assist with the urging of the locking mechanism towards an unlocked configuration (i.e. such that the lid or base can be brought into engagement with the body).

The container locking mechanism also provides for a tool-less mechanism, the operation of which can be readily interpreted by an operator using the mechanism.

The locking member being biased towards the locked configuration is intended to mean that, without any application of external force, the locking member automatically returns to the locked configuration. This may be described as the locking member moving (e.g. sliding), relative to the fixed member, to a linear position in which the locking member engages the lid or the base of the container (although it will appreciated that this depends on the vertical position of the lid or the base). The locking member may therefore be said to be biased away from an unlocked configuration. The locking member may be said to be biased to the locking configuration.

The biasing member may be of the form of a spring or other elastically deformable element. The locking member may be biased towards the locked configuration by a plurality of biasing members e.g. a plurality of springs, such as a pair of springs. Where a pair of springs are used, both springs may cooperate to urge the locking member towards the locked configuration (e.g. in a push-pull arrangement). That is to say, when the locking member is slid towards an unlocked configuration (or outer position relative to the fixed member), one spring may be compressed whilst the other is tensioned. It will be appreciated that a variety of other biasing members may otherwise be incorporated, in a number of different configurations. The biasing members may be described as energised when in a state in which they store potential energy. For example, when they are tensioned or compressed.

Advantageously, the locking member being biased toward the locked configuration reduces the risk that the locking mechanism become unlocked accidentally in use. That is to say, the container locking mechanism may only be placed in the unlocked configuration upon an application of an external force (e.g. being urged towards an unlocked configuration by an operator).

Further advantageously, the locking member being biased towards the locked configuration may mean that, depending upon the geometry of the locking member, as the lid or base of the container is brought towards the body of the container, the locking member may undergo a camming action. In said camming action, the locking mechanism may be urged from the locked configuration towards the unlocked configuration (by interaction between surfaces of the locking member and the lid or base). Once the lid or base is in position (e.g. engaging the body), the locking mechanism may return automatically to the locked configuration (due to the force exerted by the biasing member). Put another way, a vertical motion of the lid or base relative to the body, without any force being applied the container locking mechanism, may result in the lid or base being snap fitted into engagement with the body, by virtue of the motion of the container locking mechanism. This is advantageous for the reason that no manual intervention of the locking mechanism may be required to secure the lid or base to the body, so that the lid or base can be connected to the body (otherwise described as installed or assembled) more easily (and potentially by an automated line).

The locking member may define an opening, and a locking projection of a lid or base of the container may be receivable by the opening.

The opening may otherwise by described as an aperture provided in an otherwise solid face (e.g. outer face) of the locking member. The locking projection of the lid or base being receivable by the opening may otherwise be described as the opening defining a range of travel with which the locking member can move relative to the locking projection. That is to say, the opening may define the range of motion, or limit the travel, of the locking member relative to the locking projection of the lid or the base.

At least part of the opening may be defined by a hooked portion which hooks, or retains, the locking projection of the lid or base. It may be said hooking or retaining which prevents a subsequent vertical removal of the lid, or base, when the mechanism, or locking member, is in the locked configuration.

Advantageously, the locking projection of the lid or base being receivable by the opening means that the locking member securely retains the locking projection when the locking member is in the locked configuration.

The opening may comprise an alignment zone and a retaining zone.

The alignment zone and retaining zone refer to different regions, or portions, of the opening. That is to say, when the opening is viewed normal to an outer face of the locking member, the alignment zone and retaining zone refer to differing extents of the overall opening geometry. As mentioned above, the opening geometry may refer to an at least partly undercutted geometry which would otherwise be a solid face of the locking member.

In preferred arrangements, the alignment zone is the outermost zone of the opening. That is to say, the alignment zone extends between two outer edges of the locking member. The alignment zone may therefore be the first portion of the opening in which the locking projection is received in use. The alignment zone may be so called because the geometry can be used to guide, or route, the locking member into a sliding position which allows the locking projection to be retained within the opening. That is to say, the locking projection may first engage a guiding surface of the alignment zone, when the locking mechanism is in the locked configuration, and continued vertical motion of the lid or base relative to the body may mean that the locking member is urged away from the locked configuration, towards the unlocked configuration, by virtue of a camming motion by the locking projection and the guiding surface. The alignment zone may terminate in a neck of the opening (i.e. a narrowest point of the opening in a direction of sliding).

The retaining zone may refer to a portion of the opening in which the locking projection is hooked or retained when the locking member is in the locked configuration. The retaining zone may be a generally rectangular zone. The retaining zone may extend horizontally outwardly beyond the neck of the opening (the opening thus defining a partly hourglass-shaped geometry).

The locking member may be urged in an energy storing direction (with reference to the biasing member) as the locking projection moves vertically along, or through, the alignment zone. The locking member may be urged in an energy releasing direction when the locking projection passes the neck of the opening and enters the retaining zone. It is at this point that the locking member may effectively snap back, or latch, such that the locking projection is hooked, or latched, within the retaining zone. The locking member is thus in the locked configuration.

Advantageously, the arrangement of the alignment zone and retaining zone means that the vertical motion of the lid or base relative to the body may urge the container locking mechanism out of a locked configuration, into an unlocked configuration, to receive the locking projection, and the mechanism subsequently return to a locked configuration to secure the lid or base to the body.

The alignment zone may be defined by one or more guiding surfaces.

The guiding surfaces may otherwise be referred to as alignment surfaces, inclined surfaces of tapering surfaces. Inclined surfaces refers to an incline relative to a horizontal, and preferably relative to a horizontal outer, or upper, edge of the locking member. That is to say, an inclination relative to the horizontal at the horizontal position where the locking projection first engages the locking member.

Preferably the alignment zone is defined by a pair of guiding surfaces, each of which are inclined relative to the horizontal, and which are directed inwardly towards a centreline of the locking device. That is to say, the pair of guiding surfaces may define a generally chevron-like geometry, which directs, or guides, the locking projection towards a centreline of the locking member. Where the locking projection is fixed in a horizontal plane, whereas the locking member can slide, it will be appreciated that the guiding surfaces effectively urge the translation, or sliding, of the locking member.

The one or more guiding surfaces may terminate at a neck of the opening.

The one or more guiding surfaces may be inclined surfaces which define a neck of the opening.

The one or more guiding surfaces may be a pair of inclined surfaces. The pair of inclined surfaces may taper inwardly towards a centreline, or inner region, of the locking member.

The neck defines a narrowest point of the opening. The neck may be defined by vertical, or substantially vertical, walls or surfaces. A combination of the neck and the retaining zone may define the hooked portion. This, in turn, may define one or more undercut geometries (e.g. an internal corner), or a recess. The locking projection may be latched, retained or hooked by said hooked portion. The locking projection may be secured in an upper corner of the retaining zone.

The fixed member may comprises one or more clips, the one or more clips being configured to engage the body of the container.

The fixed member may comprise a plurality of clips. The clips may refer to elastically deformable hooked members which are biased towards a retaining configuration. These can otherwise be referred to as snap fitting hooks or tabs. Preferably the fixed member comprises a plurality of clips, at least one of which is provided facing in opposing directions along the fixed member. Preferably the clips are provided in a two by two arrangement i.e. two clips facing upwards and two clips facing downwards. The clips are preferably received by a rectangular aperture or opening defined in a split cavity on the wall of the body. As well as the fixed member comprising one or more clips, the locking member may also, or alternatively, comprise one or more clips. Advantageously, the clips can be used to limit the travel of the fixed member and/or the locking member in a direction normal to the body, or wall, of a container. That is to say the clips can be used to prevent the locking member and/or fixed member being pulled away, or withdrawn from, the body. Furthermore, the clips achieve this whilst still allowing the sliding, or translating, motion of the locking member relative to the fixed member.

Advantageously, the clips can be used to readily attach the fixed member to the body. The elastically deformable nature of the clips can also mean the installation is tool-less and so the locking mechanism can be installed without the need for specialist tools (merely a force to urge the components of the mechanism into engagement with the body, to elastically deform the clips). The clips can also be elastically deformed so as to be able to remove the locking mechanism subsequently, following installation, if desired.

Further advantageously, the clips may be integrally formed with the fixed and/or locking member so that each of the components can be manufactured with the clips already provided in situ.

The locking member may comprise first and second hingeably connected elements.

A hinged portion may be provided between the first and second hingeably connected elements. The hinged portion may comprise one of more hinges, and optionally one or more pairs of hinges. The hinges may be living hinges.

The first and second hingeably connected elements may, in use, be rotatable about an axis. The first and second hingeably connected elements may be securable together. The first and second hingeably connected elements may be securable together when the elements are provided in a rotated configuration, or when they are in facing relations with one another. Once secured together, the first and second hingeably connected elements may define a closed loop which secures the locking mechanism to the body of the container in a direction normal to the outer face of the container. That is to say, the locking mechanism may be substantially prevented from being pulled off of the body.

The locking mechanism comprises one or more anti-tamper features.

Anti-tamper features refer to a feature which prevents the locking member being placed into an unlocked configuration once the locking member has been secured in the locked configuration. The anti-tamper features may therefore provide a functionality which secures the locking member in position, substantially preventing its movement once in position.

Advantageously, the anti-tamper features provide a means of being able to see whether or not the locking mechanism has been unlocked during transit, and particularly as the container moves through the supply chain. This improves the security around the content of the container as it passes through the distribution network. Anti-tamper features can also provide a further line of defence against the lid or base being removed from the body (i.e. the container being at least partly dissembled which may otherwise risk leakage of the contents therein.

The anti-tamper functionality may be provided by a combination of the one or more anti-tamper features forming part of the mechanism, and a further component. The further component may be referred to as an anti-tamper component. The anti-tamper component may include, for example, a strap, or other securing means, for example a cable tie. The anti-tamper component may be an anti-tamper mechanism.

Advantageously, the anti-tamper features reduce the risk of contamination of, and/or interference with, the contents of the container throughout the distribution network.

Each of the fixed member and the locking member may comprise an anti-tamper feature in the form of an aperture.

The aperture may otherwise be described as a cavity or opening. The aperture is preferably a closed geometry (i.e. it is bound by material on all sides in two dimensions). In its simplest form the anti-tamper feature may simply be a square, rectangular or other closed shape (i.e. polygon).

The aperture on the fixed member and the aperture on the locking member may be identical to one another. That is to say, they may be exactly the same in both shape and size. Alternatively, there may be variations between the two (e.g. the aperture of the locking member may be smaller than the aperture of the fixed member).

The anti-tamper features being apertures are straightforward and readily manufacturable features. Furthermore, the anti-tamper functionality can be provided by a range of different further components (e.g. straps and cable ties as mentioned above). By providing the anti-tamper feature in both the fixed member and the locking member, the relative motion between the two, required for the locking member being able to move between the locked and unlocked configurations, may be prevented.

Each of the locking member and fixed member may comprise a plurality of apertures, defining a plurality of sets of apertures. Each set of apertures may have a different geometry to the other, facilitating the use of different anti-tamper components with the locking mechanism.

Advantageously, the anti-tamper features being apertures also provides a visual indicator of whether the locking member is in the locked or unlocked configuration. That is to say, when the locking member is in the locked configuration e.g. neutral and/or central position, the apertures may overlap and therefore be configured to receive an anti-tamper component therethrough. However, when the locking member is in an unlocked configuration, e.g. a decentralised or offset position, the anti-tamper features may not overlap one another. Evidence of tampering (e.g. the removal of an anti-tamper component) is also provided by virtue of the incorporation of the anti-tamper features.

The apertures of the fixed member and the locking member may overlap in the locked configuration.

Providing the apertures of the fixed member and the locking member so that they overlap in the locked configuration may mean that one of the apertures is entirely encircled, or bound, by the other aperture. Alternatively, the two apertures may entirely overlap such that the perimeters of the apertures are substantially identical to one another in a plane normal to the body of the container.

Having the apertures overlap in the locked configuration advantageously means that an anti-tamper component can be readily received through both apertures so as to secure the locking member in the locked configuration and thus prevent the desired opening of the container in transit.

The fixed member may comprise a pair of track projections.

As suggested by the name, the track projections may be said to define a track or linear guide along which the locking member travels. The pair of track projections thus guide the movement of the locking member. The pair of track projections may be said to limit the vertical movement of the locking member. The pair of track projections may define the limits of vertical travel of the locking member (relative to the fixed member). Each of the track projections may be a generally linear projection. Each of the track projections, of the pair of track projections, may effectively define a flange of an I-shaped beam structure. The track projections may be separated by a web projection. One or more clips may be provided on, and so extend from, each of the track projections. The track projections may limit, or substantially prevent, any twisting motion of the locking member. The track projections may be said to constrain the movement, motion or travel of the locking member.

The track projections may otherwise be described as rails. The locking member may be said to comprise a plurality of track projections. The track projections may be described as sleeve positioning guides.

Advantageously, the track projections define an effective linear guide of the locking member which constrains the travel of the locking member in use. This reduces the risk that the locking member could become jammed due to an unintended movement relative to the fixed member.

The track projections may be separated by a web projection.

As suggested by the name, the web projection defines a web of an I-shaped beam in cross section, when taken in combination with the pair of track projections. The combination of the two track projections and the web projection may therefore define an I-shape in cross section. The web projection may be a substantially vertical projection. The web projection may comprise a pair of vertical projections.

The web projection may be provided in a central position along the pair of track projections. That is to say, the web projection may substantially bisect each of the track projections.

Advantageously, the web projection provides an improved structural robustness of the track projections. That is to say, the presence of the web projection reduces the risk of the track projections becoming damaged in use.

The biasing member may engage the web projection.

The biasing member engaging the web projection may otherwise be described as the web projection providing an end stop functionality. The engagement may otherwise be described as contact or abutment.

Advantageously, the biasing member engaging the web projection means that the biasing member can be energised (i.e. store energy) when the locking member moves relative to the fixed member. Where the web projection substantially bisects the track projections, and a plurality of biasing members are incorporated, one biasing member being provided at either side of the web projection, one biasing member may be compressed when the locking member is moved to an unlocked configuration, whilst the other biasing member is tensioned by the same extent. This provides a further recentering, or biasing, force, which is balanced at either side of the web projection.

The locking member may comprise one or more guiding projections, the one or more guiding projections engaging the pair of track projections.

The one or more guiding projections may be referred to as stablishing projections or limiting projections. The one or more guiding projections may be substantially vertically extending projections. The one or more guiding projections may have a vertical extent which is substantially equal to a vertical extent of the web projection. That is to say the one or more guiding projections may have a vertical extent which is substantially equal to a separation between the pair of track projections. In such embodiments, the guiding projections may fit, or be nested, between the track projections so as to define part of a linear guide which substantially prevents vertical movement of the locking member relative to the fixed member. A combination of the guide projections and the track projections may define a linear guide.

The one or more guiding projections engaging the pair of track projections may be described as the guiding projections contacting or abutting the pair of track projections. The one or more guiding projections may be said to be seated between the pair of track projections. Where a plurality of guiding projections are incorporated, one guiding projection may be provided at either side of the web projection between the track projections. The web projection may thus provide a travel limit, of the locking member, relative to the fixed member.

The pair of track projections, the web projection and the one or more guiding projections may cooperate to define a cavity in which the biasing member is received.

The cavity may otherwise be described as a recess or a generally enclosed perimeter. The cavity may be quadrilateral in cross section. The cavity may be square or rectangular, and may transition between the two depending upon the linear position of the locking member. Because the cavity is defined by the web projection and the one or more guiding projections, the one or more guiding projections sliding with the locking member, it will be appreciated that the cavity geometry may vary depending upon the linear position of the locking member. This may otherwise be described as the cavity geometry depending upon whether the locking member is provided in an unlocked configuration or in a locked configuration.

In some embodiments, the pair of track projections may define upper and lower sides of the quadrilateral of the cavity, and the web projection and one guiding projection may define vertical sides. The cavity defined may have a depth (i.e. normal to a plane of the body of the container) which is at least equal to a depth of the biasing member. The cavity may therefore have a depth which is greater than the depth of the biasing member.

Advantageously, the biasing member being received within the cavity may mean that the biasing member is surrounded around its perimeter (or surrounded on all sides). This may advantageously mean that the biasing member is at least partly enclosed, or entirely enclosed around its perimeter, which may reduce the risk that the biasing member become damaged or dislodged in use. In other words, the pair of track projections, the web projection, the one or more guiding projections and the web projection may define a shield or a barrier of sorts around the biasing member.

In some embodiments, where there are a plurality of biasing members, a plurality of cavities may be defined, and preferably a pair of cavities, one biasing member being received in a respective cavity. In such arrangements, it may be the case that the locking member comprises a pair of guiding projections, and one of each of the pair of guiding projections defines an outer side of each of the respective cavities. That is to say, the pair of track projections, the web projection, and the pair of guiding projections may effectively define two cavities, biasing members being received in each of the respective two cavities.

According to a second aspect of the invention there is provided a container for transporting goods, the container comprising:
 a base;
 a body;
 a lid; and
 the container locking mechanism according to the first aspect of the invention, the fixed member of the container locking mechanism being provided on the body;
 wherein in the locked configuration the container locking mechanism secures the base, or the lid, to the body.

Container is intended to refer to a transport, or freight, container. The container may be described as a container for transporting goods. Goods may include dry ingredients, raw materials, components and packaging materials (e.g. caps, pots, trays and closures for fast-moving consumer goods products), and may include bulk goods.

The body may take the form of a sleeve (in the case of a sleeve container). The sleeve may comprise four walls arranged in a generally quadrilateral manner (e.g. two pairs of opposing walls).

As mentioned above, the container locking mechanism being provided on the body may mean that the container locking mechanism is attached to the body, or that at least part of the container locking mechanism forms part of the body.

The container locking mechanism securing the base or lid to the body may otherwise be described to as the base or the lid being locked to, or affixed to, the body.

Advantageously, a container comprising the container locking mechanism can transport the contents more securely due to a reduced risk that either the lid or base of the container becomes detached from the body in use. In other words, the container can be more reliably secured in a locked configuration during transit.

The container may comprise a plurality of container locking mechanisms.

The container comprising a plurality of container locking mechanisms is intended to mean that the container comprises at least two arrangements of respective fixed member and locking member. The container preferably comprises eight container locking mechanisms, four proximate the lid and four proximate the base.

All of the container locking mechanisms may be provided on a single wall. A wall which opposes the single wall may not comprise any container locking mechanisms.

The body may comprise two pairs of opposing walls, each wall of one pair of opposing walls comprising a plurality of container locking mechanisms.

The two pairs of opposing walls is intended to refer to two sets of walls which generally face one another. For example the geometry defined by the walls in a plan view may be square or rectangular. Rounded corners or edges may be provided between the opposing walls.

Each wall of one pair of opposing walls comprising a plurality of locking mechanisms is intended to mean each individual wall of a single set of two walls, which face one another, comprising a plurality of locking mechanisms. This may otherwise be described as each wall of the other pair of opposing walls not being provided with any container locking mechanisms thereon. That is to say, one pair of opposing walls may not comprise any container locking mechanisms whatsoever. All container locking mechanisms of the container may be provided as part of, or on, two opposing walls only.

Advantageously, each wall of one pair of opposing walls comprising a plurality of container locking mechanisms reduces the need to have different operators stood at different sides of the container. For example, if locking mechanisms were provided at each wall of the container, it may be awkward or difficult to simultaneously urge all locking mechanisms towards an unlocked configuration to vertically separate the lid or base from the body. Advantageously, a single operator can grip two (for example) locking mechanisms and urge them to an unlocked configuration. The lid (for example) can then be removed (where the container has only two locking mechanisms proximate the lid) by the single operator at one side of the container. The contents of the container may then be removed (e.g. by using a dropdoor), before the lid is replaced (and anti-tamper components installed to secure the container in a tamper-proof manner).

Each wall of the one pair of opposing walls may comprise, provided thereon:
 a plurality of locking mechanisms proximate the base; and/or
 a plurality of locking mechanisms proximate the lid.

Locking mechanisms being provided proximate the base is intended to mean that the locking mechanisms are at least provided at, or on, a lower half of the body, and are preferably provided such that an outermost end (i.e. a lowermost end) of the locking mechanism lies substantially flush with a lowermost surface of the body.

The locking mechanisms being provided proximate the lid is intended to mean that the locking mechanisms are provided at least at, or on, the top half of the body, and preferably such that an outermost end (i.e. an uppermost end) of the locking mechanism is substantially flush with an uppermost surface of the body.

Put another way, the locking mechanisms being provided proximate the base or the lid may mean that the locking mechanisms define at least part of an outer surface of the body adjacent said base or lid. The outer surface may be the surface of the body which engages, or is engaged by, the respective base or lid. The walls may be referred to as sidewalls.

Advantageously, providing locking mechanisms both proximate the base and the lid means that the body can be secured to the base and the cover using the locking mechanisms. That is to say, as well as facilitating the lid being secured to the body of the container, the locking mechanisms can also provide the functionality that the body be secured to the base.

Using the same locking mechanisms to secure the lid and the base to the body is advantageous for reasons for simplicity and reduced operator training.

In an advantageous arrangement, of the one pair of opposing walls, one wall comprises a plurality of locking mechanisms only proximate the base, and the other wall comprises a plurality of locking mechanisms only proximate the lid. In effect, one wall only has locking mechanisms proximate a top of the wall, and the other wall only has locking mechanisms proximate a bottom of the wall. A reduced number of locking mechanisms can therefore be used to still provide the functionality that the body is secured to the base, and the lid be securable to the body. The locking mechanisms may be said to be provided diagonally opposite one another across the body. Other retention, or securing, means may be used to affix each wall to the base/lid where the wall does not comprise a locking mechanism in that position.

The fixed member of each container locking mechanism may be attached to a respective support web which extends across a respective cavity in the body to define a respective split cavity.

The support web refers to a bar or portion of material which extends between and otherwise open cavity. When viewed normal to a plane of the container body, the combination of the cavity and the support web define a H-shaped geometry. Split cavity refers to the cavity effectively being split in two by the presence of the support web which extends thereacross. The cavity may be split in half by the support web, or just divided into two portions (which may be different sizes). The split cavity may comprise an outer cavity, proximate an outer surface of the body, and an inner cavity, proximate a horizontal centreline of the body.

Advantageously, the support web provides material with which the fixed member, where it is attached to the body as a separate piece, can grip or be secured to the container body. At the same time, the otherwise vacant cavity provides space for the various projections, and the biasing member, of the container locking mechanism to fit and function (i.e. move relative to one another). The locking projection of the base or lid can also be received at least partially within the split cavity (e.g. in at least the outer cavity thereof). The locking projection can thus be received vertically without fouling on, or interfering with, the outermost edge of the body.

According to a third aspect of the invention there is provided a method of installing the container locking mechanism according to the second aspect of the invention, the method comprising placing the first hingeably connected element in contact with the body, urging the second hingeably connected element towards the first hingeably connected element, over an edge of the body, and securing the first and second hingeably connected elements together.

Placing the first hingeably connected element in contact with the body may specifically comprise inserting a flange through the inner cavity of a split cavity. The urging may be rotational urging. The first and second hingeably connected elements may be secured together to form a closed loop of material. The first and second hingeably connected elements may be secured together by a frictional fit, or interference fit. Securing features include tabs receivable by recesses or, more generally, engagement features receivable by receiving features.

The edge may be an outer edge i.e. an upper or lower edge of the body.

According to a fourth aspect of the invention there is provide a method of installing the container locking mechanism according to the second aspect of the invention, the method comprising urging the container locking mechanism towards the body of the container to bias the one or more clips into engagement with the body to attach the fixed member to the body of the container.

Urging the container locking mechanism towards the body of a container may otherwise be described as forcing the container locking mechanism towards the body of the container, or simply providing the container locking mechanism in engagement with the body of the container.

Biasing the one or more clips into engagement may include elastically deforming the clips around the adjacent, or corresponding, edge of the body. Said part of the body may be, or include, a support web of a split cavity. The clips may comprise tapered surfaces in order to urge the clips outwardly around a surface which is to be engaged as the container locking mechanism, and so clips, are urged against the surface.

Advantageously, the aforementioned method of installation may be a tool-less method that does not require any specialist tools. Furthermore, the one or more clips may be elastically deformable such that the container locking mechanism could subsequently be removed from the container if desired, or if required for reasons of maintenance, for example.

It will be appreciated that, in other embodiments, the fixed member may form part of the body of the container. In such embodiments, no clips may be required to attach the fixed member to the body.

According to a fifth aspect of the invention there is provided a method of assembling the container locking mechanism according to the first aspect of the invention, the method comprising:
 i) providing the fixed member and locking member in slidable engagement with one another; and
 ii) placing a biasing member in engagement with both the fixed member and the locking member.

The slidable engagement may otherwise be described as moveable engagement or linearly engageable. Providing the fixed member and locking member in engagement with one another may otherwise be described as assembling the fixed member and the locking member, or placing the fixed member or locking member in contact with one another.

Placing the biasing member in engagement with both the fixed member and the locking member may otherwise be described as installing the biasing member.

Advantageously, assembling the container locking mechanism as specified above means that the locking mechanism can be retrofitted to existing container bodies.

According to a sixth aspect of the invention there is provided a method of disengaging the lid, or the base, from the body of the container according to the second aspect of the invention, the method comprising:
 i) urging the locking mechanism into an unlocked configuration; and
 ii) separating the lid, or the base, from the body.

Urging the locking mechanism into an unlocked configuration may include urging the locking member into an unlocked configuration, or towards an unlocked configuration. Urging the locking mechanism into an unlocked configuration may further comprise urging the locking mechanism towards an outer linear position relative to the fixed member. Urging the locking mechanism into the unlocked configuration may mean that relative vertical movement between the body and the lid or the base of the container is then possible (due to a locking projection of the base or lid no longer interfering with a hooked portion, or latching portion, of the locking member).

Separating the lid or base from the body may otherwise by described as there being relative vertical movement between the lid or the base of the body. The separation may include detaching the lid or the base from the body such that there is no longer contact between the lid or the base and the body. The lid may be lifted away from, or raised off of, the body. The body may be lifted away from, or raised off of, the base.

Advantageously, disengaging the lid or base as described above reduces the risk that the lid or base be inadvertently disengaged during use. Put another way, by having to urge the locking mechanism into an unlocked configuration, away from a locked configuration, external force needs to be applied in order to release the locking mechanism (to allow the removal of the lid or the base from the body).

The method may comprise an initial step of removing an anti-tamper component from the locking mechanism. Removal of said anti-tamper component may allow relative movement between the locking member and fixed member. Put another way, removal of the anti-tamper component may enable the locking mechanism to be placed in an unlocked configuration.

According to a seventh aspect of the invention there is provided a method of securing the lid, or the base, to the body of the container according to the second aspect of the invention, the method comprising:
i) urging the lid, or the base, and the body together, the movement urging the locking mechanism away from a locked configuration, towards an unlocked configuration;
ii) continuing to urge the lid, or the base, and the body together; and
iii) the locking mechanism automatically returning to the locked configuration, under action of the biasing member, to secure the lid, or the base, to the body.

Urging the lid or the base and the body together may be described as forcing the lid or the base and the body together. This may otherwise be described as reducing a separation, or offset, between the lid or the base and the body. The movement urging the locking mechanism away from the locked configuration may begin when a locking protection of the lid or the base first engages a guiding surface of the locking member. The movement urging the locking mechanism away from a locked configuration may otherwise be described as a camming motion, or camming action, of the locking member towards the unlocked configuration.

Continuing to urge the lid of the base and the body together refers to a continued reduced vertical separation of the lid, or the base, and the body once the locking mechanism is provided in an unlocked configuration (in which the locking projection of the lid or the base can move vertically through the locking member, specifically the opening thereof). After this position the locking member may snap into a locked configuration as the locking projection passes the neck of the opening.

The locking mechanism automatically returning to the locked configuration is intended to mean that the locking mechanism returns to the locked configuration without manual intervention. Under action of the biasing member is intended to mean that energy stored by the biasing member is then released in order to move the locking member from the unlocked configuration to the locked configuration. This may otherwise be described as the biasing member becoming de-energised, or releasing the energy previously stored by the biasing member. Securing the lid or the base to the body may otherwise be referred to as fixing or retaining the lid or the base on the body, substantially preventing any further vertical movement once the locked configuration is reached.

Advantageously, the locking mechanism being urged away from the locked configuration by movement of the lid or the base of the container means that during assembly or sealing of the container, no manual intervention may be required in order to actuate the locking mechanism. That is to say, the locking mechanism may be transitioned from the locked configuration to the unlocked configuration, and then back to the locked configuration, by virtue of only the vertical movement of the lid or the base relative to the body. This may reduce an operator requirement when the container is being assembled or sealed. This may also facilitate an automated assembly and/or sealing of the container. Sealing of the container may otherwise be described as placing the lid on the container.

The method may further comprise inserting an anti-tamper component through apertures in the locking member and fixed member. The apertures may overlap with one another in the locked configuration. Inserting the anti-tamper component through the apertures may secure the locking mechanism in the locked configuration until the anti-tamper component is removed, and provide evidence of tampering during the transit of the container.

According to a eighth aspect of the invention there is provided a method of securing the lid, or the base, to the body of the container according to the second aspect of the invention, the method comprising:
i) urging the lid, or the base, and the body together whilst the locking mechanism is in an unlocked configuration; and
ii) returning the locking mechanism to the locked configuration to secure the lid, or the base, to the body.

Urging the lid or the base and the body together whilst locking mechanism is in an unlocked configuration is intended to mean that the locking mechanism be manually urged towards the unlocked configuration and whilst the lid or the base are brought vertically towards the body.

Returning the locking mechanism to the locked configuration may be automatic or may be manual. Advantageously, being able to secure, by a locked means, the lid or the base to the body reduces the risk that the container become unsealed, or disassembled inadvertently, in use, reducing the risk of contamination of the contents held therein.

The optional and/or preferred features for each aspect of the invention set out herein are also applicable to any other aspects of the invention.

BRIEF DESCRIPTION OF THE FIGURES

Specific embodiments of the present invention will now be described, by way of example only, with reference to the accompanying drawings in which:

FIG. 3b is a perspective view of a rear, or inner face, of the container locking mechanism of FIG. 3a;

FIG. 4a is a perspective view of a front, or outer face, of a locking member of the locking mechanism shown in FIGS. 3a and 3a;

FIG. 4b is a perspective view of a rear, or inner face, of the locking member of FIG. 4a;

FIG. 5b is a perspective view of a front, or outer face, of the fixed member of FIG. 5a;

FIG. 15b is a magnified view of an area of interest of an exterior of the assembled container shown in FIG. 15a;

FIGS. 21a-e illustrate a method of installing the locking mechanism of FIG. 19 on a body of a container;

FIGS. 23a and 23b are perspective cross section views of the locking mechanism, of FIGS. 22a and 22b, installed on a body of a container; and FIG. 24 is an external view of a locking mechanism, according to a further embodiment, installed on a first wall of a container.

DETAILED DESCRIPTION OF VARIOUS EMBODIMENTS

Figure 1:
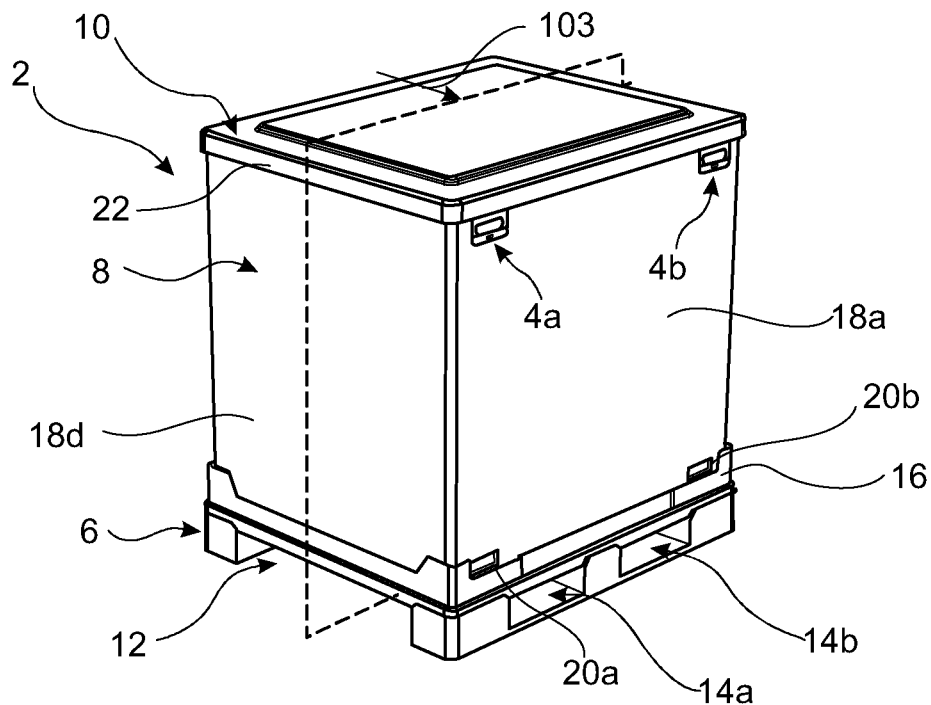
FIG. 1 is a perspective view of a container comprising two locking mechanisms according to embodiment of the present invention.

FIG. 1 is a perspective view of a container 2 comprising two locking mechanism 4a, 4b according to an embodiment of the present invention. The container 2 comprises a base 6, a body 8 and a lid 10.

The base 6, in the illustrated embodiment, takes the form of a (modified) pallet, which may be referred to as a pallet base. The base 6 comprises a plurality of openings 12, 14a, 14b configured to receive tines of a forklift, or pallet truck, therethrough. The base 6 further comprises a lip 16 which extends around the base 6 and is configured to engage an outer surface of the body 8. The lip 16 therefore facilitates with locating the body 8 relative to the base 6. The pallet base may be a Euro or ISO pallet base, such as a quarter or half size pallet base. The illustrated base 6 is a modified 1208 Euro pallet base i.e. a Euro pallet base having dimensions 1200 mm×800 mm. The base 6 could otherwise be a full-size ISO pallet base having dimensions 1200 mm×1000 mm. Alternatively, the base 6 may be a full size, or fractional (e.g. quarter or half-size pallet) pallet base, in accordance with any other global footprint (e.g. a North American, or Australian, footprint pallet). Where the base 6 is a pallet base, the pallet base is preferably a modified pallet comprising features to nest, or receive, the body 8 thereon once the container 2 is erected.

Turning to consider the body 8 of the container 2, for the purposes of this document the body 8 refers to a portion of the container 2 which is provided between the base 6 and the lid 10. In the illustrated embodiment the body 8 takes the form of a sleeve. The body 8 comprises four walls, 18a, 18d, only two of which are visible in FIG. 1 (but all of which are at least partially visible in FIG. 2). Returning to FIG. 1, the body 8 comprises a first pair of opposing walls, of which the wall 18a forms part. The body 8 further comprises a second set of opposing walls, of which the other visible wall 18d forms part. The body 8 is generally quadrilateral in cross section, so as to define a square or rectangular cross section in some embodiments. Despite the generally quadrilateral nature of the body 8, it will be appreciated that filleted, or chamfered, corners, or edges, may be provided between the various walls. The sleeve may be a plastic corrugated structure which provides a semi-rigid enclosure to contain a load within the container 2. However, in other embodiments the body 8 may be integral with the base 6 (i.e. not detachable therefrom, as per the illustrated embodiment).

As shown in FIG. 1, two locking mechanism 4a, 4b are installed on the first wall 18a of the body 8. The container locking mechanisms 4a, 4b may described as provided, or providable, on the body of 8 of the container 2. In FIG. 1 the locking mechanisms 4a, 4b are provided proximate the lid 10. Also visible in FIG. 1 are parts of two split cavities 20a, b, provided in the first wall 18A proximate the base 6. As shown in FIGS. 7-10b, and FIG. 13, the split cavities 20a, 20b are so called because they are effectively defined by a single cavity divided by a support web 92 (see, for example, FIG. 8b). As mentioned, this will be described in more detail later in this document. In the illustrated embodiment, the locking mechanisms 4a, 4b attach to the body 8, specifically the wall 18a thereof, via equivalent split cavities 20a, 20d (see split cavities 20c, d in FIG. 13).

Returning to FIG. 1, the container 2 further comprises the lid 10. The lid 10 extends around a top, open face of the body 8 and, when in situ, seals the container 2 and the contents therein. The lid 10 may otherwise be described as a cover or closure. The lid 10 comprises a skirt 22. The skirt 22 extends downwardly around a perimeter of the lid 10. The skirt 22 partly extends over, and along, an outer surface of the body 8 of the container 2 so as to ensure a reliable seal of the container 2 when the lid 10 is secured in position.

Figure 16:
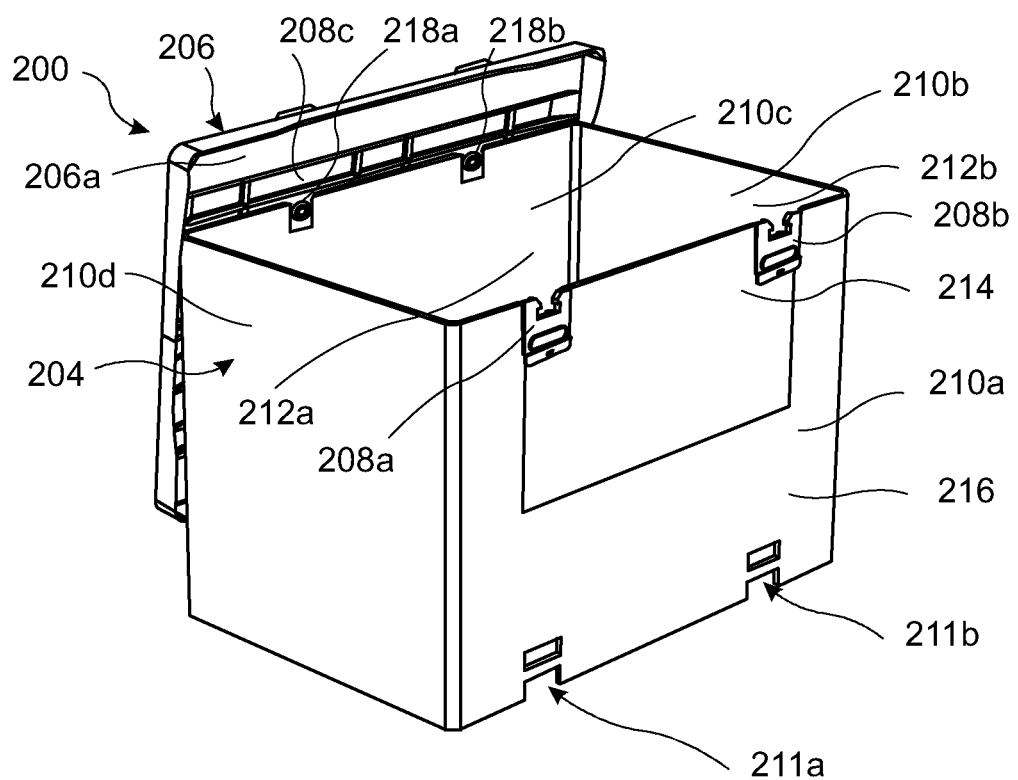
FIG. 16 is a perspective view of a container according to another embodiment.

As is shown in FIG. 16, in connection with another embodiment, the lid may be attachable or connectable to, e.g. hangable from, the body even when the container is 'open' (i.e. when the internal volume of the container is exposed, and not sealed). Advantageously, such functionality reduces the risk of cross-contamination of the lids (i.e. a mixing of lids, which may belong to containers transporting different goods) and component loss.

Figure 9A:
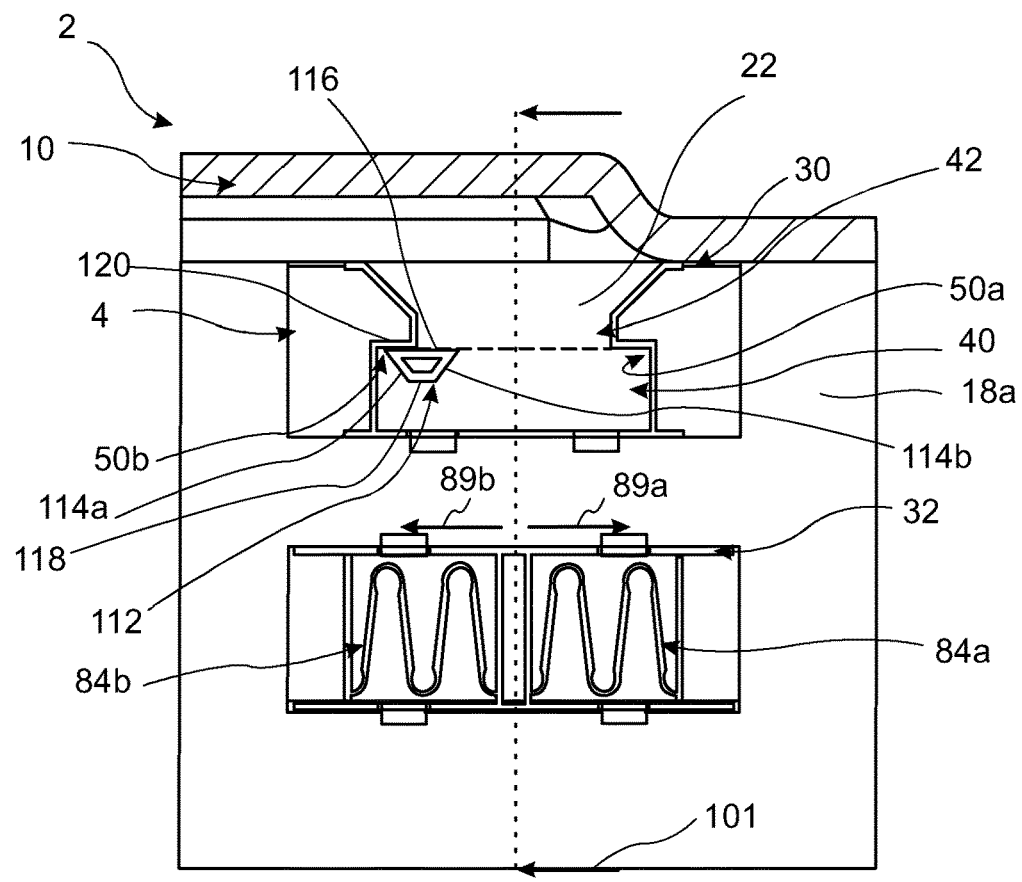
FIG. 9a is a rear view of the installed locking mechanism of FIG. 8a, in the locked configuration, interacting with a part-cutaway lid of the container.
Figure 10A:
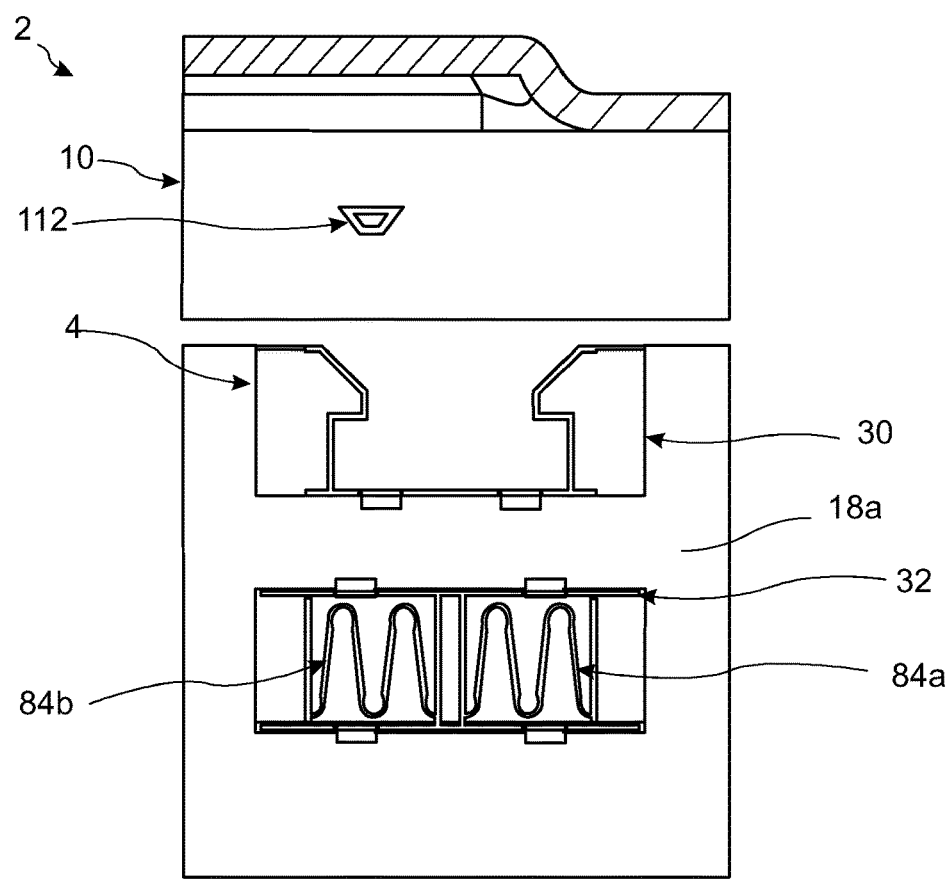
FIG. 10a is a rear view of the part-cutaway lid separated from the body of the container, with the locking mechanism in the locked configuration.
Figure 10B:
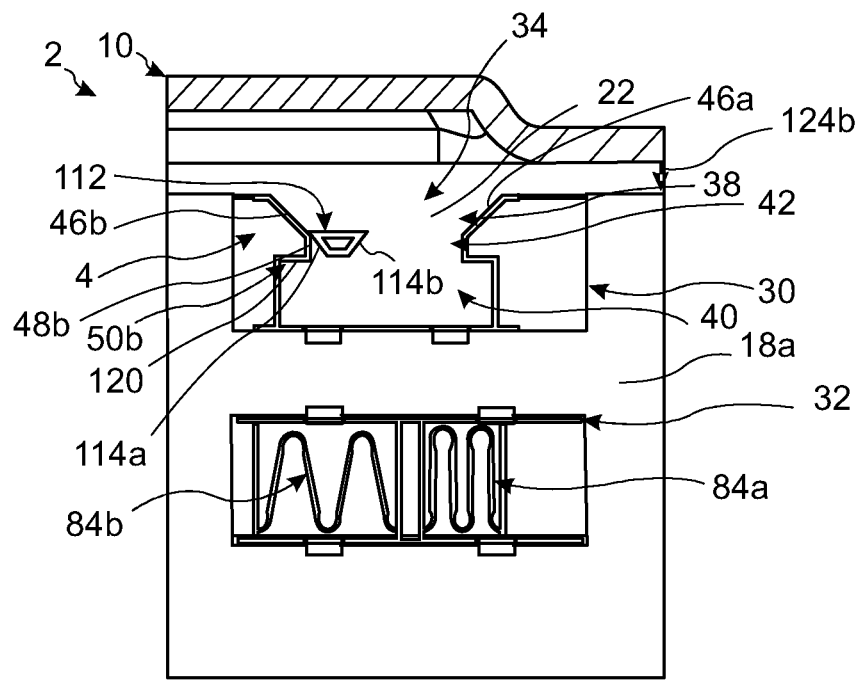
FIG. 10b shows the locking mechanism being urged towards the unlocked configuration by the downward motion of the lid.

Although not visible in FIG. 1, but visible in FIGS. 9a and 10b, the lid 10 further comprises a plurality of locking projections 112. The locking projections 112 interact with the locking mechanisms 4a, 4b to secure the lid 10 to the body 8. The locking projections extend outwardly from an inner surface of the skirt 20 (as shown in, for example, FIG. 12). The locking projections 112 will be described in detail later in this document.

The container 2 may be used to transport a variety of different freight including, but not limited to, dry ingredients, raw materials, components and packaging materials (e.g. caps, pots, trays and closures for fast-moving consumer goods products), and may include bulk goods. The container 2 may be reusable, such as poolable. The container 2 may be a static hire container. The container 2 may be privately owned for use in closed circuits. The container 2 may be single use (less common). The sleeve which forms part of the body 8 may be disposable, or may be reusable. The sleeve may be foldable to improve the efficiency of reverse logistics in the supply chain.

Of note, and as mentioned above, in FIG. 1 only two locking mechanisms 4a, 4b are shown provided on the body 8. As such, the split cavities 20a, 20b, proximate the base 6, are visible. In a fully assembled variant of this embodiment of the invention, and as shown in the exploded view of FIG. 2, further locking mechanisms are also attached to the split cavities 20a, 20b, proximate the base 6 (see also FIG. 15a). However, it will be appreciated that in other embodiments, locking mechanisms may only be provided proximate one of the lid 10 or the base 6, and further optionally only a single locking mechanism may be provided.

In use, by urging the locking mechanisms 4a, 4b into an unlocked configuration, the lid 10 can be removed (i.e. vertically separated) from the body 8 to expose the interior of the container 2 (and so the contents therein). When the locking mechanisms 4a, 4b are in a locked configuration, as shown in FIG. 1, the lid 10 cannot be removed (i.e. cannot be vertically separated) from the body 8. That is to say, when the locking mechanisms 4a, 4b are in a locked configuration, the lid 10 is secured to the body 8.

Figures 17, 18:
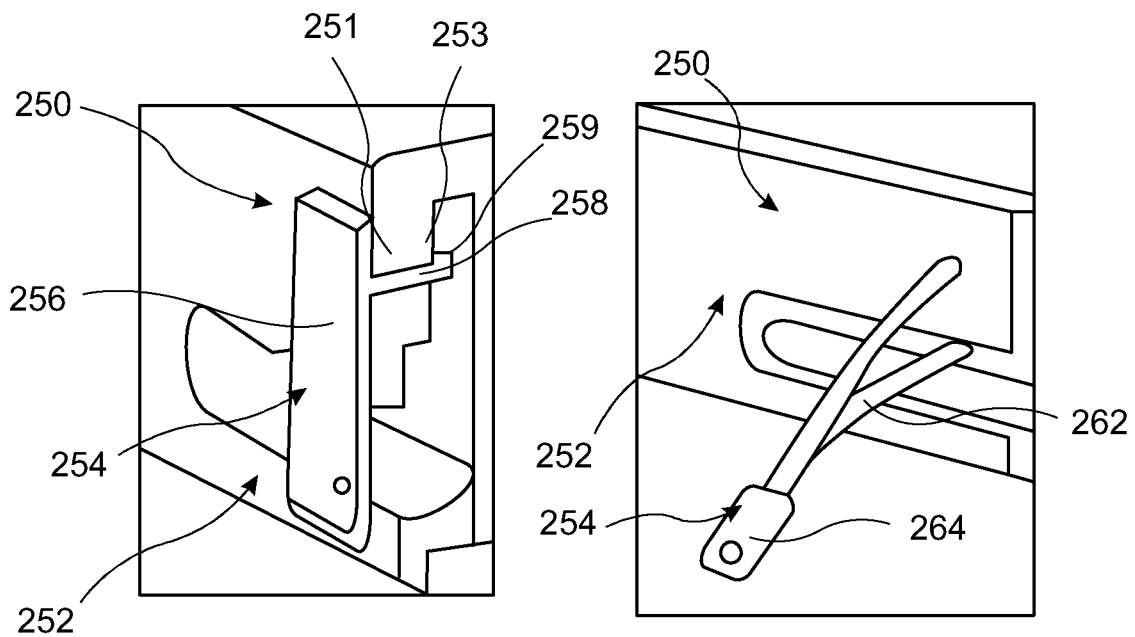
FIGS. 17 and 18 show two examples of anti-tamper components suitable for use with the locking mechanism according to the invention.

As will be described later in this document, the locking mechanisms 4a, 4b may provide anti-tamper functionality by virtue of incorporating anti-tamper features (e.g. apertures). When the locking mechanisms 4a, 4b are in the locked configuration, as shown in FIG. 1, anti-tamper components (e.g. as shown in FIGS. 17, 18) may be installed to fix the locking mechanisms 4a, 4b in the locked configuration (or prevent them from reaching the unlocked configuration). The locking mechanisms 4a, 4b may only be moved to an unlocked configuration (e.g. the container 2 be opened) when the anti-tamper components are removed. Removal of the anti-tamper component(s) therefore provides evidence of the container 2 having been opened, or having been tampered with. That is to say, an operator can detect whether the container 2 has been opened at some point in the supply chain, possibly for reasons of goods having been stolen and/or contaminated. The locking mechanisms 4a, 4b therefore advantageously provide the container 2 with tamper-proofing functionality, or evidence of tampering.

Further details regarding the operation of the locking mechanisms 4a, 4b will be provided later in this document.

Figure 2:
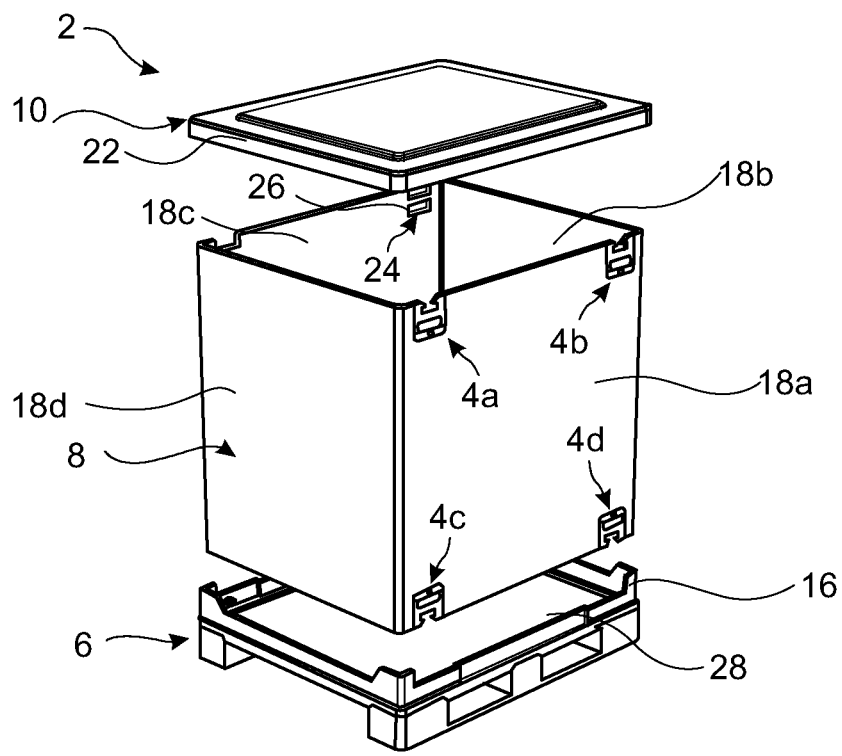
FIG. 2 is an exploded perspective view of the container shown in FIG. 1, with an additional two container locking mechanisms incorporated therein.

FIG. 2 is an exploded perspective view of the container 2 with four locking mechanisms 4a-d provided on the body 8. Specifically, the locking mechanisms 4a-d are provided on the first wall 18a. Also visible in FIG. 2 is a split cavity 24 provided on a second wall 18c which opposes the first wall 18a. As described in connection with FIG. 1, the split cavity 24 is so called because a cavity is divided by a support web 26 which extends thereacross. The support web 26 is gripped, in use, by part of the locking mechanism in order to attach the locking mechanism to the body 8.

As well as the second wall 18c, FIG. 2 also shows a fourth wall 18b which opposes the third wall 18d. The third and fourth walls 18b, 18d do not incorporate any locking mechanism thereon. That is to say, the container 2 consists of locking mechanisms provided on the first and second walls 18a, 18c, or one set of opposing walls, only.

FIG. 2 also shows a floor 28 which forms part of the base 6. The floor 28 defines a lowermost surface of an interior of the container 2. That is to say, goods and products stored within the container 2 are received on, and supported by, the floor 28. The floor 28 may be referred to as a surface or a base surface.

As will be described in detail later, the locking mechanisms 4c, 4d, proximate the base 6, are used to connect the body 8 to the base 6.

Figure 3A:
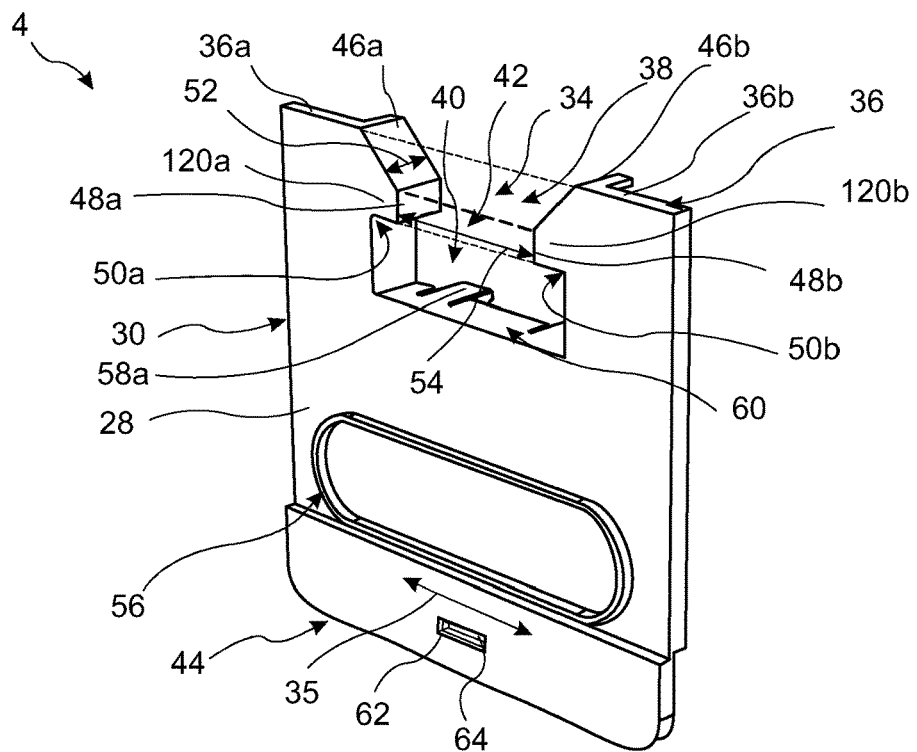
FIG. 3a is a perspective view of a front, or outer face, of the locking mechanism shown in the containers of FIGS. 1 and 2.
Figure 3B:
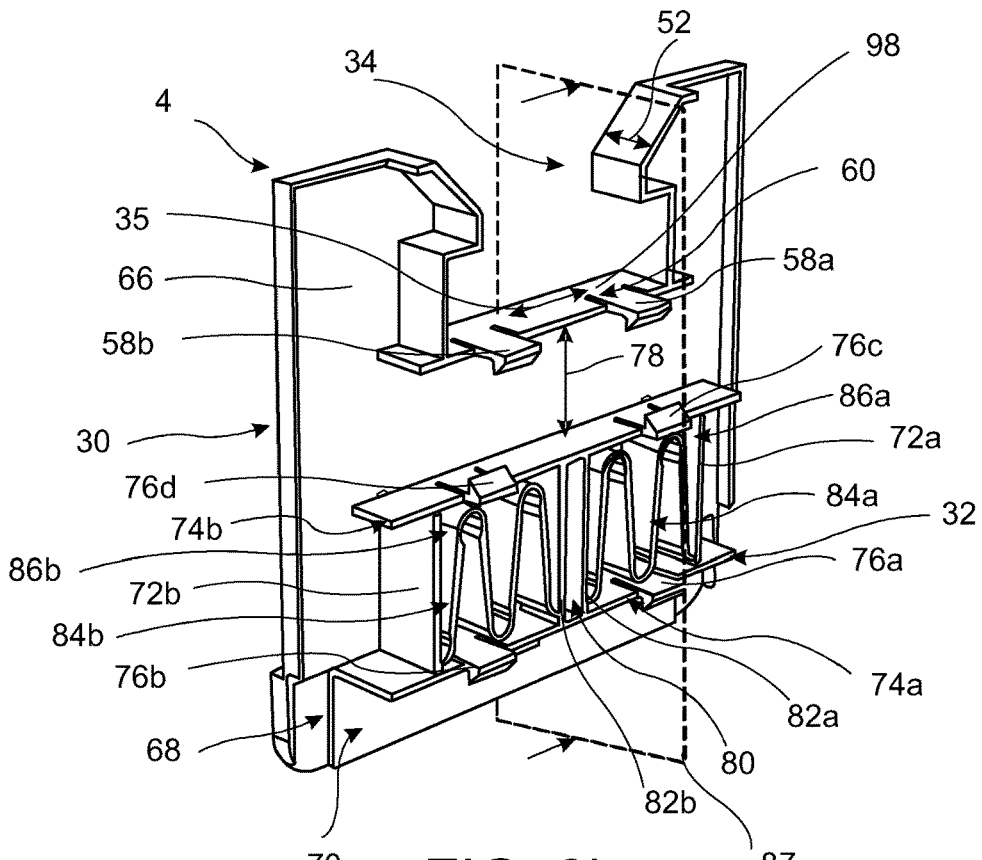

FIGS. 3a and 3b are perspective views generally showing a front (or outer) face and a rear face (or inner face) of the locking mechanism 4, in isolation, respectively.

Beginning with FIG. 3a, a front face 28 of the locking mechanism 4 is shown at an angle FIG. 3A. Due to the angle of the view of FIG. 3a, only a locking member 30, forming part of the locking mechanism 4, is visible. A fixed member 32, not shown in FIG. 3a, is visible in FIG. 3b. That is to say, the locking mechanism 4 comprises the locking member 30 and the fixed member 32.

Figure 4A:
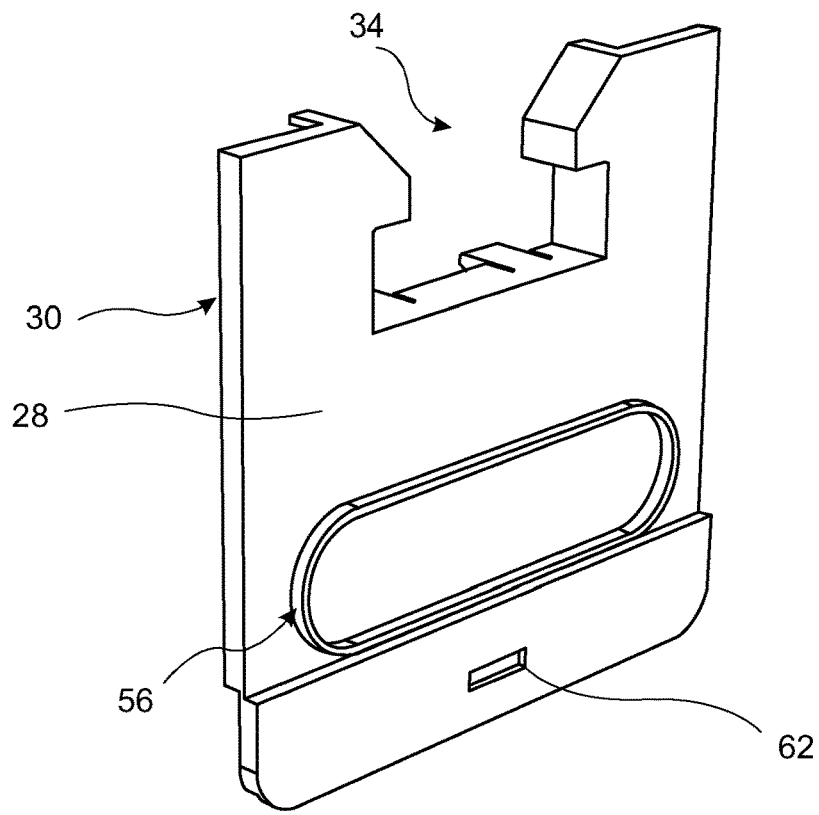
Figure 4B:
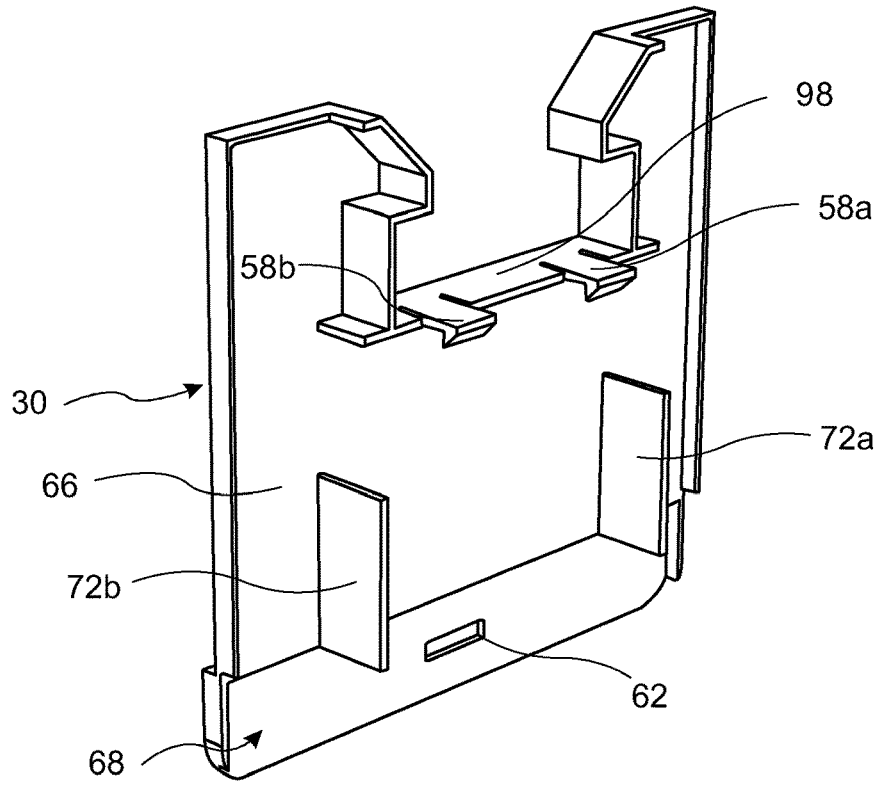
Figure 5A:
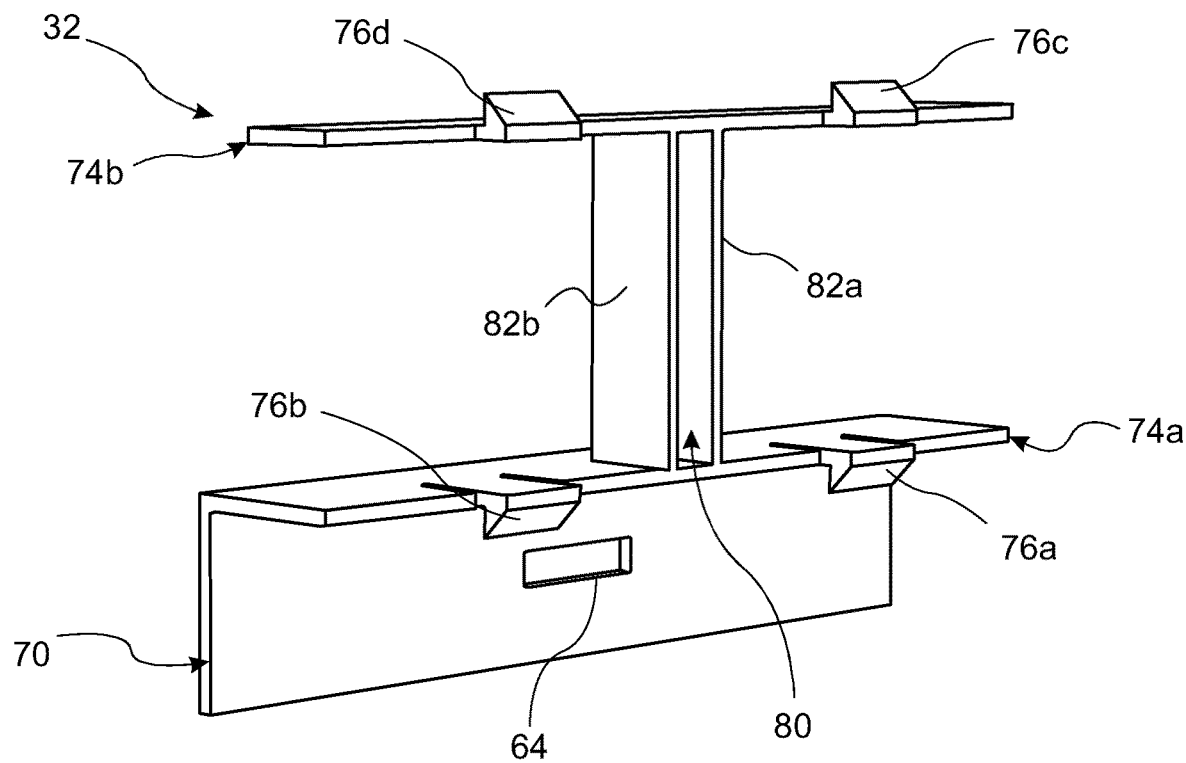
FIG. 5a is a perspective view of a rear, or inner face, of the fixed member of the locking mechanism shown in FIGS. 3a and 3b.
Figure 5B:
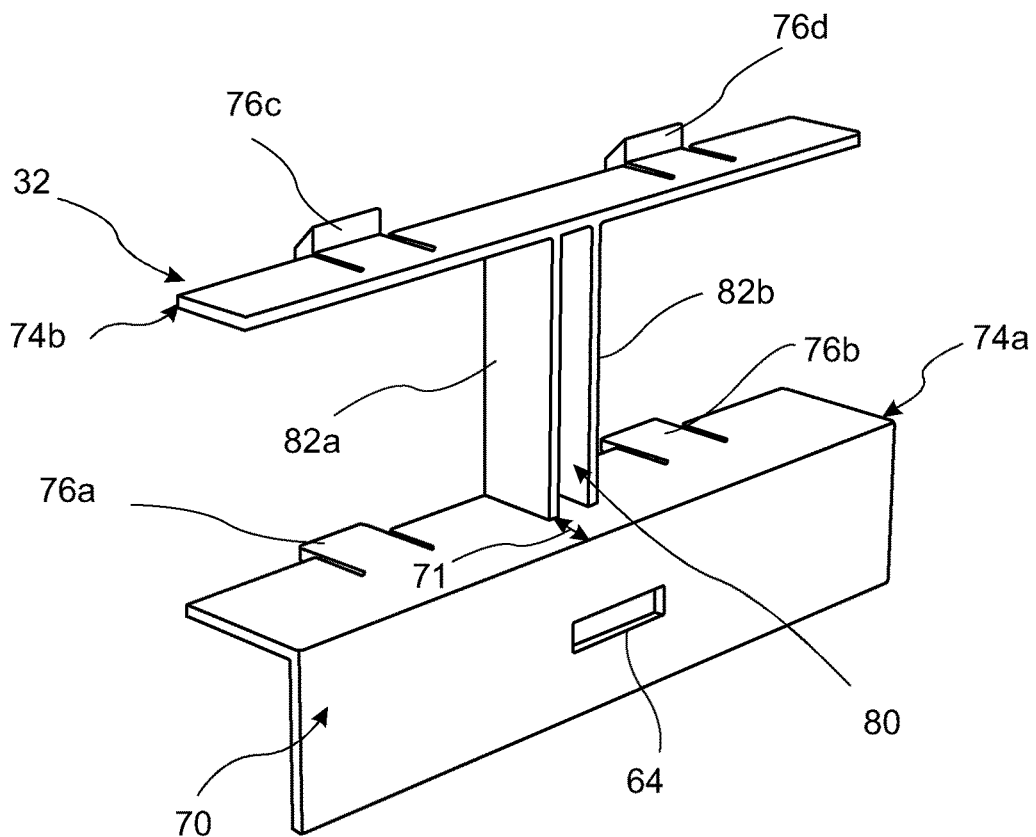

For ease of understanding, FIGS. 4a, 4b show the locking member 30 in isolation, whilst FIGS. 5a, 5b show the fixed member 32 in isolation.

Returning to FIG. 3a, the front face 28 forms part of the locking member 30. In use, the locking member 30 is moveable, about the fixed member 32, between a locked configuration and an unlocked configuration. In this embodiment the locking member 30 is slidable about the fixed member 32. The directions in which the locking member 30 is slidable, relative to the fixed member 32, are indicated by arrow 35. In the locked configuration, the locking member 30 engages a lid or base of the container to effectively secure the body to the lid or the base of the container. This will be described in more detail below. The locking member 30 defines an opening 34, in which a locking projection of a lid or base is receivable. The opening 34 is provided in an upper edge 36 of the locking member 30. The opening 34 can be said to be defined between two portions 36a, 36b of the upper edge 36 of the locking member 30.

The opening 34 comprises a number of different zones. These zones provide different functionalities in use. The opening 34 comprises an alignment zone 38, a neck 42 and a retaining zone 40. Moving from the upper edge 36 of the locking member 30, towards a lower most edge 44 of the locking member 30, the zones are ordered as follows: the alignment zone 38, then the neck 42, then the retaining zone

40. Each of the zones are schematically indicated using dashed lines in FIG. 3a. The zones are also schematically indicated in FIG. 8a, which is a rear view of the locking mechanism 4 when installed on the wall 18a.

Returning to FIG. 3a, briefly describing each of the zones in turn, and their function, which will also be understood in combination with FIGS. 9a to 10b, the alignment zone 38 is defined by a pair of guiding surfaces in the form of inclined surfaces 46a, 46b. The inclined surfaces 46a, 46b are inclined relative to the otherwise horizontal upper edge 36, and portions 36a, 36b thereof, of the locking member 30. The inclined surfaces 46a, 46b effectively define a narrowing, or tapering, of the opening 34. In use, this provides an alignment, or guiding functionality with a twofold purpose. Firstly, a locking projection of the lid or base is more readily received by the comparatively wider portion of the opening 34 (i.e. at the alignment zone 38 proximate the upper edge 36). Furthermore, the inclined surfaces 46a, 46b, as will appreciated in connection with FIG. 10b, also provide a camming functionality. Specifically, the locking member 30 is urged away from a locked configuration, towards an unlocked configuration, by relative vertical motion between the locking mechanism 4 and the lid or base. Put another way, relative vertical motion between the lid or base, and the body, results in relative horizontal displacement of the locking member 30 relative to, or about, the fixed member 32. Effectively this means that, by urging the container body towards the base, or by urging the lid or a container onto the body, the locking mechanism 4 can be automatically actuated without the need to manually actuate the locking mechanism 4.

The alignment zone 38 terminates at a neck 42 of the opening 34. The neck 42 defines a narrowest point of the opening 34. As such, the alignment zone 38, and specifically the inclined surfaces 46a, 46b thereof, can be said to at least partly define the neck 42 (and also guide a locking projection into, or towards, the neck 42). The neck 42 is defined by substantially vertical surfaces 48a, 48b.

It will be appreciated that, from the upper edge 36, and so an uppermost point of the opening 34, to an end of the alignment zone 38, a horizontal width of the opening 34 (e.g. in a direction indicated by arrow 54) reduces (or the opening 34 can be described as narrowing). At the point of reaching the neck 42, the horizontal width 54 of the opening 34 reaches a minimum. The opening 34 then continues downwards until an end of the neck 42 is reached. The opening 34 then opens out into the retaining zone 40.

The retaining zone 40 has a comparatively wider horizontal width than the neck 42. That is to say, the opening 34 opens out, at least horizontally, at the point where the retaining zone 40 is reached. The opening 34 may therefore be described as having a generally hourglass-shaped geometry: moving from a wider, to a narrower, to a then wider horizontal width. It will be appreciated that references to horizontal width may otherwise be described as the horizontal extent.

By virtue of the retaining zone 40 being comparatively wider than the preceding, or 'upstream', neck 42, two internal corners 50a, 50b are defined beneath the neck 42. Described another way, the internal corners 50a, 50b may be described as upper corners of the retaining zone 40. The internal corners 50a, 50b may be said to be defined by overhangs 120a, 120b which are, in turn, defined by a combination of the neck 42 and the retaining zone 40. The overhangs 120a, 120b may be described as hooked, or latching, projections (or locking hooks). Once the locking member 30 is in a locked configuration, a locking projection of the lid or base is effectively latched vertically into, or by, one of the internal corners 50a, 50b, depending upon the position of the locking mechanism 4. Put another way, the locking projection is prevented from being lifted vertically upwards, in the FIG. 3a orientation, due to engagement with one of the overhangs 120a, 120b in the retaining zone 40.

As will be appreciated from FIG. 3a, the opening 34, and all of the constituent zones thereof (the alignment zone 38, neck 42 and retaining zone 40), have a thickness in a plane normal to the front face 28 as indicated by the arrow 52. For ease of understanding only, and only in connection with the neck 42, a horizontal width, or extent, of the neck 42 is indicated with directional arrow 54.

Also shown in FIG. 3a is a grip portion 56 with which an operator can grip the locking member 30 to manipulate it. In the illustrated embodiment the grip portion 56 takes the form of a raised edge, or projection, but it will be appreciated that other forms of grip portion may otherwise be incorporated. In particular, in the illustrated embodiment the grip portion 56 is a raised lozenge-shaped projection (which defines a central recess). The grip portion 56 may be described, in one example, as an edge for manual manipulation.

Also visible in FIG. 3a is part of a clip 58a which, when in use, is used to vertically constrain the locking member 30 with respect to a support web (labelled 26 in FIG. 2). The clip 58a is one of a pair of clips which extend from the lowermost surface 60 of the opening 34 (which may otherwise be described as a wall projection). Clip 58a, along with the other clips forming part of the locking member 30 and the fixed member 32, will be described in more detail in connection with FIG. 3b.

Returning briefly to FIG. 3a, the locking member 30 further comprises an anti-tamper feature in the form of an aperture 62. The aperture 62 extends through an entire extent, or thickness, of the locking member 30. In the illustrated embodiment the aperture 62 takes the form of a rectangular cut out, but it will be appreciated that many of other geometries may otherwise be incorporated, or used alternatively. Also partially visible in FIG. 3a is a corresponding aperture 64 provided in the fixed member 32, the fixed member 32 being only partially visible in FIG. 3a but clearly visible in FIG. 3b (and will be described in detail in connection with FIG. 3b).

In use, and as will be appreciated from FIG. 3a, the anti-tamper functionality is provided by virtue of the apertures 62, 64 of the locking member 30 and fixed member 32 respectively, overlapping one another. Overlapping one another in this instance does not necessarily mean that the geometries of the apertures 62, 64 are identical in both shape and size (and are fully aligned with one another). Instead, the overlapping is merely intended to mean that the combination of the apertures 62, 64 align so as to define a 'common' aperture (which may be smaller than a smaller of the apertures 62, 64) which extends through an entirety of the locking mechanism 4 (i.e. through both the locking member 30 and the fixed member 32).

With the apertures 62, 64 overlapping as shown in FIG. 3a, a further anti-tamper component, such as a strap or cable tie, can be inserted therethrough. Said anti-tamper component, once installed, limits the relative travel of the locking member 30 relative to the fixed member 32. As will be described in detail with later Figures, and as was briefly described in connection with the opening 34, it is a sliding motion, or linear motion, of the locking member 30 relative to the fixed member 32 which is required in order for the locking projection of the lid or base to escape, or be released from, the retaining zone 40. Put another way, once the locking mechanism 4 is in a locked configuration, with the locking projection retained within the retaining zone 40, the locking member 30 must slide in order for the locking projection to vertically travel outside of the retaining zone 40 (i.e. to reach the neck 42). By virtue of preventing, or substantially limiting, the motion of the locking member 30, the anti-tamper component, in combination with the apertures 62, 64, can therefore ensure that the locking mechanism 4 remains in the locked configuration. This is advantageous for reasons of preventing the partial disassembly of the container, which may include the removal of the lid thereof, once the container has been assembled and secured in a locked configuration. Contamination of the contents, or potentially theft of the contents from therein, can therefore be prevented by virtue of the anti-tamper functionality. The anti-tamper functionality also means that it is possible to detect whether the locking mechanism 4 has been moved, or urged, away from a locked configuration during transit (i.e. a visual indicator of tampering is provided).

Turning to FIG. 3b, an alternative perspective view of the locking mechanism 4 is provided. FIG. 3b shows a rear face 66 of the locking member 30.

Beginning with the locking member 30, many of the features of the locking member 30 have already been described in detail in connection with FIG. 3a above and will therefore not be described in detail in connection with FIG. 3b. However, briefly, the further features of the locking member 30 which were not described in connection with FIG. 3a include the pair of clips 58a, 58b, which project from the wall projection 98 (which defines the lowermost surface 60 of the opening 34). As will be appreciated from FIG. 3b, the pair of clips 58a, 58b are elastically deformable clips which have tapered end surfaces. Said tapered end surfaces act so as to deflect, deform or urge the clips around a surface to which they engage. The thickness 52 of the opening 34, and specifically an outer surface which extends so as to define the opening 34, projects outwardly beyond the rear face 66 of the locking member 30.

The rear face 66 comprises a recess 68, provided at a lower region of the locking member 30. The recess 68 extends across a horizontal extent, or width, of the locking member 30. The recess 68 is configured to receive a flange 70 of the fixed member 32 therein. The interaction between the recess 68 and the flange 70 assists with guiding the locking member 30 in a linear manner relative to the fixed member 32.

In connection with the locking member 30, two further features, visible in FIG. 3b, are guiding projections 72a, 72b. Guiding projections 72a, 72b are also shown in FIG. 4b (which shows the locking member 30 in isolation). Returning to FIG. 3b, the guiding projections 72a, 72b are vertically extending projections, which project from the rear face 66 of the locking member 30. The guiding projections 72a, 72b are provided as a horizontally offset pair of projections in the illustrated embodiment. The guiding projections 72a, 72b, interact with a pair of track projections 74a, 74b forming part of the fixed member 32. The interaction between the guide projections 72a, 72b, and the track projections 74a, 74b, define a linear guide of sorts which substantially limits the movement of the locking member 30, relative to the fixed member 32, to horizontally. Put another way, the interaction between the track projections 74a, 74b and the guiding projections 72a, 72b substantially prevents relative vertical movement between the locking member 30 and the fixed member 32. The guiding projections 72a, 72b are seated between the track projections 74a, 74b, or are received between the track projections 74a, 74b, such that vertically outer ends of the guiding projections 72a, 72b engage adjacent (horizontal) surfaces of the track projections 74a, 74b.

The fixed member 32 will now be described in detail. As mentioned above, the fixed member 32 is shown in isolation in FIGS. 5a and 5b.

Returning to FIG. 3b, the fixed member 32 is, in use, providable on the body of the container. The fixed member 32 in the illustrated embodiment is attachable to the body of the container by virtue of an array of clips 76a-d. A first pair of the clips 76a, 76b project from a first track projection 74a of the pair of track projections 74a, 74b. A second set of clips 76c, 76d project from a second track projection 74b of the pair of track projections 74a, 74b. Each of the two sets of clips face different directions in use, and may be described as opposing one another. That is to say, the engaging faces of the clips incline in different directions.

Figure 7:
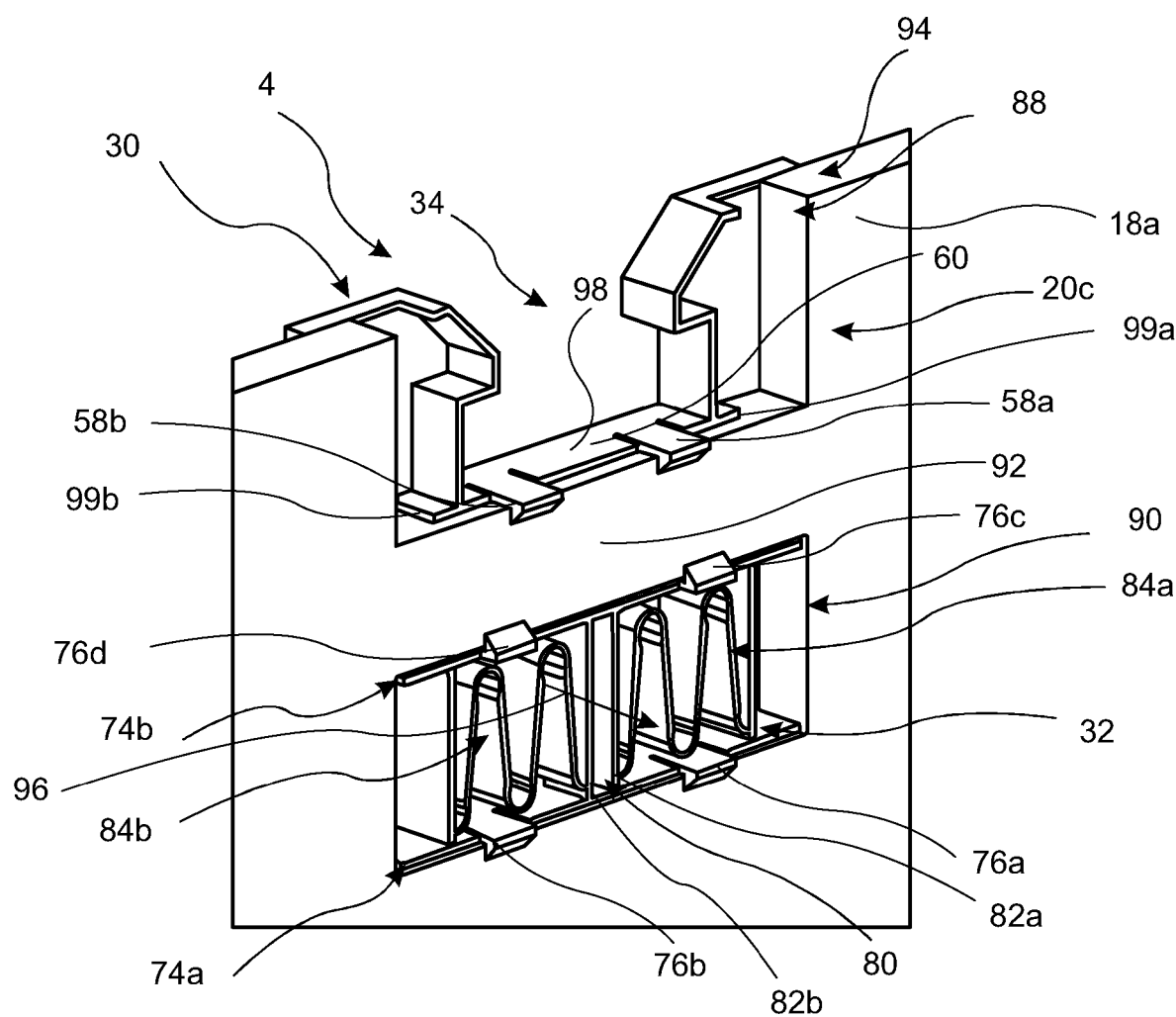
FIG. 7 is a perspective view of the locking mechanism shown in FIGS. 3a and 3b installed, in situ, on a body of a container.

When the locking mechanism 4 is assembled as shown in FIG. 3b, the wall projection 98, which defines the lower surface 60 of the opening 34, in combination with the second track projection 74b, define a cavity configured to receive a support web of the container therein (see, for example, support web 92 FIG. 7). A vertical extent of the cavity is labelled 78 in FIG. 3b. It will be appreciated that the clips 58a, 58b of the locking member 30, and the clips 76c, 76d of the fixed member 32, cooperate to retain the support web in the cavity and substantially prevent inadvertent withdrawal of the locking mechanism 4 in a direction normal to the body of the container. This is also illustrated in FIGS. 7 to 8c.

Returning to FIG. 3b, the first and second track projections 74a, 74b are separated, or offset, by a web projection 80. In the illustrated embodiment the web projection 80 comprises a pair of vertically extending projections 82a, 82b. When viewed normal to the rear face 66 of the locking member 30, the combination of the pair of track projections 74a, 74b and the web projection 80 define an I shape in geometry. Each of the track projections 74a, 74b can therefore be considered to define a flange of an I beam shape, with the web projection 80 defining the web.

Also shown in FIG. 3b are biasing members 84a, 84b, which form part of the locking mechanism 4. In the illustrated embodiment the biasing members 84a, 84b are springs, but other elastically deformable bodies may otherwise be used.

In the illustrated embodiment the biasing members 84a, 84b extend between, or engage, a respective guiding projection 72a, 72b and the web projection 80 (specifically a respective vertical projection 82a, 82b thereof). The sliding movement of the locking member 30 in a horizontal direction (i.e. left or right, as indicated by arrow 35), resulting in a subsequent horizontal offset between the locking member 30 and the fixed member 32, therefore compresses one biasing member whilst tensioning another. This results in both biasing members 84a, 84b becoming energised by a sliding motion of the locking member 30 relative to the fixed member 32. In turn, it will therefore be appreciated that the biasing members 84a, 84b bias the locking member 30 towards a neutral position, or a locked configuration. FIG. 3b shows the locking member 30 in a neutral, at rest, or locked configuration/position.

In the illustrated embodiment the biasing members 84a, 84b are integral with the respective guiding projection 72a, 72b and web projection 80 (specifically projection 82a, 82b thereof). That is to say, the ends of the biasing members 84a, 84b are connected to the adjacent surface. However, in other embodiments it will be appreciated that the biasing member may be inserted in a subsequent step, and may be a separate component to the locking member 30 and/or the fixed member 32 (e.g. the biasing member may be removable). The biasing members 84a, 84b may be described as integrated springs. Where the biasing members 84a, 84b are integrated (as per the illustrated embodiments) the locking mechanism 4 may be said to consist of a single part, but that single part comprising the locking member 30 and fixed member 32 which can move relative to one another. The locking member 30 and fixed member 30 may be said to only be connected by the (integrated) biasing members 84a, 84b.

Also of note, the track projections 74a, 74b, the guiding projections 72a, 72b and the web projection 80 define first and second cavities 86a, 86b in which the biasing members 84a, 84b are received. The cavities 86a, 86b are quadrilateral geometries which enclose the biasing members 84a, 84b (at least perimetrically). Advantageously, the biasing members 84a, 84b are thus protected in use, and the risk of damage is reduced.

Figure 6:
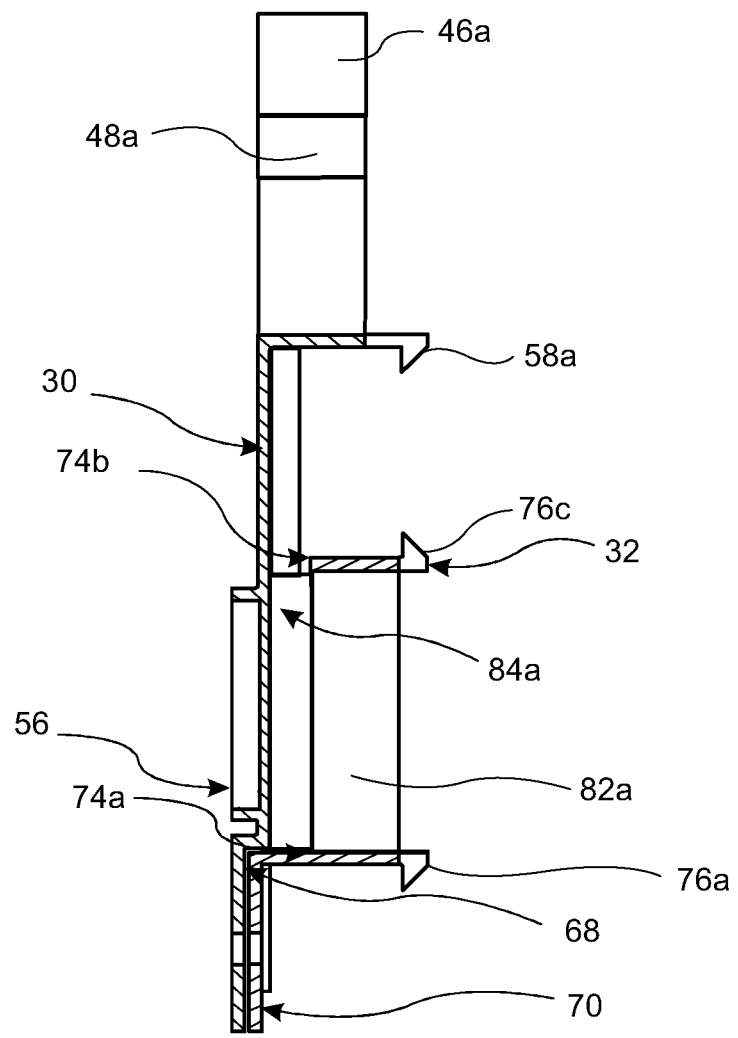
FIG. 6 is a cross section side view of the locking mechanism shown in FIGS. 3a and 3b.

Finally, a plane labelled 87 is also schematically indicated in FIG. 3b. Said plane 87 indicates the plane in which the cross section view of FIG. 6 is provided. The plane 87 is provided through a horizontal centreline of the locking mechanism 4 (e.g. through centreline 106 as labelled in FIG. 8b).

FIGS. 4a and 4b show the locking member 30 in isolation. FIG. 4a is angled towards the front (or outer) face 28, and FIG. 4b is angled towards the rear (or inner) face 66.

Briefly, in connection with FIG. 4a, the front face 28 of the locking member 30 is shown, along with the opening 34, the grip portion 56 and the aperture 62 (providing anti-tamper functionality, as described above).

Turning briefly to FIG. 4b, the guiding projections 72a, 72b are shown projecting from the rear face 66. The recess 68, formed in the rear face 66, is also visible. The clips 58a, 58b projecting from the wall projection 98 are also visible.

Turning to FIGS. 5a and 5b, the fixed member 32 is shown in isolation. In FIG. 5a the fixed member 32 is shown in an orientation looking generally towards a rear face of the locking mechanism, whilst in FIG. 5b the fixed member 32 is shown from a perspective generally looking towards a front face of the locking mechanism.

Like that described above in connection with FIGS. 4a and 4b, the features shown in FIGS. 5a and 5b have been described in detail in connection with FIGS. 3a and b and will therefore only be described briefly in connection with FIGS. 5a and 5b.

Beginning with FIG. 5a, the fixed member 32 is shown comprising first and second track projections 74a, 74b, with the web projection 80 extending therebetween. As previously mentioned, the web projection 80 comprises two vertically extending projections 82a, 82b. The flange 70 projects downwardly from the first track projection 74a. The aperture 64 is provided through the flange 70 and, in combination with the aperture 62 of the locking member 30 shown in FIGS. 4a and 4b, provides anti-tamper functionality. The first set of clips 76a, 76b project from the first track projection 74a, whilst the second set of clips 76c, 76d project from the second track projection 74b. All of the aforementioned features are also shown in FIG. 5b and the above explanation therefore applies equally in connection with FIG. 5b.

FIG. 5b illustrates how the web projection 80 (specifically vertical projections 82a, 82b thereof), are offset, in a direction normal to an outer face of the locking mechanism, relative to the flange 70. Put another way, the web projection 80 is recessed, by an extent indicated by arrow 71, relative to the flange 70.

Of note, in some embodiments the fixed member 32 may be incorporated as part of the body of the container. That is to say, an outer surface of the corresponding wall of the body may be modified to incorporate certain features from the fixed member 32 which provide the same functionality (e.g. first and second track projections 74a, 74b). In such embodiments the fixed member 32 is therefore integral with the wall, or more broadly the body of the container, such that a separate fixed member component (separate to the body of the container, that is) is not required. However, in the illustrated embodiment, the fixed member 32 is a separate component which is attachable to the body of the container as will be described in detail in connection with later Figures. In particular, the two sets of clips 76a, 76b and 76c, 76d are configured to engage the wall of the body of the container, specifically edges defining a split cavity thereof, to secure the fixed member 32 (and so locking mechanism 4) in place.

FIG. 6 is a cross section side view of the locking mechanism 4 taken about the plane 87 indicated in FIG. 3b. FIG. 6 shows the locking mechanism 4 with the locking member 30 and fixed member 32 in engagement with one another, and therefore the locking mechanism 4 in an assembled state. Part of the biasing member 84a is also visible in FIG. 6.

Crosshatching is used in FIG. 6 to indicate the parts of the locking mechanism 4 which are shown in cross section in FIG. 6.

FIG. 6 illustrates how the flange 70 of the fixed member 32 is received by the recess 68 in the locking member 30. FIG. 6 also illustrates how the vertical projection 82a, forming part of the web projection, is received between the track protections 74a, 74b of the fixed member 32. The biasing member 84a, at least a part thereof, is also shown being bound by the track projections 74a, 74b and the vertical projection 82a. Various clips 76a, 76c, 58a are also shown, including the cross section profiles thereof. The inclined surface 46a, of the alignment zone, and the vertical surface 48a of the neck are also shown. Grip portion 56 is also visible.

Turning to FIG. 7, a perspective view of an installed locking mechanism 4 is provided. The view of FIG. 7 is generally from an inside-to-out direction of the container. That is to say, the view of FIG. 7 indicates what would be visible from the volume enclosed by the container looking outwards, or from an interior of the container.

As previously described, the wall 18a (of the body of the container) comprises split cavity 20c. Split cavity 20c is so called because it could otherwise be described as a single cavity which is split in two by a support web 92. The support web 92 extends substantially horizontally between the vertical edges of the cavity. By virtue of the support web 92 extending across the cavity, the split cavity 20 comprises an outer cavity 88 and an inner cavity 90. The outer cavity 88 opens out into an outermost edge 94 of the wall 18a, whereas the inner cavity 90 is entirely separate from the outer edge 94 of the wall 18a. Put another way, the inner cavity 90 is defined by a continuous perimeter which extends entirely therearound. The inner and outer references refer to how close the cavities 88, 90 are to a vertical centreline of the wall 18a (e.g. a horizontal plane provided at a vertical position equal to half the overall height of the body). Exposed edges of the cavities 88, 90 may be welded to seal them from the ingress of liquids (and reduce the risk of liquid entering between inner and outer faces of the walls, and so sleeve).

Beginning with the inner cavity 90, FIG. 7 indicates how the two sets of clips 76*a*, 76*b* and 76*c*, 76*d* engage adjacent surfaces of the wall 18*a* (said surfaces defining the inner cavity 90). Furthermore, the first and second track projections 74*a*, 74*b* engage upper and lower sides of the inner cavity 90 to provide vertical alignment (of the fixed member 32 relative to the wall 18*a*). Similarly, horizontal ends of the first and second track projections 74*a*, 74*b* provide horizontal alignment (of the fixed member 32 relative to the wall 18*a*). This combination of features effectively aligns the fixed member 32 relative to the wall 18*a*, and to the body of the container, in a plane normal to an outer surface of the wall 18*a*.

It will also be appreciated that the biasing members 84*a*, 84*b* are visible through the inner cavity 90. It will be recalled that the first and second track projections 74*a*, 74*b* are separated by the web projection 80 which comprises the first and second vertically extending projections 82*a*, 82*b*.

It will be appreciated, from FIG. 7, that the various clips provide a snap-fit functionality in that they elastically deform as the fixed member 32 is urged against the wall 18*a* in a direction generally indicated by the arrow 96 (e.g. normal to an outer surface of the wall 18*a*). The various clips may therefore be said to define a snap-mechanism. The second set of clips 76*c*, 76*d* engage the support web 92. Due to the engagement of the clips 76*a*, 76*b* and 76*c*, 76*d*, the fixed member 32, once installed, cannot be retracted in a direction opposite arrow 96 unless the various clips are elastically deformed (e.g. the clips 76*a*, 76*c* being elastically deformed towards one another) so as to release the clips.

As well as the fixed member 32 engaging the wall 18*a*, the locking member 30 also engages the wall 18*a*. The clips 58*a*, 58*b* of the locking member 30 engage the support web 92 to also prevent withdrawal of the locking member 30 in a direction opposite arrow 96 once installed. Similarly, in connection with both the fixed member 32 and the locking member 30, it will be appreciated that the various clips also substantially prevent vertical movement of the locking member 30, and fixed member 32, relative to the wall 18*a*. Horizontal extensions 99*a*, 99*b* of the wall projection 98 (that defines the lowermost surface 60 of the opening 34) engage the support web 92 to also provide a horizontal alignment functionality.

Of note, the opening 34 is entirely overlapped by, or contained within, the outer cavity 88.

Finally, it will be appreciated that in FIG. 7 the locking number 30 is provided in a locked configuration. That is to say, the locking number 30 is substantially horizontally aligned with the fixed member 32. In the locked configuration, the biasing members 84*a*, 84*b* are not energised in that they have not been compressed, or tensioned, away from a neutral, at-rest position due to the horizontal movement of the locking member 32.

Figure 8A:
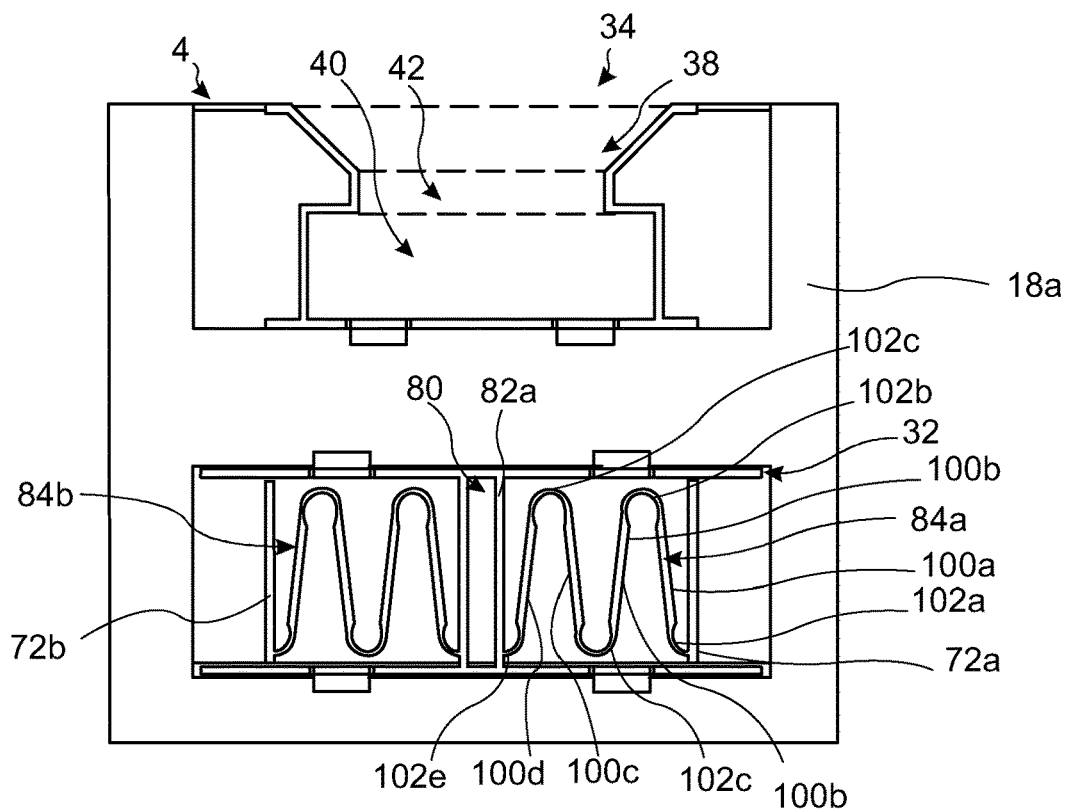
FIG. 8a is a rear view of the installed locking mechanism of FIG. 7 in a locked configuration.

FIG. 8*a* is a rear view of the FIG. 7 arrangement, with the locking mechanism 4 installed in situ on the wall 18*a* of the body of the container. The locking member 30, and so locking mechanism 4 more generally, is shown in the locked configuration.

FIG. 8*a* illustrates how both biasing members 84*a*, 84*b* have a substantially identical horizontal extent in an at rest position (i.e. when the locking member 30 is in the locked configuration).

FIG. 8*a* illustrates each of the biasing members 84*a*, 84*b* being defined by a respective continuous length of material.

Said respective length of material is thicker in a linear middle portion, and is narrower in an arcuate end portion. Taking only the first biasing member 84*a* as an example, the biasing member 84*a* comprises a plurality of comparatively thicker linear portions 100*a*, 100*b*, 100*c*, 100*d* interconnected by a plurality of comparatively thinner arcuate ends 102*a*, 102*b*, 102*c*, 102*d*, 102*e*. The outermost ends 102*a*, 102*e* of the biasing member 84*a* are integral with, or connected to, the adjacent guiding projection 72*aa* (of the locking member 30) and the vertical projection 82*a* (of the web projection 80 of fixed member 32). However, as previously mentioned, in some embodiments the biasing member may be an entirely separate component, and so may not be integral with either of the locking member 30 and/or the fixed member 32. The length of material which defines the biasing members 84*a*, 84*b* is arranged in a generally concertina-like manner, with the thinner arcuate ends 102*a*, 102*b*, 102*c*, 102*d*, 102*e* defining a plurality of effective folds of the thicker linear portions 100*a*, 100*b*, 100*c*, 100*d*.

Figure 8B:
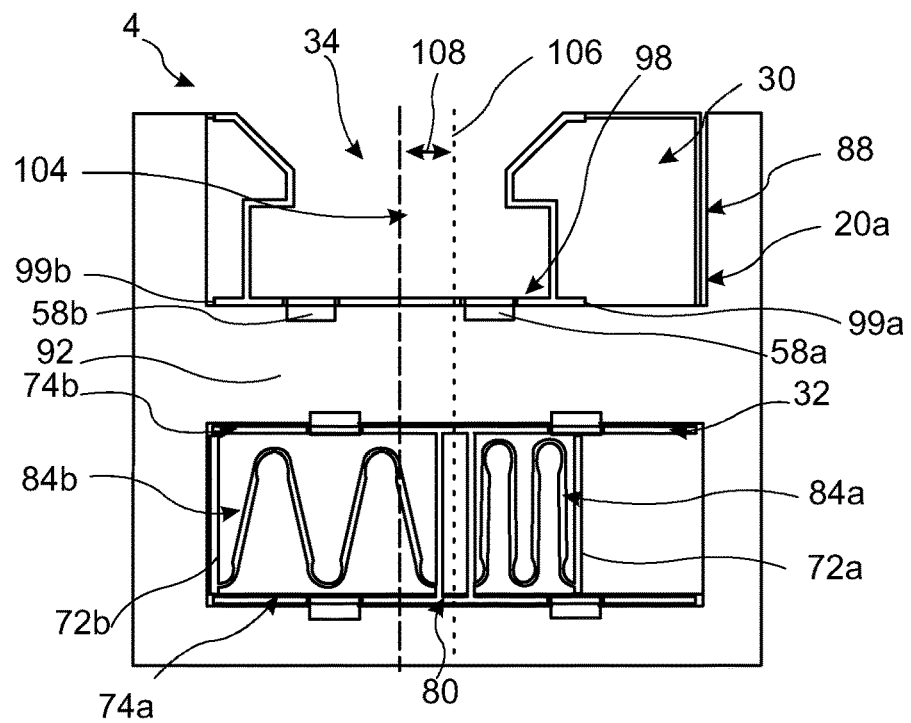
FIG. 8b is a rear view of the locking mechanism of FIG. 8a in an unlocked configuration.
Figure 8C:
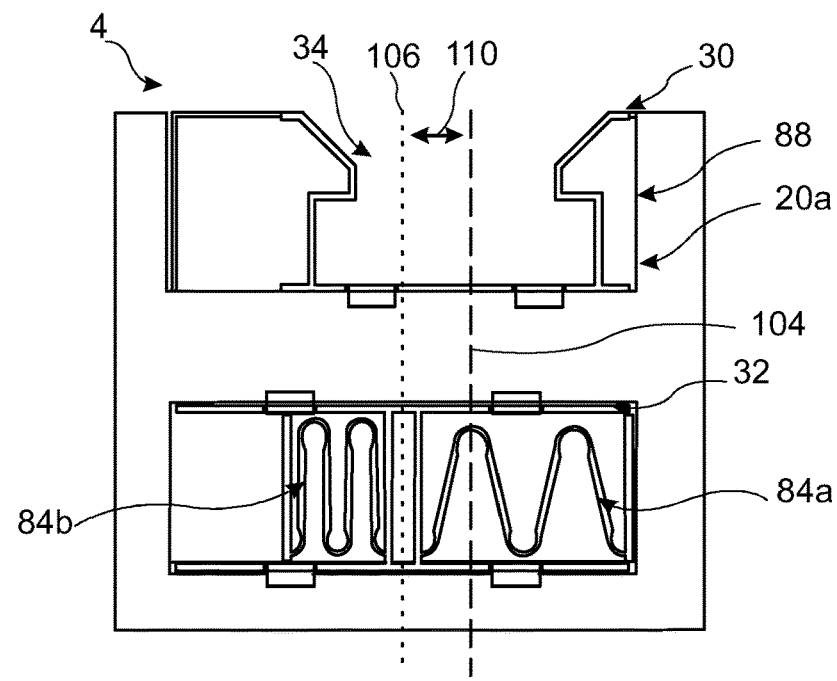
FIG. 8c is a rear view of the locking mechanism of FIG. 8a in an alternative unlocked configuration.

For ease of understanding, the various zones forming part of the opening 34 are also schematically indicated in FIG. 8*b* using dashed lines. It will be recalled that the opening comprises the alignment zone 38, the neck 42 and the retaining zone 40 (moving vertically downwards from an upper edge of the locking member 30 in FIG. 8*a*).

Turning to FIG. 8*b*, the locking mechanism 4, specifically the locking member 30 thereof, is shown in an offset, or unlocked, configuration. Specifically, a (vertically extending) horizontal centreline 104 of the locking member 30 is offset from a (vertically extending) horizontal centreline 106 of the fixed member 32. The offset is indicated by the arrow labelled 108. The offset 108 is a horizontal offset.

The locking member 30 in FIG. 8*b* is shown having been slid, or urged, away from a locked configuration as shown in FIG. 8*a* (whereby the locking member 30 and fixed member 32 are aligned horizontally with one another.) Described another away, in the locked configuration the centrelines 104, 108 of the locking member 30 and the fixed member 32 respectively overlap, or are substantially coaxial with one another.

By virtue of the locking member 30 being urged to the unlocked configuration as shown in FIG. 8*b*, the biasing members 84*a*, 84*b* are energised. Specifically, work done in urging the locking member 30 away from the locked configuration (or the neutral, or at-rest position) elastically deforms the biasing members 84*a*, 84*b* such that energy is then stored by the biasing members 84*a*, 84*b*. In the illustrated embodiment, the movement of the locking member 30 away from the locked configuration, and towards the depicted unlocked configuration, compresses or tensions the biasing members 84*a*, 84*b* such that energy is stored by the biasing members 84*a*, 84*b*. The first biasing member 84*a* is compressed by the motion of the locking member 30, whilst the second biasing member 84*b* is tensioned by the motion of the locking member 30. It will be appreciated that from the unlocked configuration shown in FIG. 8*b*, the locking member 30 will, when not held in place by an external force, be urged back towards a central, or locked configuration, as shown in FIG. 8*a* (whereby the centrelines 104, 106 are aligned) by the biasing members 84*a*, 84*b*. A biasing force therefore seeks to return the locking member 30 to the locked configuration. Said biasing force is exerted by the biasing members 84*a*, 84*b* as the elastically deformed biasing members 84*a*, 84*b* seek to return to their at-rest horizontal extent (e.g. to release the potential energy stored therein).

The horizontal travel of the locking member 30 is limited by the biasing members 84a, 84b. As shown in FIG. 8b, the second biasing member 84b is elastically extended, whilst the first biasing member 84a is compressed. The biasing members 84a, 84b effectively limit the extent to which the guiding projections 72a, 72b (and so the locking member 30) can be horizontally displaced about, or relative to, the web projection 80 (and so the fixed member 32). As will be appreciated from FIG. 9b, the horizontal travel is sufficient to enable vertical travel of the locking projection 116 of the lid 10 through the locking member 30 when the locking mechanism is in the unlocked configuration.

FIG. 8b illustrates how, even in the unlocked configuration, the opening 34 of the locking member 30 overlaps the outer cavity 88 of the split cavity 20c. The locking member 30 can therefore move between the locked and unlocked configurations, whilst the opening 34 remains within the outer edges which define the outer cavity 88.

FIG. 8b indicates how the wall projection 98 of the locking member 30, the horizontal extensions 99a, 99b of the wall projection 98, and the clips 58a, 58b which project from the wall projection 98, all slide along the support web 92. These features all engage the support web 92 in both the locked and the unlocked configurations. FIG. 8b also indicates how the guiding projections 72a, 72b of the locking member 30 are horizontally displaced along, and between, the track projections 74a, 74b as the locking member 30 slides relative to the fixed member 32.

Turning to FIG. 8c, the locking mechanism 4 is shown in an alternative offset configuration, or unlocked configuration. In FIG. 8c the locking member 30 is offset in an opposing direction, relative to the fixed member 32, to that shown in FIG. 8b. When viewed from an exterior of the container, the FIG. 8c arrangement indicates the locking member 30 when urged to the left hand side, whilst the FIG. 8b arrangement shows the locking member 30 having been urged to the right hand side.

In FIG. 8c the horizontal centrelines 104, 106 of the locking member 30 and fixed member 32 respectively are offset from one another by an offset 110. With the locking member 30 urged into the position shown in FIG. 8c, the biasing members 84a, 84b are energised. However, when compared to FIG. 8b, it will be appreciated that the compression/tension of the biasing members 84a, 84b is reversed in FIG. 8c. Specifically, in FIG. 8c the first biasing member 84a is tensioned, whilst the second biasing member 84b is compressed. Once again, the locking member 30 is urged back towards a locked configuration (e.g. that shown in FIG. 8a), in which the centrelines 104, 106 align with one another, by the biasing members 84a, 84b. Again, the opening 34 defined by the locking member 30 is entirely contained within the outer cavity 88 of the split cavity 20a when the locking member 30 is in the unlocked configuration depicted in FIG. 8c. The biasing members 84a, 84b may be described as being in a push-pull arrangement (whereby one is tensioned, and the other is compressed), owing to the arrangement of the biasing members 84a, 84b relative to the centreline 104.

Turning to FIG. 9a, the locking mechanism 4 is shown installed on the wall 18a and in a locked configuration. The lid 10 is also shown (and is part cutaway, as indicated by the cross-hatching). The FIG. 9a view is of a rear of the locking mechanism 4 e.g. that which would be visible from an interior of the container 2.

Briefly, it will be recalled that the lid 10 comprises the skirt 22 which extends around a perimeter, or periphery, of the lid 10. Also shown is a locking projection 112. The locking projection 112 projects from the skirt 22 of the lid 10. The locking projection extends in a direction normal to a plane parallel to the wall 18a of the container 2. That is to say, the locking projection 112 extends in the same direction as a thickness of the wall 18a. The locking projection 112 extends horizontally towards an interior of the container 2.

In FIG. 9a the locking mechanism 4 is shown in a locked configuration in which the lid 10 is secured, or locked, to the wall 18a of the body of the container 2. The container 2 is thus provided in a sealed configuration. FIG. 9a indicates how the interaction between the locking member 30 and the locking projection 112 facilitates the locking, or sealing, of the container 2. As will be appreciated from FIG. 9a, the locking projection 112 is retained in the retaining zone 40 of the locking member 30. Specifically, the locking projection 112 is retained proximate the upper corner 50b of the opening 34 with the retaining zone 40. Vertically upward movement of the locking projection 112 is thus prevented by an overhang 120 (otherwise described as a hooked, or latching, projection).

The locking projection 112 in the illustrated embodiment is generally trapezoidal. Furthermore, the locking projection 112 is generally hollow. That is to say, the locking projection 112 is not solid in cross section, although in other embodiments the locking projection 112 may be solid. The locking projection 112 comprises guiding surfaces 114a, 114b which are generally tapered. As such, the locking projection 112 may be described as generally chevron shaped. The guiding surfaces 114a, 114b extend at an upper end between an engagement surface 116 and, at an lower end, a base surface 118. The combination of the first and second guiding surfaces 114a, 114b, the base surface 118 and the engagement surface 116 define a closed geometry of the locking projection 112.

As shown in FIG. 9a, in the locked configuration the locking projection 112 is secured vertically in position by the overhang 120 of the locking member 30 (the overhang 120 otherwise being described as a hooked, or latching, projection). The engagement surface 116 of the locking projection 112 abuts, or engages, the overhang 120 such that the locking projection 112, and so the lid 10, cannot be vertically raised whilst the locking mechanism 4 is in the depicted locked configuration. It will also be appreciated that downward motion of the wall 18a, and so body of the container 2, away from the lid 10 is substantially prevented. Put another way, relative vertical movement between the body and the lid 10 is substantially prevented when the locking mechanism is in the locked configuration.

FIG. 9a also illustrates how the locking projection 112 is retained in the retaining zone 40 of the locking member 30 when the biasing members 84a, 84b are in an at-rest position. Put another way, when the biasing members 84a, 84b are not energised, the locking projection 112 is retained by the locking mechanism 4. The lid 10 is thus locked to the wall 18a, and so body, of the container 2, such that relative vertical movement therebetween is not possible.

The locking projection 112 may be manufactured integrally with the lid 10, or be attached to the lid 10 (specifically the skirt 22 thereof) in a subsequent process. Example joining processes include the use of adhesives, such as glue, or by way of a fastener (e.g. a rivet). Subsequent attachment of the locking projection 112 may facilitate replacement of the locking projection 112 should damage occur in use.

Figure 9B:
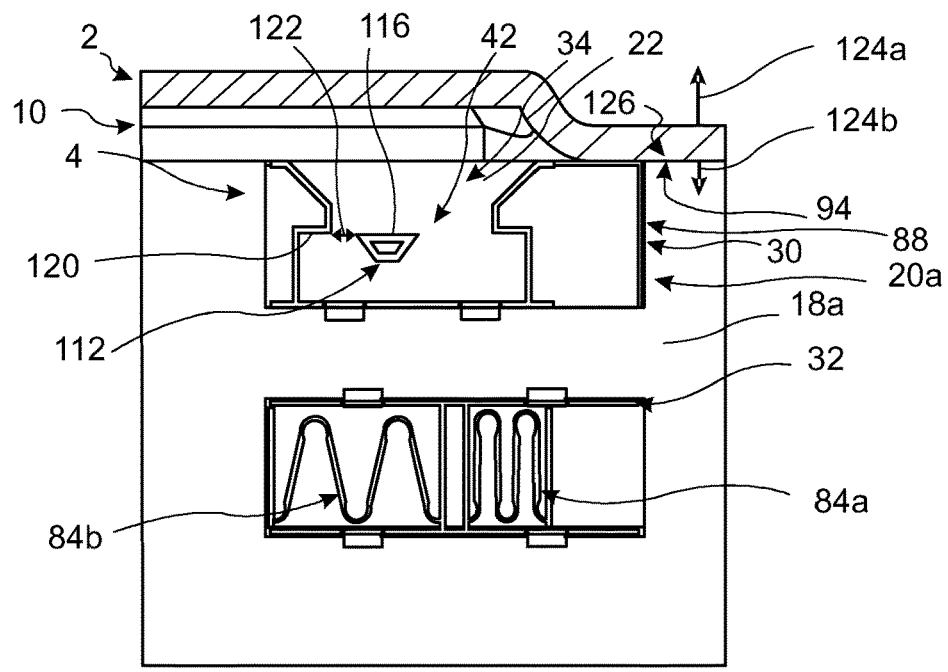
FIG. 9b is a rear view of the FIG. 9a arrangement with the locking mechanism in an unlocked configuration.

Turning to FIG. 9b, the locking mechanism 4 is shown in an unlocked configuration. In the unlocked configuration, the locking member 30 is urged horizontally, or slid, relative to the fixed member 32 (and so the wall 18a of the body of the container 2). In the unlocked configuration, the locking projection 112 is clear of the overhang 120 of the locking member 30. Put another way, there is no horizontal overlap between the engagement surface 116 of the locking projection 112 and the overhang 120. Vertical relative movement between the locking projection 116 and the locking member 30 can therefore occur. It will therefore be appreciated that relative vertical movement between the lid 10 and the wall 18*a* of the body of the container 2 can therefore also occur (if the depicted locking mechanism 4 is the only locking mechanism present on the container 2).

By virtue of the locking member 30 being offset and urged into the unlocked configuration, a (horizontal) clearance 122 is provided between the locking projection 112 and the overhang 120. For completeness, when the locking mechanism 4 is provided in the unlocked configuration as depicted in FIG. 9*b*, the relative vertical movement between the lid 10 and the wall 18A of the body of the container 2 may take the form of either or both of: i) the lid 10 being lifted vertically away from the wall 18*a*, as indicated by direction arrow 124*a*; and/or ii) the wall 18*a* of the body of the container 2 being moved downwardly in direction 124*b* relative to the lid 10. Alternatively, and as mentioned, a combination of both a downward motion 124*b* of the wall 18*a* and an upward motion 124*a* of the lid 10 may occur.

When the locking mechanism 4 is provided in the unlocked configuration, the biasing members 84*a*, 84*b* are both energised as previously described. The first biasing member 84*a* is compressed, whilst the second biasing member 84*b* is tensioned. It will be appreciated from FIG. 9*b* that the biasing members 84*a*, 84*b* will, when an externally applied force ceases to be applied the locking member 30, return the locking member 30 to a locked configuration (in which horizontal centrelines of the locking member 30 and the fixed member 32 are substantially aligned with one another). Put another way, the biasing members 84*a*, 84*b* will seek to return to a neutral position in which a horizontal extent of the biasing members 84*a*, 84*b* is substantially equal to one another (and where the biasing members 84*a*, 84*b* are thus not compressed or tensioned). As will be appreciated from FIG. 9*a*, the urging of the biasing members 84*a*, 84*b* therefore seeks to return the locking mechanism 4 to a locked configuration in which the locking projection 112 is vertically retained by the overhang 120. In such instances, and as described above, vertical movement between the lid 10 and the wall 18*a* of the body of the container 2 is substantially prevented.

With the locking mechanism 4 in the unlocked figuration, as shown in FIG. 9*b*, the lid 10 can be lifted off of the wall 18*a* of the body of the container 2 (i.e. the container 2 can be opened). Of note, an engagement surface 126 of the lid 10 engages the outer edge 94 of the wall 18*a* when the lid 10 is in an at rest position. That is to say, a vertical position of the lid 10 is constrained, relative to the wall 18*a* of the body of the container 2, by the engagement, or interference, between the outer edge 94 and the engagement surface 126. Said outer edge 94 can be described as exerting a supporting force which supports the lid 10.

From FIG. 9*b* it will be appreciated that the direction in which the locking member 30 moves, relative to the fixed member 32, to enter the unlocked configuration is the direction which will align the locking projection 112 with the neck 42 of the opening 34 (direction 89*b* for FIG. 9*a*). Said alignment allows the locking projection 112 to be raised through the opening 34 (the narrowest point of which is defined by the neck 42). Although FIGS. 8*b* and 8*c* show the locking member 30 in two different offset positions, or unlocked configurations, (i.e. left and right), it will be appreciated from FIG. 9*a* that sliding the locking member 30 towards one of these configurations, specifically towards the right hand side (i.e. in direction 89*a*), is substantially prevented by the locking projection 112 in FIG. 9*a* engaging the internal corner 50*b*. In the illustrated embodiment, the locking mechanism 4 therefore has one unlocking direction (i.e. a direction in which the locking member 30 is moved, relative to the locking member 30) which is defined, at least in part, by the position of the locking projection 112 relative to the locking mechanism 4. If the locking projection 112 was retained proximate the opposing internal corner 50*a*, as is the case for some of the positions on the container 2 depicted in FIG. 15*a*, then it will be appreciated that the locking member 30 would be substantially prevented from being moved, or unlocked, to the left (i.e. in direction 89*b*). The locking member 30 would thus be unlocked by moving the locking member 30 towards the right, or in the right-hand direction (i.e. in direction 89*a*).

As mentioned above, the direction of unlocking can be defined as the direction of movement of the locking member 30 which aligns the locking projection 112 with the neck 42 of the locking member 30. In summary, whilst the locking mechanism 4 has two unlocked configurations, or positions, in which the locking member 30 is offset from the fixed member 32 (e.g. FIGS. 8*b*, 8*c*), one of these positions, or configurations (e.g. FIG. 8*c*), may not be reachable, when the locking mechanism 4 is installed, due to the presence of the locking projection 112 (e.g. FIG. 9*a*). Each locking member 4 may therefore be described as having a single unlocked configuration when installed in situ. This may otherwise be described as the locking member 30 being movable substantially in one direction only when installed. For FIG. 9*a*, the unlocking direction is towards the left hand side 89*b* because movement of the locking member 30 towards the right hand side 89*a* is substantially prevented by the locking projection 112 engaging, or abutting, internal corner 50*b*.

When the locking mechanism 4 in the unlocked configuration, it will be appreciated that the locking projection 112 can be lifted vertically in the direction 124*a*, passing through both the opening 34 (defined by the locking member 30) and (simultaneously) the outer cavity 88 defined by the split cavity 20*a*.

FIG. 10*a* shows the lid 10 having been lifted off of the wall 18*a* of the body of the container 2, the locking mechanism 4 having returned to the locked (or aligned) configuration by the biasing members 84*a*, 84*b*.

Turning to FIG. 10*b*, the locking mechanism 4 is shown with the locking member 30 in a position partway between a locked and an unlocked configuration.

In FIG. 10*b*, the lid 10 is being urged towards the wall 18*a*, of the body of the container 2, in the downward direction 124*b*. FIG. 10*b* therefore shows a subsequent 'closure' step to that of FIG. 10*a* (in which the lid 10 is fully lifted away from the body such that there is no contact between the lid 10 and the wall 18*a*).

In the FIG. 10*b* position, the skirt 22 of the lid 10 aligns the lid 10 relative to the body. This alignment occurs in the plane substantially parallel to a major surface of the lid 10 (e.g. in the x-y coordinates when the container 2 is viewed in plan view).

As will be appreciated from FIG. 10*b*, as the lid 10 is lowered from the position shown in FIG. 10*a*, to the position shown in FIG. 10*b*, the locking projection 112 contacts one of the inclined surfaces 46*a*, 46*b* of the locking member 30. It is the contact between the locking projection 112 and the corresponding inclined surface 46a, 46b which results in a camming action whereby the locking member 30 is urged (horizontally) towards the unlocked configuration. This may otherwise be described as the locking member 30 being pushed, or displaced from an at-rest position, by the locking projection 112. The inclined surface 46a, 46b which is engaged by the locking projection 112, and the direction in which the locking member 30 is displaced, will depend upon the position of the locking mechanism 4 on the wall 18a. This will be described in more detail in connection with FIG. 13 onwards.

Returning to FIG. 10b, as mentioned the lid 10 is urged downwardly towards the wall 18a of the body of the container 2 until the locking projection 112 engages the second inclined surface 46b. Specifically, a corresponding, or proximate, guiding surface 114a, 114b of the locking projection 112 first contacts the inclined surface 46b of the locking member 30. Said contact, and continued downward motion of the lid 10 and so locking projection 112, results in a camming action by the locking projection 112 in which the locking member 30 is slid, or urged, into an offset configuration, relative to the fixed member 32. Put another way, the downward motion of the lid 10 is converted, or transformed, into a horizontal motion of the locking member 30 (relative to the fixed member 32, and so wall 18a).

The camming motion continues to urge the locking member 30 horizontally towards the unlocked configuration whilst the locking projection 112 is within the alignment zone 38 of the opening 34 of the locking member 30. At the position where the locking projection 112 leaves the alignment zone 38, and enters the neck 42 of the opening 34 (i.e. the narrowest point of the opening 34), the locking member 30 is no longer urged horizontally by the downward motion of the locking projection 112. However, the locking member 30 is retained in the same horizontal position by virtue of contact between the locking projection 112 and the vertical surface 48b which defines the neck 42. At the position where the locking projection 112 no longer contacts the vertical surface 48b, the locking member 32 slides into the locked configuration under action of the biasing members 84a, 84b. That is to say, once the locking projection 112 is clear of the neck 42, the biasing members 84a, 84b de-energise and slide the locking member 30 back to the locked configuration. With the locking member 30 in the locked configuration (i.e. that shown in FIG. 9a) the locking projection 112 is retained in the internal corner 50b of the retaining zone 40. In this position, the locking projection 112 cannot be moved vertically through the opening 34 due to the overhang 120 substantially preventing such movement. The locking projection 112, and so the lid 10, are therefore fixed relative to the wall 18a of the body of the container 2.

It will be appreciated that by virtue of the camming motion, or action, the locking projection 112 can be secured by the locking mechanism 4 without the locking member 30 needing to be manually actuated (i.e. an operator does not need to manually urge the locking member 30 into the unlocked configuration in order for the locking projection 112 to be received in the retaining zone 40). That is to say, the locking member 30 can be urged out of the locked configuration, into an unlocked configuration, and then returned to a locked configuration, purely based on the combination of the relative vertical movement between the locking projection 112 and the locking mechanism 4, along with the energising/de-energising of the biasing members 84a, 84b. This is advantageous in providing a more user friendly assembly method whereby the lid 10 can simply be lowered onto a container body and automatically retained by the locking mechanism 4.

Figure 11A:
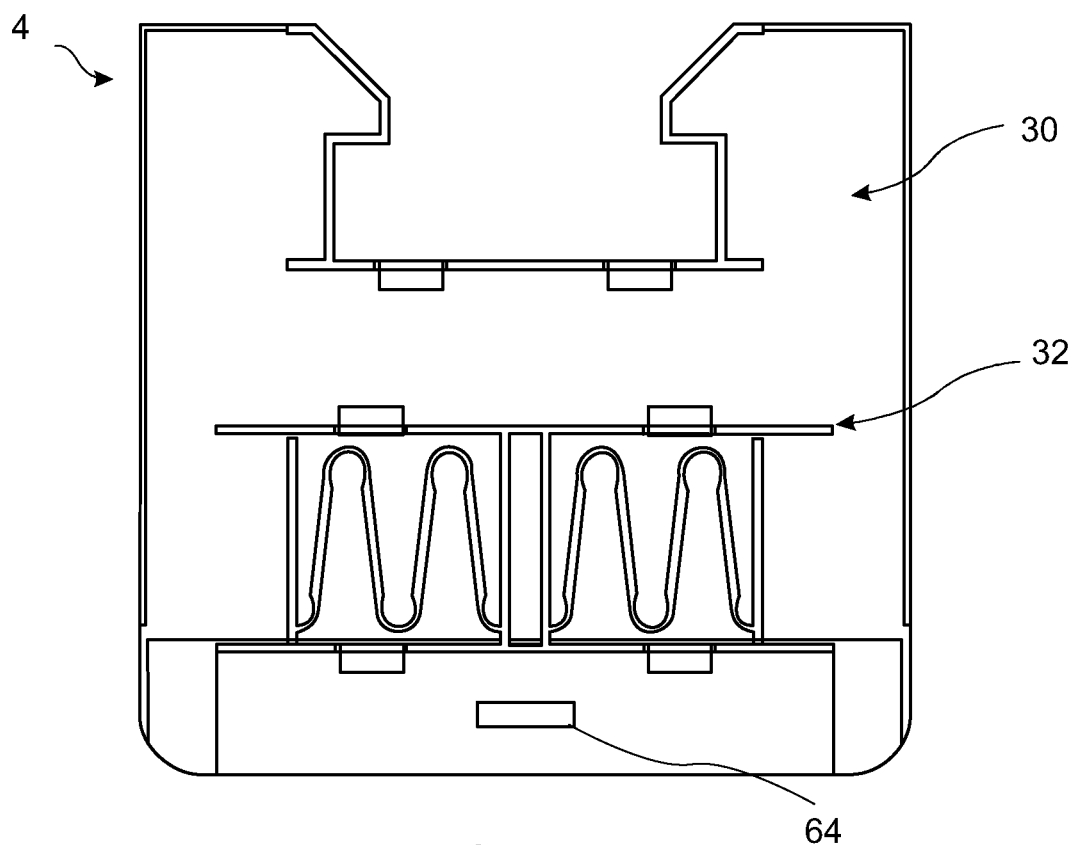
FIG. 11a is a rear view of the locking mechanism shown in FIGS. 3a and 3b, in isolation, in a locked configuration.

Turning to FIG. 11a, many of the features shown have been described in detail elsewhere, and so this description will focus only on the anti-tamper functionality in detail.

In FIG. 11a the locking mechanism 4 is shown in a locked configuration. As was described in connection with FIGS. 3a and 3b, in the locked configuration first and second apertures 62, 64 of the locking member and fixed member 30, 32 respectively, overlap. It will be appreciated that only a perimeter of the aperture 64 of the fixed member 32 is visible in FIG. 11a. With the apertures 62, 64 aligned, a further anti-tamper component can be inserted through the overlapping apertures 62, 64 to secure the locking member 30 in position with respect to the fixed member 32. The anti-tamper component may be, for example, a strap such as a cable tie. By virtue of the anti-tamper component extending through the apertures 62, 64, the locking mechanism 4 cannot be placed in an unlocked configuration. As such, the lid cannot be removed from the body of the container without removing said anti-tamper component. It is therefore possible to tell whether the locking mechanism 4 has been tampered with during transportation (by virtue of whether or not the anti-tamper component has been removed or modified at all). It is therefore possible to ascertain whether there is a risk that the contents of the container have been contaminated and/or accessed during transit. Furthermore, the apertures 62, 64 provide a reusable anti-tamper functionality in that they can be used multiple times (although the anti-tamper component may be single-use).

Figure 11B:
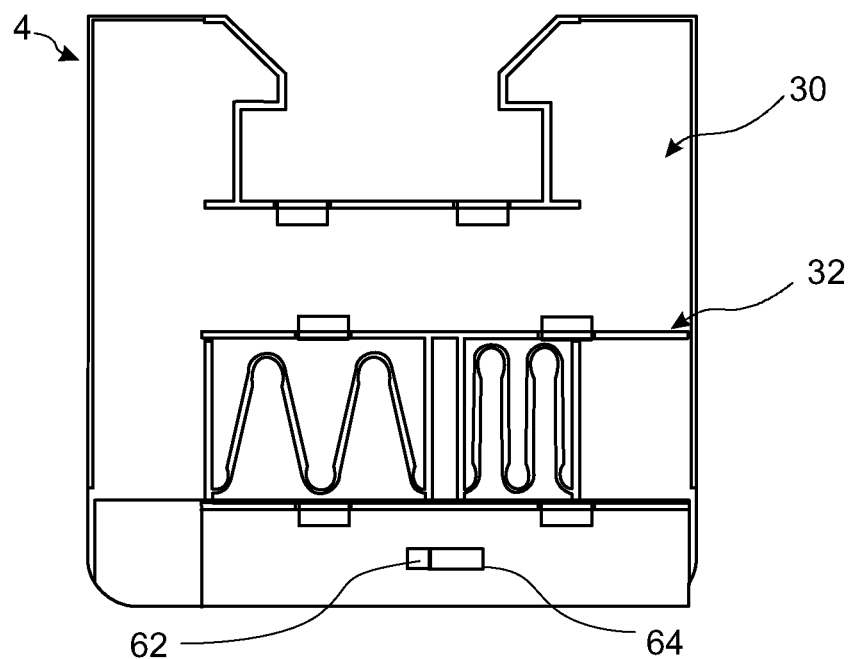
FIG. 11b is a rear view of the locking mechanism of FIG. 11a in an unlocked configuration.

Turning briefly to FIG. 11b, the locking member 30 is shown in an unlocked configuration, and so offset relative to the fixed member 32. It will be appreciated that the aperture 62 of the locking member 30 overlaps the aperture 64 of the fixed member 32 to a lesser extent than that shown in FIG. 11a. By providing an anti-tamper component through the apertures 62, 64, in the alignment shown in FIG. 11a, it will be appreciated that the alignment of apertures 62, 64 as shown in FIG. 11b can be obstructed or prevented. As such, the locking mechanism 4 can be prevented from being urgeable into an unlocked configuration with the anti-tamper component in position. It will be appreciated that, depending upon the size and orientation of the apertures, in some arrangements there may be absolutely no overlap between the apertures in the unlocked configuration. Furthermore, there may be some degree of slidability of the locking member 30, with respect to the fixed member 32, even with an anti-tamper component in position. However, the anti-tamper component may prevent the locking member 30 from being displaced, relative to the fixed member 32, to an extent sufficient to allow a locking projection to be removed through the opening of the locking member 30 (and so allowing the lid to be lifted off of the body of the container).

Figure 12:
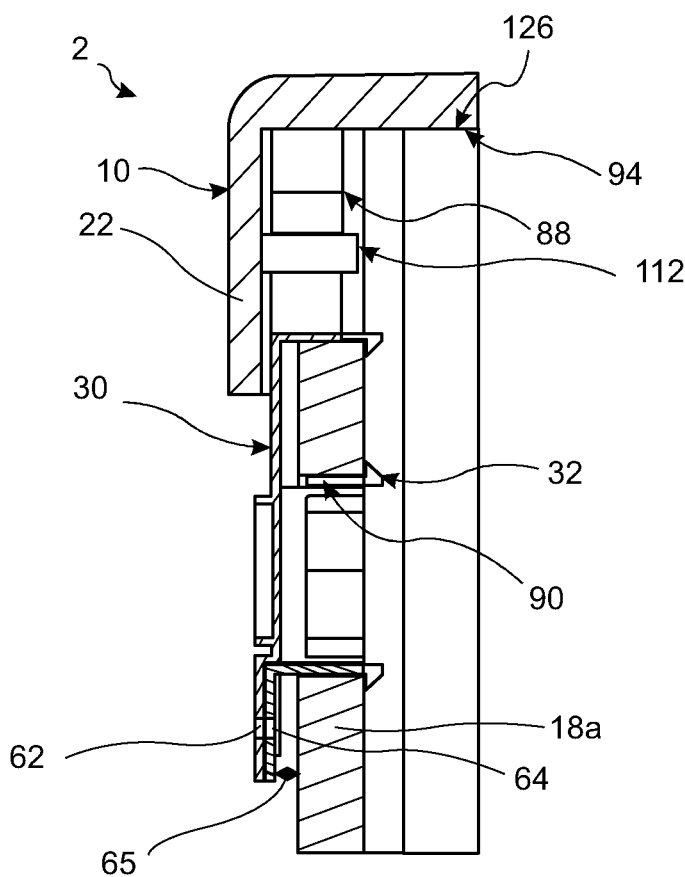
FIG. 12 is a cross section side view of the installed locking mechanism shown in FIG. 9a (shown in the locked configuration)

FIG. 12 shows a cross section side view of part of the container 2 through a centreline of the locking mechanism 4 in the locked configuration. The cross section view of FIG. 12 is taken through the plane labelled 101 in FIG. 9a. Also shown are the lid 10 and locking projection 112 in situ. Cross hatching is used in FIG. 12 to indicate the features/components that are partly cutaway in this orientation.

FIG. 12 shows the locking projection 112 extending from the skirt 22 of the lid 10. The locking projection 112 is shown retained by the locking member 30 in the locked configuration in FIG. 12. The cross section of FIG. 12 also shows the outer edge 94 of the body of the container 2 engaging, or abutting, the engagement surface 126 of the lid 10.

FIG. 12 demonstrates the alignment of the apertures 62, 64 of the locking member 30 and fixed member 32 respectively when the locking mechanism 4 is in the locked configuration. FIG. 12 also indicates how the apertures 62, 64 are vertically offset from both of the inner and outer cavities 88, 90 of the corresponding split cavity. Advantageously this means that the apertures 62, 64 do not provide an externally exposed path through the locking mechanism 4, which could otherwise pose a contamination risk. The apertures 62, 64 are also offset from an adjacent outer surface of the wall 18 by an offset 65. This advantageously means that the aperture 64, of the fixed member 32, is not unduly obstructed by the wall 18*a* (and means an anti-tamper component can be inserted therethrough more easily).

Figure 13:
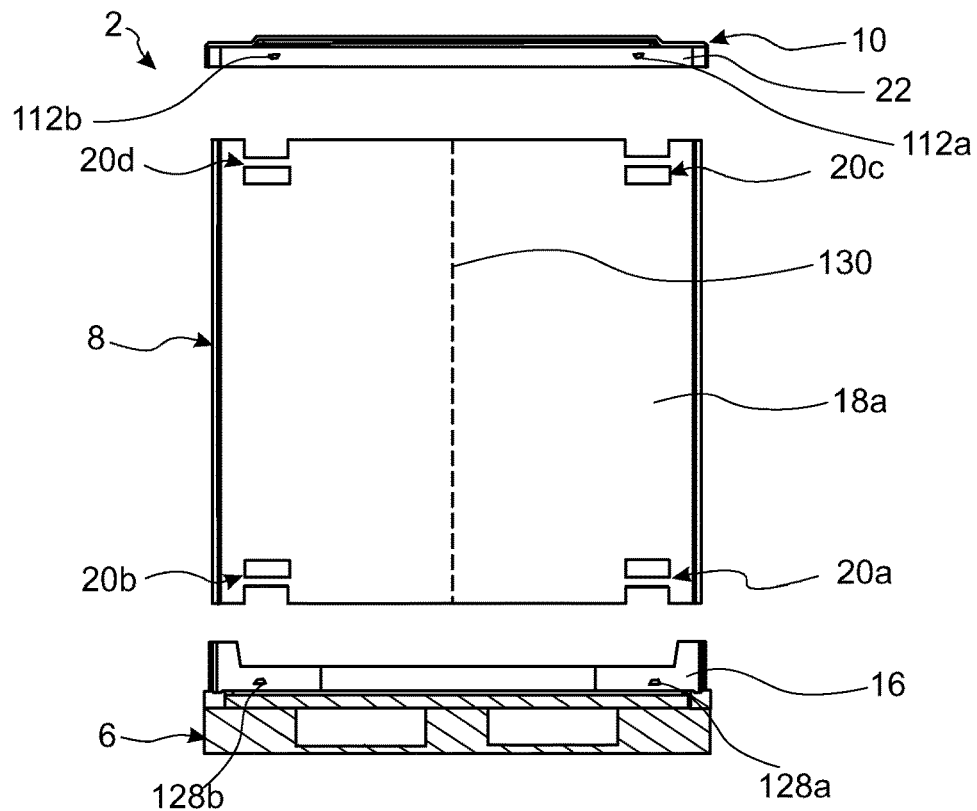
FIG. 13 is an exploded cross section side view of an interior of the container shown in FIG. 2 with locking mechanisms omitted.

FIG. 13 is a cross section, rear and exploded view of the container 2 with locking mechanisms omitted. FIG. 13 therefore shows only the base 6, the body 8 and the lid 10. The plane through which the cross section is taken, and direction of view, is indicated by the plane 103 in FIG. 1 (although, as mentioned, FIG. 13 is an exploded view with locking mechanisms omitted).

FIG. 13 illustrates the array of split cavities 20*a*, 20*b*, 20*c*, 20*d* which the body 8 of the container 2 comprises. Specifically, one split cavity is provided in each corner of the first wall 18*a* of the body 8 of the container 2. As will be appreciated from the combinations of FIGS. 1 and 2, only two walls 18*a*, 18*c* of the four which make up the body 8 comprise such split cavities. That is to say, only one pair of opposing walls 18*a*, 18*c* comprises split cavities. The other pair of opposing walls 18*b*, 18*d* is entirely solid and does not incorporate any split cavities (or cavities whatsoever). The split cavities 20*a*, 20*b*, 20*c*, 20*d* may be grouped as a first pair 20*a*, 20*b* proximate the base 6, and a second pair 20*c*, 20*d* proximate the lid 10.

FIG. 13 also shows locking projections 112*a*, 112*b* provided on the lid 10, and specifically on the skirt 22 thereof. Similarly, FIG. 13 also shows locking projections 128*a*, 128*b* projecting from the base 6, and specifically from the lip 16 thereof. FIG. 13 shows how the locking projections 112*a*, 112*b* of the lid 10 are closer to a (vertically extending) horizontal centreline 130 of the body 8, and so the wall 18*a*, than the locking projections 128*a*, 128*b* of the base 6. Put another way, the (horizontal) separation between the locking projections 112*a*, 112*b* of the lid 10 is less than the (horizontal) separation between the locking projections 128*a*, 128*b* of the base 6.

The locking mechanisms associated with the locking projections 112*a*, 112*b* of the lid 10 are unlocked in a direction moving towards the centreline 130 (or in an inward direction). The locking mechanisms associated with the locking projections 128*a*, 128*b* of the base 6 are unlocked in a direction moving away from the centreline 130 (or in an outward direction). The relative separation between the locking projections therefore determines, at least partly, which direction the corresponding locking member moves in to enter the unlocked configuration from the locked configuration. This will be described in detail below. The directions of unlocking, mentioned above, are the same for the corresponding locking mechanisms installed on a second wall which opposes the (first) wall 18*a*. That is to say, where locking mechanisms are installed on two opposing walls, the locking mechanisms provided proximate the base 6 may be unlocked by urging the locking members thereof in a direction away from the centreline 130. Similarly, locking mechanisms provided proximate the lid 10 may be unlocked by urging the locking members thereof in a direction towards the centreline 130. This may be described as the locking mechanisms proximate the base or lid being unlocked by urging the respective locking members either inwardly, towards the centreline 130, or outwardly, away from the centreline 130. The unlocking directions, for locking mechanisms provided proximate the base 6 or lid 10 may be said to be mirrored on the opposing wall. It will be appreciated that, in some embodiments, the directions of unlocking may be reversed, e.g. by repositioning the locking projections, or may differ between the groups of mechanisms proximate the base and/or lid.

Figure 14:
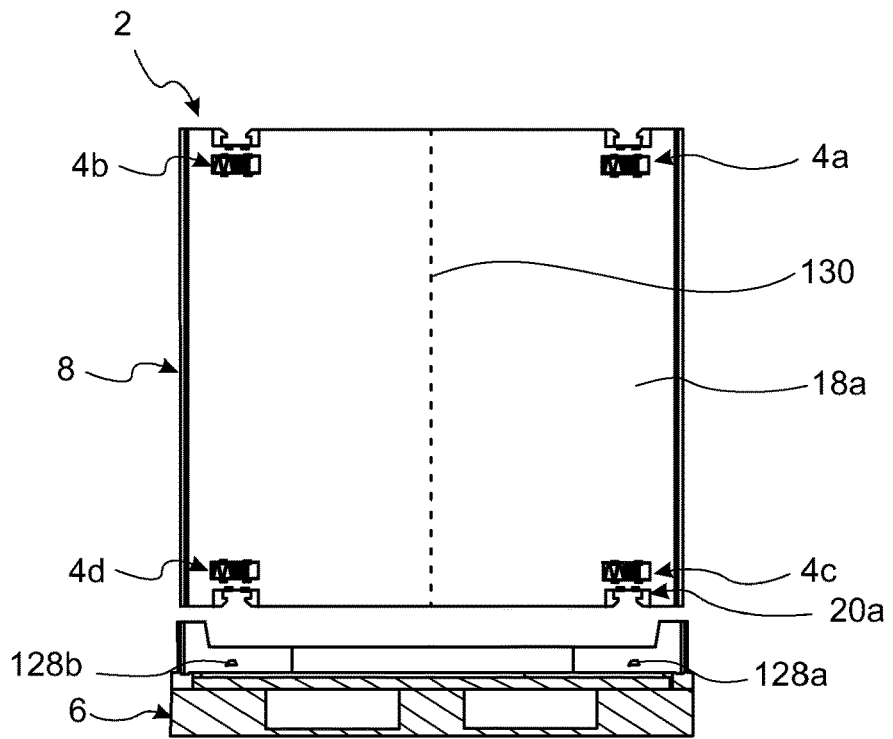
FIG. 14 is an exploded cross section side view of an interior of the container of FIG. 13, with lid omitted, with four locking mechanisms installed in situ.

FIG. 14 shows the container 2 of FIG. 13, with the lid 10 omitted, and with four locking mechanisms 4*a*, 4*b*, 4*c*, 4*d*, attached to the wall 18*a*. It will be appreciated, from FIG. 14, that the locking mechanisms 4*a*, 4*b* are provided proximate the lid (or are associated with locking projections 112*a*, 112*b* of the lid), whereas the locking mechanisms 4*c*, 4*d* are provided proximate the base 6 (or are associated with locking projections 128*a*, 128*b* of the base 6). The same design of locking mechanism 4 can therefore be used in order to connect the body 8 to the base 6, and also to lock the lid 10 to the body 8.

The arrangement of the locking projections 128*a*, 128*b* on the base 6, and their interactions with the corresponding locking mechanism 4*c*, 4*d* is generally the same as that described in connection with FIGS. 9*a* to 10*b*. That is to say, the body 8 of the container 2 can be urged against the base 6 such that the locking mechanisms 4*c*, 4*d* proximate the base 6 actuate automatically such that the respective locking members are urged out of the locked configuration, so as to receive the corresponding locking projection 128*a*, 128*b* before then being biased back towards a locked configuration in which the respective locking projection 128*a*, 128*b* is retained. The only difference between the sets of locking projections is, as mentioned above in connection with FIG. 13, that the direction of unlocking differs depending on whether the locking projection is provided proximate an inner side of the respective split projection (e.g. proximate the centreline 130) or towards an outer side of the respective split projection (e.g. distal the centreline 130). For example, in FIG. 14, the locking projection 128*a* on the right-hand side of the base 6 is provided proximate a horizontally outer wall of the corresponding split cavity 20*a*. The locking mechanism 4*c*, specifically the locking member thereof, will therefore be urged outwardly (i.e. away from the centreline 130) during the camming motion. Similarly, the locking mechanism 4*d*, specifically the locking member thereof, will be urged outwardly by the locking projection 128*b*. This is in contrast to the locking mechanism 4*a*, specifically the locking member thereof, which would be urged inwardly (i.e. towards the centreline 130) by the corresponding locking projection 112*a*.

Figure 15A:
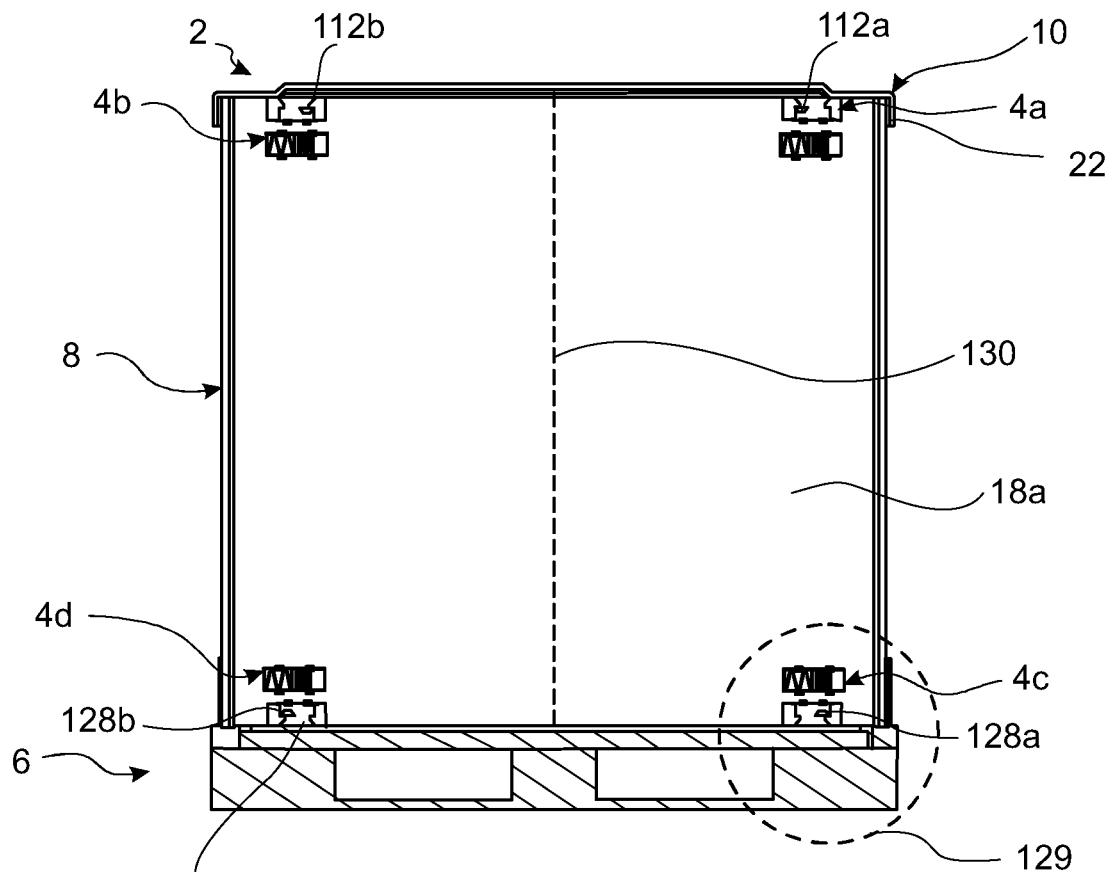
FIG. 15a is a cross section side view of an interior of an assembled container, incorporating four locking mechanisms, with the lid and base secured to the body.

FIG. 15*a* shows the container 2 of FIG. 14, with locking mechanisms 4*a*, 4*b*, 4*c*, 4*d*, attached to the wall 18*a*. The lid 10 is secured to the body 8 of the container, and the body 8 is secured to the base 6.

FIG. 15*a* illustrates how each of the locking projections 112*a*, 112*b*, 128*a*, 128*b* are retained by a locking member of a respective locking mechanism 4*a*, 4*b* and 4*c*, 4*d*. FIG. 15*a* also shows how the locking projections 128*a*, 128*b* of the base 6 are retained in an 'outward' position (i.e. further away from centreline 130 of the body 8) in comparison to the locking projections 112*a*, 112*b* of the lid 10 which are retained in an 'inward' position (i.e. comparatively closer to the centreline 130 of the body 8).

Figure 15B:
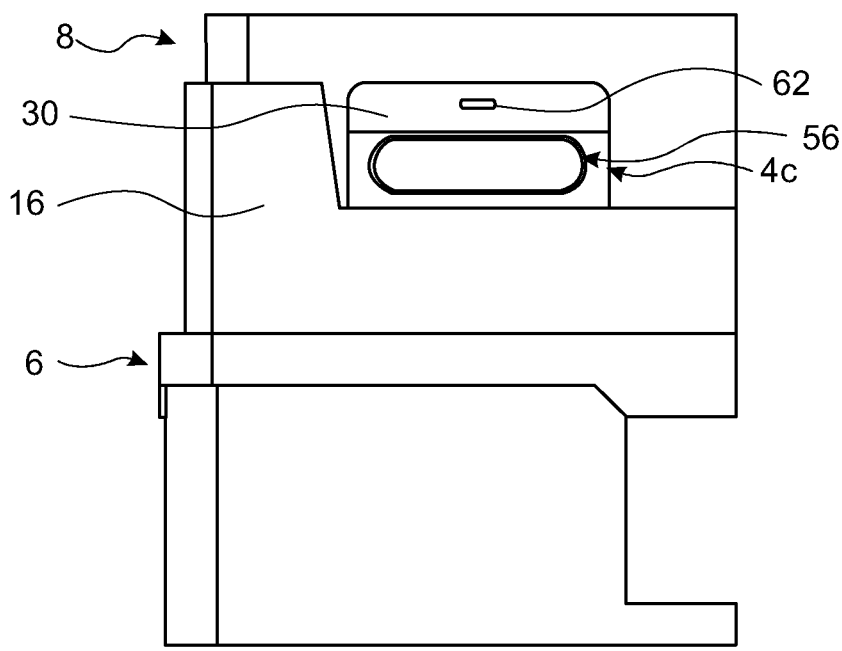

Finally, FIG. 15*b* is an external front view of the locking mechanism 4*c* proximate the base 6 as shown in FIG. 15*a*, and specifically of the area indicated with the circle 129 in FIG. 15*a*. FIG. 15*b* therefore indicates how much of the locking mechanism 4 is visible externally.

Only part of the locking member 30 is visible from an exterior of the container 2 proximate the base 6. Part of the locking member 30 is obscured by the skirt 16 of the base 6. However, it will be appreciated that at least the grip portion 56 is still exposed and can therefore be accessed by an operator. Also of note, even in the partially obscured state shown in FIG. 15*b*, the aperture 62 of the locking member 30 (and a corresponding aperture located behind it, forming part of the fixed member) is still accessible. That is to say, and as described in detail in connection with FIGS. 11*a* to 12, an anti-tamper component can be provided through the overlapped apertures so as to secure the locking mechanism 4*c* in the locked configuration (therefore preventing tampering). For completeness, it will also be appreciated that the locking member 30 can be translated, or can slide horizontally, so as to place the locking mechanism 4*c* in an unlocked (or offset) configuration (assuming that no anti-tamper component is inserted through the apertures, which would otherwise substantially prevent such movement).

Advantageously, being able to detach, or disconnect, the lid and/or base from the body of the container facilitates cleaning and folding.

Being able to connect, or secure, the lid and base to the body of the container is advantageous in being able to more easily assemble, or erect, the container, and when tilting/inverting is needed to discharge the contents of the container.

FIG. 16 is a perspective view of a container according to another embodiment.

The container 200 comprises a base in the form of a modified pallet (which is omitted from FIG. 16), a body 204 (in the form of a sleeve) and a lid 206. The lid 206 is shown hanging from the body 204, which will be described below. Two locking mechanisms 208*a*, 208*b* are shown installed on the first wall 210*a* of the body 204. A further two locking mechanisms are installed in the positions 211*a*, 211*b* at the bottom of the first wall 208*a* (proximate the base), but are also omitted from FIG. 16.

Like the previous embodiments, the body 204 comprises two pairs of opposing walls 210*a*, 210*c* and 210*b*, 210*d*. Also like the previous embodiments, one pair of walls 210*b*, 210*d* does not have any locking mechanism installed thereon. The container 200 differs from the previous embodiments in that the container 200 comprises only four locking mechanisms 208*a*, 208*b*, and locking mechanisms installed in positions 211*a*, 211*b*, as opposed to eight locking mechanisms (as for the container 2 shown in FIG. 2). Also of note, the first wall 210*a* is the only wall which comprises four split cavities, two proximate the base and two proximate the lid. The third wall 208*c* comprises two split cavities proximate the lid, but no split cavities proximate the base. Locking mechanisms are installed only on the first wall 210*a* in this embodiment.

Four locking mechanisms 208*a*, 208*b* (and mechanisms at positions 211*a*, 211*b*) are provided on the first wall 210*a* of the body 204. The two illustrated locking mechanisms 208*a*, 208*b* are provided proximate the lid 206 (i.e. towards a top of the body 204). These two locking mechanisms 208*a*, 208*b* are the only locking mechanisms provided on the body 204 proximate the lid 206, and are therefore the only locking mechanisms 208*a*, 208*b* which interact with the lid 206 to unlock, or open, the container 200. That is to say, an opposing third wall 210*c* does not comprise locking mechanisms proximate the lid 206. The locking mechanisms 208*a*, 208*b*, provided proximate the lid 206, are also used to secure a hatch 214, or (drop) door, which is hingeably attached to a fixed portion 216 of the first wall 210*a*. These locking mechanisms 208*a*, 208*b* are therefore advantageously multipurpose.

In a similar manner, the locking mechanisms installed in positions 211*a*, 211*b* are also provided on the first wall 210*a* of the body 204. These mechanisms are provided proximate the base (i.e. towards a bottom of the body 204). These locking mechanisms are the only locking mechanisms provided on the body 204, proximate the base 206, which interact with the base in use. That is to say, the third wall 210*c* does not comprise locking mechanisms proximate the base.

The two sets of locking mechanisms 208*a*, 208*b*, and those installed in positions 211*a*, 211*b*, are advantageously provided on the same wall (the first wall 210*a*).

Whilst fewer locking mechanisms are provided as part of the container 200, the body 204 is still secured to both the base and lid 206 in use. It will be appreciated that other retention, or securing, means may be used to affix, or latch, the third wall 210*c* to the base and lid 206. The arrangement, or layout, of locking mechanisms depicted in FIG. 16 means that a reduced number of locking mechanisms can be used. Assembly, disassembly, locking and unlocking of the container 200 may be more straightforward as a result. This is at least because all of the locking mechanisms can be unlocked from a single side of the container 200 (and so by a single operator).

As briefly described above, the lid 206 is shown hanging from the third wall 210*c* of the body 204 in FIG. 16. This provides a convenient position to store the lid 206 whilst access to the interior of the container 200 is required. Put another way, it is a convenient place to put the lid 206 whilst the container 200 is open. The lid 206 comprises a plurality of mounting projections 218*a*, 218*b*. The mounting projections 218*a*, 218*b* extend from an underside 206*a* of the lid 206. The mounting projections 218*a*, 218*b* are generally cylindrical in the illustrated embodiment, but it will be appreciated that other geometries may otherwise be used. Any geometry which fits within a respective opening defined by the third wall 210*c* may be used. The mounting projections 218*a*, 218*b* are smaller than the openings to allow for the lid 206 to be readily lifted from the stored position (of FIG. 16) and be placed onto the body 204 to close the container 200. Put another way, the mounting projections 218*a*, 218*b* should be readily withdrawable from the respective openings.

FIGS. 17 and 18 show two examples of anti-tamper components suitable for use with the locking mechanism according to the invention.

FIG. 17 is a part cutaway perspective view of a lid 250 secured to a body 252. A first anti-tamper component 254 is shown securing the lid 250 to the body 252. The first anti-tamper component 254 comprises a first portion 256 and a second portion 258. In use, the first portion 256 is generally parallel to the respective wall of the body 252. The second portion 258 extends generally perpendicularly from the first portion 256. The second portion 258 extends through openings in the lid 250 and the body 252 (specifically through skirts/flanges 251, 253 of the lid 250 and body 252 respectively), said openings aligning with each other when the lid 250 is placed on the body 252. A growth 259, extending from a distal end of the second portion 258, retains the first anti-tamper component 254 in position. It will be appreciated that when the first anti-tamper component 254 is inserted, as shown in FIG. 17, the lid 250 cannot be removed from the body 252. In order to remove the lid 250, the first anti-tamper component 254 must be removed or destroyed. The first anti-tamper component 256 is inserted by urging the first portion 256 towards the body 252 when the second portion 258 is aligned with the openings in the lid 250 and body 252.

Figures 20, 20B:
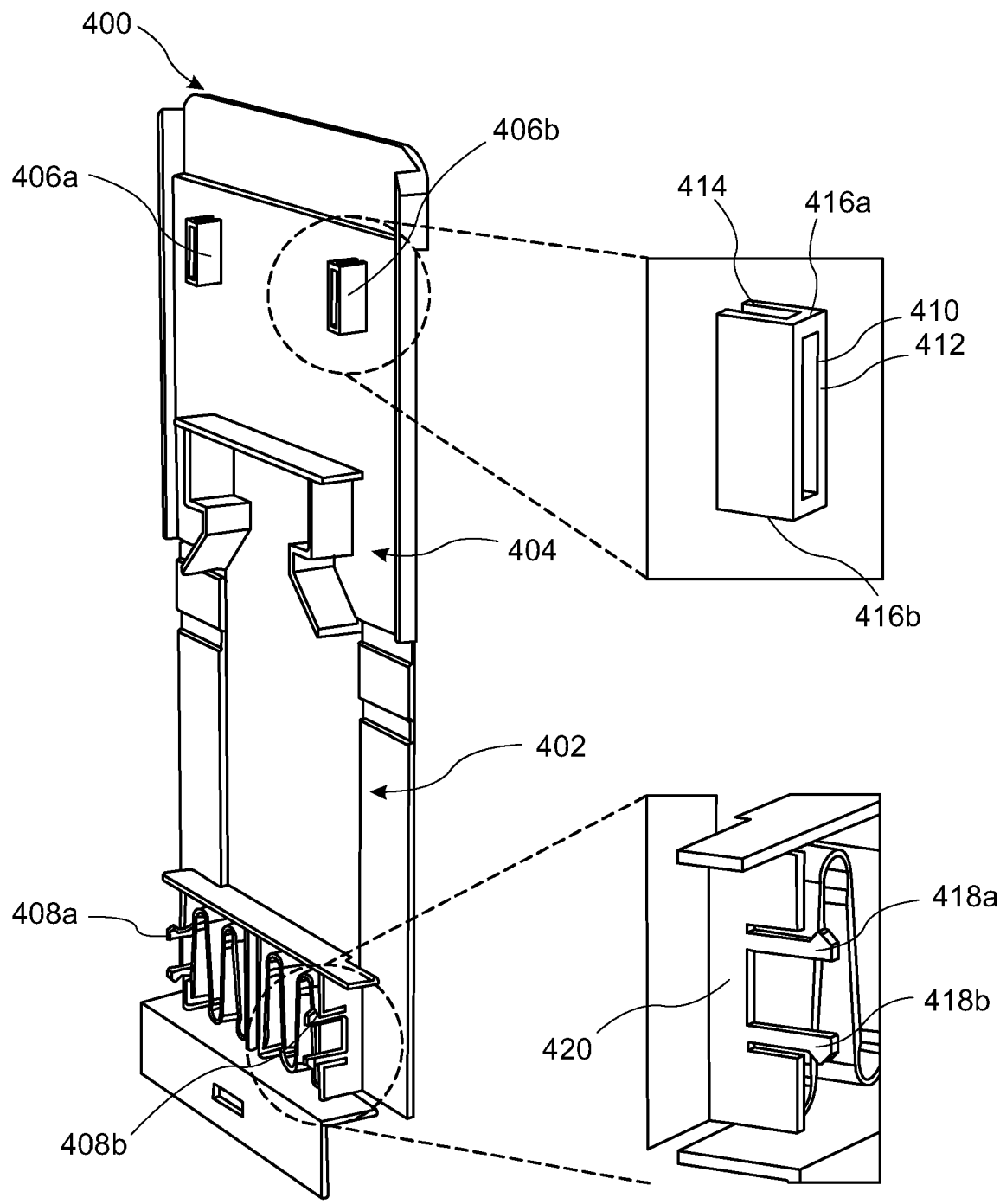
FIG. 20 is a perspective view of a locking mechanism according to another embodiment, with magnified portions of a receiving feature 406b and an engagement feature 408b thereof illustrated in FIG. 20b.

FIG. 18 is a perspective view of the lid 250 and body 252, with a second, alternative anti-tamper component 260 securing the lid 250 to the body 252. The second anti-tamper component 260 is tag-like, or similar to a cable tie, in that it comprises an elongate strap 262. Before it is secured, one end of the elongate strap 262 is a 'free' end. Said free end is inserted through aligning openings in the lid 250 and body 252 and is then secured to a tab 264 of the second anti-tamper component 260. The elongate strap 262 thus forms a closed loop, limiting the extent to which the lid 250 can be lifted from the body 252. Again, and like that described above, the second anti-tamper component 260 thus prevents inadvertent opening of the container in that the second anti-tamper component 260, once installed (as shown in FIG. 20), must be destroyed (e.g. cut) in order for the interior of the container to be accessed.

Figure 19:
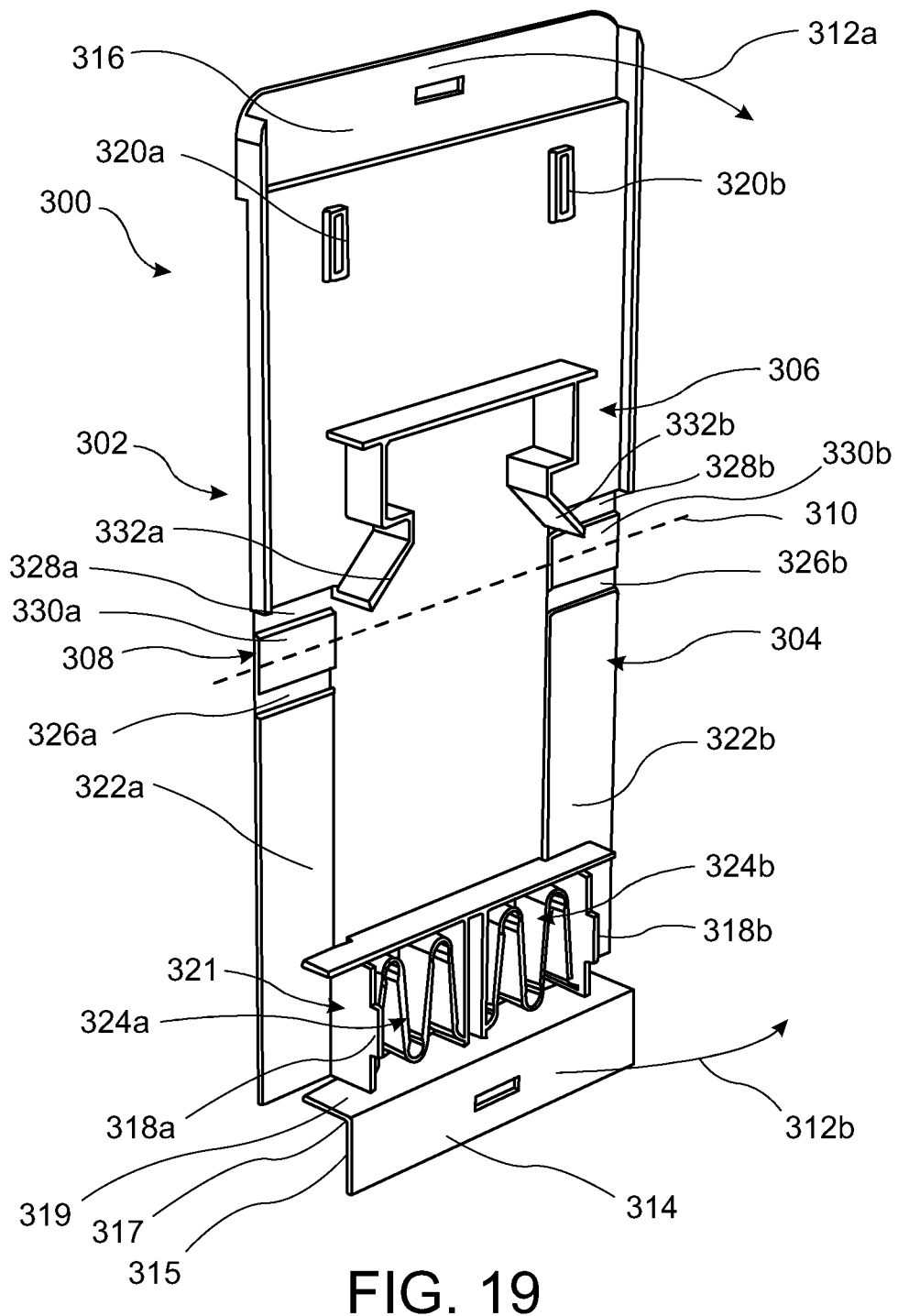
FIG. 19 is a perspective view of a locking mechanism according to another embodiment.

FIG. 19 is a perspective view of a locking mechanism 300 according to another embodiment.

The locking mechanism 300, in FIG. 19, is shown in a pre-installation state. That is to say, the locking mechanism 300 in FIG. 19 is not shown in an installed state. The steps for installing the locking mechanism 300, and final appearance of the installed mechanism, will be described in connection with FIGS. 21a-22b.

The locking mechanism 300 shares many features in common with the locking mechanism 4 shown in FIGS. 3a and 3b and, once installed, the functionality of the locking mechanism 300 is the same as the locking mechanism 4. The locking mechanism 300 differs from the locking mechanism 4 in that a locking member 302, of the locking mechanism 300, comprises two hingeably connected elements 304, 306.

A hinge portion 308 is provided between the hingeably connected elements 304, 306. The hingeably connected elements 304, 306 can be urged, or rotated, towards one another, around an axis schematically indicated 310, in directions indicated by arrows 312a, 312b. When the hingeably connected elements 304, 306 have been rotated by around 180° (e.g. such that flange 314 is received by recess 316), the hingeably connected elements 304, 306 are then secured to one another (in the rotated arrangement). In this embodiment, the securing occurs by way of an interference fit. Specifically, tabs 318a, 318b are received by corresponding recesses 320a, 320b. The tabs 318a, 318b are retained within the recesses 320a, 320b by friction. As will be described in connection with FIGS. 21a-f, the hingeably connected elements 304, 306 being rotated, and secured in the rotated arrangement, replaces the clips used to connect the locking mechanism of previous embodiments to the body of the container.

The hinge portion 308 comprises a first pair of hinges 326a, 326b, a second pair of hinges 328a, 328b and thickened portions 330a, 330b. As will be appreciated from FIG. 19, a respective hinge from the first pair of hinges 326a, respective thickened portion 330a and respective hinge from the second pair of hinges 328a extends between the first and second hingeably connected elements 304, 306. Each of the first pair of hinges 326a, 326b and second pair of hinges 328a, 328b is of the form of a living hinge. The thickened portions 330a, 330b are provided between the first and second pairs of hinges 326a, 326b, 328a, 328b. In use, when the locking mechanism 300 is installed, the thickened portions 330a, 330b cooperate with the inclined surfaces 332a, 332b to define an outer edge of the locking member 302. That is to say, a geometry similar to that shown in the uppermost part of FIG. 4a is defined by a combination of the thickened portions 330a, 330b and the second hingeably connected element 306 (specifically inclined surfaces 332a, 332b thereof).

The locking mechanism 300 further comprises a fixed member 321 which, save for the tabs 318a, 318b replacing the clips, is otherwise identical to the fixed member 32 shown in FIGS. 3a, 3b and 5a, 5b in connection with locking mechanism 4. Like the previous embodiment, the locking member 302 is movable relative to the fixed member 321 between a locked and unlocked configuration and, in the locked configuration, secures a lid or base to the body of a container.

Of note, the flange 314 and a first track projection 319, which form part of the fixed member 321, cooperate to define an internal corner 317. Once installed, the internal corner 317 receives a lower edge of an inner cavity on the body (e.g. 91 in FIG. 21a). Also once installed, an engagement face 315, of the flange 314, engages an outer face of the wall so as to align the first hingeably connected element 304 substantially vertically, or parallel to the wall. See, for example, FIGS. 21b and 21c.

The first hingeably connected element 304 comprises two elongate bands 322a, 322b which, once the first and second hingeably connected elements 304, 306 are secured together in a rotated configuration, form part of a closed loop of material which prevents removal of the locking mechanism 300 from the body of the container.

For completeness, biasing members 324a, 324b are provided between the fixed member 321 and the locking member 302 such that the locking member 302 is biased towards a locked, or aligned, configuration.

FIG. 20 is a perspective view of a locking mechanism 400, in a pre-installation state, according to another embodiment. The locking mechanism 400 shares many features in common with the locking mechanism 300, but the hingeably connected elements 402, 404 are secured together, when in a rotated arrangement, using alternative means.

A first of the hingeably connected elements 402 comprises engagement features 408a, 408b. A second of the hingeably connected elements 402 comprises receiving features 406a, 406b. The engagement features 408a, 408b are snap-fitted, in use, into receiving features 406a, 406b to secure the hingeably connected elements 402, 404 in the rotated arrangement. The rotated arrangement may otherwise be described as the hingeably connected elements 402, 404 being provided in facing relations with one another.

FIG. 20a is a magnified perspective view of the receiving feature 406b. The receiving feature 406b comprises an opening 410 defined in an outer face 412. The receiving feature further comprises a recess 414 which extends between end faces 416a, 416b of the receiving feature 406b. The combination of opening and recess facilitates the receipt of the engagement features by the receiving feature 406b.

FIG. 20b is a magnified perspective view of the engagement feature 408b. The engagement feature 408b comprises a pair of clips 418a, 418b. The clips 418a, 418b are elastically deformable. The clips 418a, 418b extend from a guiding projection 420.

A method of installing the locking mechanism 300 will now be described with reference to FIGS. 21a-e. Whilst these Figures refer to the locking mechanism 300, it will be appreciated that the method of installation of the locking mechanism 400 is substantially the same.

Beginning with FIG. 21a, part of an outer (i.e. external) face of a first wall 18a of a body of a container is shown. As described in earlier embodiments, the first wall 18a comprises a split cavity 20c defining an outer cavity 88 and inner cavity 90 separated by a support web 92. The outer cavity 88 opens out into an outermost (top) edge 94 of the first wall 18a, whereas the inner cavity 90 is entirely separate from the outer edge 94 of the wall 18a. The split cavity 20c is the same as that shown in, and described in connection with, FIGS. 2 and 7.

Turning to FIG. 21b, in a first installation step the locking mechanism 300 is introduced to the first wall 18a. The locking mechanism 300 is initially in a non-rotated arrangement, or is a non-folded arrangement (e.g. that shown in FIG. 19). This may otherwise be described as an arrangement where the first and second hingeably connected elements 304, 306 have not been urged towards one another, or are not in facing relations with one another. This may further be described as the locking mechanism 300 being in an extended, or elongate, configuration.

In the first installation step, the flange 314 of the locking mechanism 300 (specifically the fixed member 321 thereof), is passed through the inner cavity 90. The flange 314 is passed in a direction moving from an inner face of the first wall 18a to the outer face of the first wall 18a (or generally coming out of the plane of the page as shown in FIG. 21b). The flange 314 is narrower than the surrounding features of the first hingeably connected element 304. As such, only the flange 314 can be received through the inner cavity 88. When the flange 314 is received through the inner cavity 88, the locking mechanism 300 is rotated (in a direction 312a) such that an engagement face (labelled 315 in FIG. 19) of the flange 314 contacts the outer surface of the wall 18a. A lower edge 91 (see FIG. 21a) of the inner cavity 90 thus receives an internal corner (labelled 317 in FIG. 19) defined by the flange 314 and the first track projection 319.

Turning to FIG. 21c, once the locking mechanism 300 has been rotated such that the engagement face of the flange 314 contacts the outer surface of the wall 18a, the locking mechanism 300 is generally parallel to the first wall 18a. The flange 314 is thus also generally parallel to the first wall 18a. Further rotational travel of the first hingeably connected element 304 is thus substantially prevented. However, the second hingeably connected element 306 continues to be urged towards the first hingeably connected element 304 in direction 312a. The second hingeably connected element 306 is thus rotated towards the first hingeably connected element 304 generally about axis 310, which may align with the outer edge 94 of the first wall 18a.

FIG. 21d shows the second hingeably connected element 306 continuing to be urged towards the first hingeably connected element 304, generally about axis 310 in direction 312a.

FIG. 21e shows the locking mechanism 300 in an installed, or rotated, configuration. In the FIG. 21e arrangement, the second hingeably connected element 306 has been secured to the first hingeably connected element (obscured from view in FIG. 21e) (e.g. by projecting features 318a, 318b and recesses 320a, 320b in FIG. 19). The first and second hingeably connected elements 304, 306 are thus provided in facing relations with one another, and are secured over the outer edge 94 of the first wall 18a. As shown in FIG. 19, the recess 316 also receives the flange 314. The locking member 302 of the locking mechanism 300 can thus be moved, in a direction indicated by arrow 307, relative to the fixed member (not visible in FIG. 21e) of the locking mechanism 300 (as described in connection with earlier Figures).

Figure 22A:
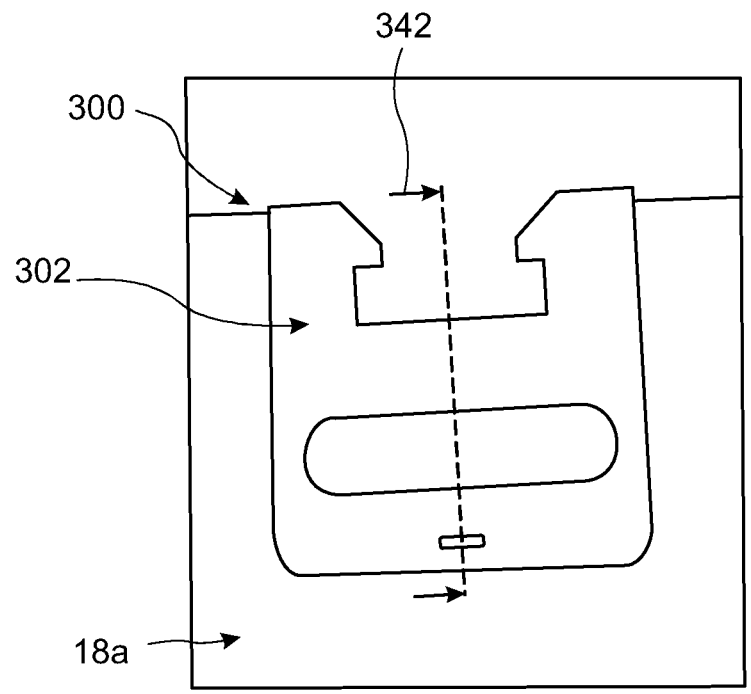
FIGS. 22a and 22b are front and rear views of the locking mechanism of FIG. 19 installed on a body of a container.

FIG. 22a is an external view (or a view of a front of) of the locking mechanism 300 in an installed configuration, and which generally corresponds with FIG. 21e. The locking mechanism 300 is thus shown installed on the first wall 18a. Only the locking member 302 of the locking mechanism 300 is visible in FIG. 22a. In FIG. 22a the locking member 302 is shown in a locked (or aligned) configuration, although no lid is shown.

Figure 22B:
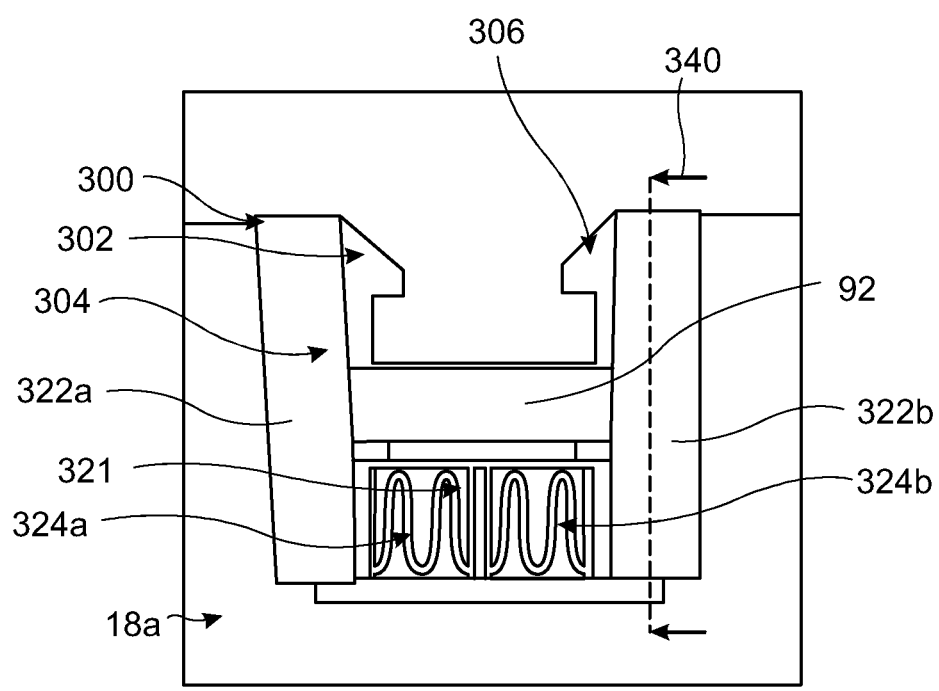

FIG. 22b is an internal view (or a view of a rear of) the locking mechanism 300 in the installed configuration. Both the locking member 302 and fixed member 321 are partly visible in FIG. 22b. Similarly, both first and second hingeably connected elements 304, 306 are at least partly visible. As will be appreciated from comparing FIG. 22b with FIG. 8a (showing the locking mechanism 4 installed), the locking mechanism 300 appears similar to the locking mechanism 4 when installed. Differences, however, include the omission of clips, and the bands 322a, 322b which extend over the support web 92 and over other parts of the surrounding inner face of the first wall 18a. The bands 322a, 322b effectively replace the clips in being the features which substantially prevent the locking mechanism 300 from being removed from the wall 18a, in a direction normal to the outer surface thereof, in use.

For completeness, FIG. 22b shows the biasing members 324a, 324b extending between the fixed member 321 and the locking member 302 in the same way as described in connection with earlier embodiments.

FIG. 23a is a perspective cross section view of the locking mechanism 300 installed on the first wall 18a of a container. The section view is taken about a plane labelled 340 in FIG. 22b.

FIG. 23a indicates how the first and second hingeably connected elements 304, 306 (defining the locking member 302) cooperate to secure the locking mechanism 300 to the first wall 18a. Specifically, FIG. 23a indicates how the first hingeably connected element 304, and elongate bands 322a, 322b thereof, is secured over the support web 92 of the first wall 18a.

The tab 318b (provided on the first hingeably connected element 304, as shown in FIG. 19) is also shown to be received by the corresponding recess 320b (provided on the second hingeably connected element 306). A further tab, and corresponding recess, are also present but not visible in FIG. 23a. The two hingeably connected elements 304, 306 are thus secured to one another around the support web 92. This secures the locking mechanism 300 to the first wall 18a, but still allows for relative movement of the locking member 302 about the fixed member 321 and the first wall 18a.

FIG. 23b is an alternative perspective cross section view of the locking mechanism 300 installed on the first wall 18a. The section view is taken about a plane labelled 342 in FIG. 22a.

FIG. 23b shows the alignment of apertures 344, 346, provided in the locking member 302 and fixed member 321 respectively, when the locking mechanism 300 is in a locked configuration. The apertures 344, 346 provide anti-tamper functionality as described in connection with the previous embodiments (and as shown in, for example, FIG. 17).

FIG. 24 is an external view of a locking mechanism 500, according to a further embodiment, installed on a first wall of a container. Many of the features of the locking mechanism 500 are shared in common with the previous embodiments, and will thus not be described in detail.

Like the previous embodiments, the locking mechanism 500 comprises a locking member 502 and a fixed member (not visible in FIG. 24). The locking member 502 is moveable about the fixed member.

One distinguishing feature of the locking mechanism 500 is the incorporation of additional anti-tamper features, and specifically the incorporation of two sets of anti-tamper features.

Like the previous embodiments, the locking member 502 comprises an aperture 504. The aperture 504 is generally rectangular, or letterbox-shaped. The fixed member, obscured from view in FIG. 24 by the locking member 502, comprises a corresponding aperture to the aperture 504. An anti-tamper component, such as that shown in FIG. 17, is receivable by the aligned apertures 504 when the locking mechanism 500 is in a locked configuration (i.e. as shown in FIG. 24). With the anti-tamper component inserted through the apertures 504, the locking mechanism 500 cannot be placed in an unlocked configuration (i.e. unlocked). Put another way, the locking member 502 cannot be moved relative to the fixed member (and so first wall 18a). Such movement requires the removal of the anti-tamper component. The anti-tamper component can thus be used to securely seal the container, to reduce the risk of tampering, and to also provide evidence of when the container may have been tampered with (i.e. by virtue of the removal of the anti-tamper component).

As well as the first, generally rectangular apertures 504, which may be referred to as a first set of anti-tamper features, or apertures, the locking mechanism 500 further comprises a second set of anti-tamper features, or apertures. A second aperture 506, visible on only the locking member 502 in FIG. 24, is generally square. The fixed member again comprises a corresponding aperture to the second aperture 506 (but which is obscured from view in FIG. 24). The second apertures 506 work in substantially the same way as that described above in connection with the first apertures 504. Of note, whilst the first apertures 504 are particularly suited to a generally rectangular anti-tamper component (e.g. second portion 258 of anti-tamper component 254—see FIG. 17), the second apertures 506 are particularly suited to a narrower anti-tamper component (e.g. strap 262 of anti-tamper component 260—see FIG. 18). The choice of anti-tamper component may therefore influence which of the apertures 504, 506 is used in practice.

The anti-tamper component may have an external profile, or geometry, which substantially corresponds to a geometry of the respective anti-tamper feature (e.g. aperture). For example, the generally rectangular anti-tamper component of FIG. 17 has a geometry, or profile, which generally corresponds to the rectangular geometry of the first apertures 504. The narrower anti-tamper component of FIG. 18 has a profile which generally corresponds to the second apertures 506.

The second apertures 506 may be particularly suited to a more generic anti-tamper component (e.g. a cable tie). The first aperture 504 may be particularly suited to a customer, or product, specific anti-tamper component (e.g. that shown in FIG. 17).

Advantageously, incorporation of different anti-tamper apertures, with different geometries and sizes, improves the versatility of the locking mechanism 500 in being used for different purposes, and by different parties, and with different anti-tamper components. One, or both, sets of apertures may be used in practice (e.g. a single anti-tamper component may be used, or a plurality of anti-tamper components may be used).

It will be appreciated that a range of aperture geometries, and sizes, may be used. For example, corners of either of the apertures 504, 506 may be rounded. The apertures 504, 506 may be generally elliptical. The aperture 506 may be circular.

Although FIGS. 21a-23b have shown, and referred to, the locking mechanism 300, the description is equally applicable to the locking mechanism 400 as shown in FIG. 20 and the locking mechanism 500 shown in FIG. 24. Also, FIGS. 21a-22b shown only a single locking mechanism 300, but the method steps described therein are equally applicable to the arrangements of locking mechanisms shown in FIGS. 14-16.

The various clips described herein may be described as sleeve securing clips.

The described and illustrated embodiments are to be considered as illustrative and not restrictive in character, it being understood that only preferred embodiments have been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A container locking mechanism for a container, the locking mechanism comprising:
   a fixed member providable on a body of the container;
   a locking member moveable linearly in a first direction with respect to the fixed member between a locked configuration and an unlocked configuration; and
   a biasing member configured to urge the locking member towards the locked configuration,
   wherein:
      the locking member defines an opening, and
      a locking projection of a lid or base of the container is receivable by the opening in a second direction perpendicular to the first direction.

2. The container locking mechanism according to claim 1, wherein the opening comprises an alignment zone and a retaining zone.

3. The container locking mechanism according to claim 2, wherein the alignment zone is defined by one or more guiding surfaces.

4. The container locking mechanism according to claim 3, wherein the one or more guiding surfaces are inclined surfaces which define a neck of the opening.

5. The container locking mechanism according to claim 1 where the fixed member comprises one or more clips, the one or more clips being configured to engage the body of the container.

6. The container locking mechanism according to claim 1, wherein the locking member comprises first and second hingeably connected elements.

7. The container locking mechanism according to claim 1 wherein the locking mechanism comprises one or more anti-tamper features.

8. The container locking mechanism according to claim 7, wherein each of the fixed member and the locking member comprise an anti-tamper feature in the form of an aperture.

9. The container locking mechanism according to claim 8, wherein the apertures of the fixed member and the locking member overlap in the locked configuration.

10. The container locking mechanism according to claim 1 wherein the fixed member comprises a pair of track projections.

11. The container locking mechanism according to claim 10, wherein the track projections are separated by a web projection.

12. The container locking mechanism according to claim 11, wherein the biasing member engages the web projection.

13. The container locking mechanism according to claim 12, wherein the pair of track projections, the web projection and the one or more guiding projections cooperate to define a cavity in which the biasing member is received.

14. The container locking mechanism according to claim 10, wherein the locking member comprises one or more guiding projections, the one or more guiding projections engaging the pair of track projections.

15. A container for transporting goods, the container comprising:
   a base;
   a body;
   a lid; and
   the container locking mechanism according to claim 1, the fixed member of the container locking mechanism being provided on the body;
   wherein in the locked configuration the container locking mechanism secures the base, or the lid, to the body.

16. The container according to claim 15, wherein the container comprises a plurality of container locking mechanisms.

17. The container according to claim 16, wherein the body comprises two pairs of opposing walls, each wall of one pair of opposing walls comprising a plurality of container locking mechanisms.

18. The container according to claim 17, wherein the each wall of the one pair of opposing walls comprises, provided thereon:
   a plurality of locking mechanisms proximate the base; and/or
   a plurality of locking mechanisms proximate the lid.

19. The container according to claim 15 wherein the fixed member of each container locking mechanism is attached to a respective support web which extends across a respective cavity in the body to define a respective split cavity.

20. A method of disengaging the lid, or the base, from the body of the container according to claim 15, the method comprising:
   i) urging the locking mechanism into an unlocked configuration; and
   ii) separating the lid, or the base, from the body.

21. A method of disengaging the lid, or the base, from the body of the container according to claim 15, the method comprising:
   i) urging the lid, or the base, and the body together, the movement urging the locking mechanism away from a locked configuration, towards an unlocked configuration;
   ii) continuing to urge the lid, or the base, and the body together; and
   iii) the locking mechanism automatically returning to the locked configuration, under action of the biasing member, to secure the lid, or the base, to the body.

22. A method of disengaging the lid, or the base, from the body of the container according to claim 15, the method comprising:
   i) urging the lid, or the base, and the body together whilst the locking mechanism is in an unlocked configuration; and
   ii) returning the locking mechanism to the locked configuration to secure the lid, or the base, to the body.

23. A method of installing the container locking mechanism according to claim 1, wherein the locking member comprises first and second hingeably connected elements and the method comprises placing the first hingeably connected element in contact with the body, urging the second hingeably connected element towards the first hingeably connected element, over an edge of the body, and securing the first and second hingeably connected elements together.

24. A container locking mechanism for a container, the locking mechanism comprising:
   a fixed member providable on a body of the container;
   a locking member moveable with respect to the fixed member between a locked configuration and an unlocked configuration; and
   a biasing member configured to urge the locking member towards the locked configuration,
   wherein the fixed member comprises one or more clips, the one or more clips being configured to engage the body of the container.

25. A method of installing the container locking mechanism according to claim 24, wherein the method comprises urging the container locking mechanism towards the body of the container to bias the one or more clips into engagement with the body to attach the fixed member to the body of the container.

* * * * *